US010944998B2

(12) United States Patent
Zhang et al.

(10) Patent No.: US 10,944,998 B2
(45) Date of Patent: Mar. 9, 2021

(54) SYSTEMS AND METHODS FOR UAV INTERACTIVE VIDEO BROADCASTING

(71) Applicant: SZ DJI TECHNOLOGY CO., LTD., Shenzhen (CN)

(72) Inventors: Jinhua Zhang, Shenzhen (CN); Qiheng Song, Shenzhen (CN); Zhun Ding, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/252,705

(22) Filed: Jan. 20, 2019

(65) Prior Publication Data
US 2019/0174149 A1  Jun. 6, 2019

Related U.S. Application Data

(63) Continuation of application No. PCT/CN2016/091028, filed on Jul. 22, 2016.

(51) Int. Cl.
*H04N 21/218* (2011.01)
*H04N 21/4728* (2011.01)
(Continued)

(52) U.S. Cl.
CPC ..... *H04N 21/21805* (2013.01); *B64C 39/024* (2013.01); *H04N 7/18* (2013.01);
(Continued)

(58) Field of Classification Search
CPC ......... H04N 21/21805; H04N 21/2187; H04N 21/2393; H04N 21/4312; H04N 21/47202;
(Continued)

(56) References Cited

U.S. PATENT DOCUMENTS 5,716,032 A     2/1998  McIngvale
9,488,979 B1 *  11/2016 Chambers ............ G05D 1/0088
(Continued)

FOREIGN PATENT DOCUMENTS

CN  102576281 A  7/2012
CN  105245846 A  1/2016
(Continued)

OTHER PUBLICATIONS

The World Interllectual Property Organization (WIPO) The International Search Report and Written Opinion for PCT/CN2016/091028. dated Apr. 20, 2017 8 pages.
(Continued)

*Primary Examiner* — Alexander Gee
(74) *Attorney, Agent, or Firm* — Anova Law Group, PLLC

(57) ABSTRACT

Systems, and methods are provided herein for UAV video broadcasting. A method for video broadcasting may comprise: receiving broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; receiving a user input from a viewing end, wherein the user input comprises one or more instructions configured for interacting with the broadcasting end; processing the user input from the viewing end; and transmitting the processed user input to the broadcasting end to adjust video broadcasting at the broadcasting end.

18 Claims, 17 Drawing Sheets

(51) Int. Cl.
  *H04N 21/472* (2011.01)
  *H04N 7/18* (2006.01)
  *H04N 21/431* (2011.01)
  *B64C 39/02* (2006.01)
  *H04N 21/239* (2011.01)
  *H04N 21/2187* (2011.01)

(52) U.S. Cl.
  CPC ............ *H04N 7/181* (2013.01); *H04N 7/185* (2013.01); *H04N 21/2187* (2013.01); *H04N 21/2393* (2013.01); *H04N 21/4312* (2013.01); *H04N 21/4728* (2013.01); *H04N 21/47202* (2013.01); *B64C 2201/122* (2013.01); *B64C 2201/143* (2013.01)

(58) Field of Classification Search
  CPC ............ H04N 21/4728; H04N 21/214; H04N 21/2146; H04N 7/18; H04N 7/181; B64C 39/024; B64C 2201/122; B64C 2201/143
  See application file for complete search history.

(56) References Cited

U.S. PATENT DOCUMENTS

| | | | |
|---|---|---|---|
| 2006/0253254 A1 | 11/2006 | Herwitz | |
| 2013/0113894 A1* | 5/2013 | Mirlay | G02B 30/37 348/47 |
| 2013/0233964 A1* | 9/2013 | Woodworth | G05D 1/104 244/2 |
| 2014/0316616 A1* | 10/2014 | Kugelmass | G06T 11/206 701/8 |
| 2015/0142211 A1* | 5/2015 | Shehata | H04W 4/42 701/2 |
| 2015/0362917 A1* | 12/2015 | Wang | G05D 1/0022 701/2 |
| 2016/0093124 A1 | 3/2016 | Shi et al. | |
| 2016/0378108 A1* | 12/2016 | Paczan | G05D 1/104 705/330 |
| 2017/0359407 A1* | 12/2017 | Rothrock | G06F 9/54 |
| 2018/0164820 A1* | 6/2018 | Aboutalib | G05D 1/0808 |

FOREIGN PATENT DOCUMENTS

| | | |
|---|---|---|
| CN | 105518555 A | 4/2016 |
| CN | 105554480 A | 5/2016 |
| CN | 105589466 A | 5/2016 |
| CN | 105599900 A | 5/2016 |
| CN | 105704501 A | 6/2016 |
| CN | 105744231 A | 7/2016 |

OTHER PUBLICATIONS

Jun Chen, et al., Human/Unmanned-Aerial-Vehicle Team Collaborative Decision-Making with Limited Intervention, Acta Aeronautica et Astronautica Sinica, Nov. 2015, pp. 3652-3665, vol. 36, No. 11.

* cited by examiner

SYSTEMS AND METHODS FOR UAV INTERACTIVE VIDEO BROADCASTING

CROSS-REFERENCE TO RELATED APPLICATION

This application is a continuation of International Application No. PCT/CN2016/091028, filed on Jul. 22, 2016, the entire content of which is incorporated herein by reference.

BACKGROUND

Aerial vehicles such as unmanned aerial vehicles (UAVs) have a wide range of real-world applications including surveillance, reconnaissance, exploration, logistics transport, disaster relief, aerial photography, large-scale agriculture automation, etc. In some cases, a UAV carrying a payload (e.g., a camera) can be used to capture video from an aerial footage. Live video from the UAV may be streamed or broadcasted to one or more viewers. However, viewers often do not have options to interact with the UAV and alter the video (for example, changing the perspective from which the video is being captured). The lack of interactive options in present UAV live video broadcasting systems may diminish viewer experience, and reduce the usefulness of UAVs in certain applications.

SUMMARY

A need exists for systems and methods that can (1) manage broadcast of live video from multiple UAVs to multiple viewers, (2) provide an interactive and immersive viewer experience during UAV live video broadcasting, and (3) regulate the viewers' interactions with the UAVs, such that the UAVs can be operated in a safe manner. The present disclosure addresses this need and provides related advantages as well.

According to one aspect of the present disclosure, a method for video broadcasting is provided. The method comprises: receiving broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; receiving a user input from a viewing end, wherein the user input comprises one or more instructions configured for interacting with the broadcasting end; processing the user input from the viewing end; and transmitting the processed user input to the broadcasting end to adjust video broadcasting at the broadcasting end.

A system for video broadcasting is provided in another aspect of the present disclosure. The system comprises a control hub including one or more servers that are individually or collectively configured to: receive broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; receive a user input from a viewing end, wherein the user input comprises one or more instructions configured for interacting with the broadcasting end; process the user input from the viewing end; and transmit the processed user input to the broadcasting end to adjust video broadcasting at the broadcasting end.

In a further aspect of the present disclosure, a non-transitory computer-readable medium storing instructions that, when executed, causes one or more processors to perform a method for video broadcasting is provided. The method performed by the one or more processors comprises: receiving broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; receiving a user input from a viewing end, wherein the user input comprises one or more instructions configured for interacting with the broadcasting end; processing the user input from the viewing end; and transmitting the processed user input to the broadcasting end to adjust video broadcasting at the broadcasting end.

According to another aspect of the present disclosure, a method for video broadcasting is provided. The method comprises: receiving broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; detecting a user input at a viewing end, wherein the user input comprises one or more instructions configured to interact with the broadcasting end; and transmitting the user input to the broadcasting end to adjust video broadcasting at the broadcasting end.

A system for interactive video broadcasting is provided in another aspect of the present disclosure. The system comprises a viewing end including one or more processors that are individually or collectively configured to: receive broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; detect a user input at a viewing end, wherein the user input comprises one or more instructions configured to interact with the broadcasting end; and transmit the user input to the broadcasting end to adjust video broadcasting at the broadcasting end.

In another aspect of the present disclosure, a non-transitory computer-readable medium storing instructions that, when executed, causes one or more processors to perform a method for interactive video broadcasting is provided. The method comprises: receiving broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations; detecting a user input at a viewing end, wherein the user input comprises one or more instructions configured to interact with the broadcasting end; and transmitting the user input to the broadcasting end to adjust video broadcasting at the broadcasting end.

According to a further aspect of the present disclosure, a method for video broadcasting is provided. The method performed by the one or more processors comprises: receiving, at a broadcasting end, a user input from a viewing end, wherein the user input comprises one or more instructions for interacting with the broadcasting end; processing, at the broadcasting end, the user input received from the viewing end; and preparing broadcast data at the broadcasting end based on the processed user input, wherein the broadcast data comprises video data collected by a plurality of unmanned aerial vehicles (UAVs), and wherein said UAVs are configured to be (1) operated in a coordinated manner and (2) in communication with one or more ground stations.

A system for interactive video broadcasting is provided in a further aspect of the present disclosure. The system comprises a broadcasting end including one or more processors that are individually or collectively configured to: receive a user input from a viewing end, wherein the user input comprises one or more instructions for interacting with the broadcasting end; process the user input received from the viewing end; and prepare broadcast data based on the processed user input, wherein the broadcast data comprises video data collected by a plurality of unmanned aerial vehicles (UAVs), wherein said UAVs are configured to be (1) operated in a coordinated manner and (2) in communication with one or more ground stations.

In a further aspect of the present disclosure, a non-transitory computer-readable medium storing instructions that, when executed, causes one or more processors to perform a method for video broadcasting is provided. The method performed by the one or more processors comprises: receiving, at a broadcasting end, a user input from a viewing end, wherein the user input comprises one or more instructions for interacting with the broadcasting end; processing the user input received from the viewing end; and preparing broadcast data at the broadcasting end based on the processed user input, wherein the broadcast data comprises video data collected by a plurality of unmanned aerial vehicles (UAVs), wherein said UAVs are configured to be (1) operated in a coordinated manner and (2) in communication with one or more ground stations.

In some embodiments, the coordinated manner can comprise a decentralized swarm configuration in which the UAVs are configured to operate autonomously. Each UAV can be configured to operate autonomously using in part environmental information collected via an environmental sensing system onboard each UAV. Each UAV can be configured to operate autonomously based in part on information of adjacent UAV(s), wherein the information can comprise a position and an orientation of a camera onboard the adjacent UAV(s). In some embodiments, the one or more ground stations can be configured to control the UAVs to operate in the coordinated manner.

In some embodiments, the coordinated manner can comprise a master-slave configuration in which a master UAV is configured to control one or more slave UAVs. The master UAV can be configured to control take-off and landing of the slave UAV(s). The master UAV can be configured to control an orientation of a camera onboard each of the slave UAV(s), and wherein the camera(s) are configured to collect the video data. The master UAV can be configured to control a flight path of each of the slave UAV(s).

In some embodiments, the control of the slave UAV(s) can be transferred from the master UAV to the ground station(s) or a back-up UAV upon occurrence of one or more conditions that prevent the master UAV from controlling the slave UAV(s). The one or more conditions can include: (1) loss of communication between the master UAV and the slave UAV(s), and/or (2) a malfunction or damage to one or more components of the master UAV.

In some embodiments, processing the user input from the viewing end can comprise determining whether the user input includes conflicting instructions for controlling the UAVs. In some cases, the conflicting instructions can be resolved based on a priority level associated with each user. The conflicting instructions can be resolved based on a number of votes associated with each user.

In some embodiments, processing the user input from the viewing end can comprise determining whether the user input satisfies an operational condition. The operational condition can comprise one or more of the following: (i) permission level of each user at the viewing end, (ii) flight regulations imposed on the UAVs, or (iii) environmental conditions in which the UAVs operate. In some cases, processing the user input can further comprise modifying the user input to satisfy the operational condition.

In some embodiments, the method can further comprise: processing the broadcast data received from the broadcasting end to generate at least one of the following: augmented reality (AR)/virtual reality (VR) data, 3-D data, map, graphical user interface (GUI), and/or program list associated with the video data. The program list can comprise a list of viewing programs corresponding to different channels via which the video data is being broadcasted to the viewing end.

In some embodiments, the method can further comprise: receiving a broadcast request from the broadcasting end, and processing the broadcast request based on one or more operational parameters at the broadcasting end. The operational parameters can comprise (1) a first set of parameters associated with operation of the one or more UAVs, and (2) a second set of parameters associated with an environment in which the one or more UAVs are configured to operate. The first set of parameters can comprise (1) motion path of the UAVs, (2) type of video data to be broadcasted, (3) permission level of the UAVs to broadcast, or any combination thereof. The second set of parameters can comprise environmental conditions at the broadcasting end.

In some embodiments, the method can further comprise: receiving a termination request from the broadcasting end, and processing the termination request. Processing the termination request can comprise: providing a termination message to the one or more viewing ends, wherein the termination message is indicative that transmission of the video data over one or more channels is terminated. In some embodiments, the method can further comprise: recycling the one or more channels by making the one or more channels available for video data that is being transmitted from another broadcasting end.

In some embodiments, the viewing end can comprise a mobile device or a head-mounted display (HMD). The viewing end can be configured to receive different types of input from one or more users. The different types of user input can include voice control, motion control, and/or touch (haptic) control of one or more UAVs at the broadcasting end. The viewing end can be configured to display the video data in an augmented reality (AR) or virtual reality (VR) environment.

In some embodiments, preparing the broadcast data can comprise generating at least one of the following: augmented reality (AR)/virtual reality (VR) data, 3-D data, map, graphical user interface (GUI), and/or a program list associated with the video data. In some cases, preparing the broadcast data can comprise controlling the plurality of UAVs based on the processed user input. The plurality of UAVs can be controlled to move in different formations to collect the video data from different viewpoints.

It shall be understood that different aspects of the present disclosure can be appreciated individually, collectively, or in combination with each other. Various aspects of the present disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings of which:

DETAILED DESCRIPTION

The systems and methods disclosed herein relate to broadcasting of live video from unmanned aerial vehicles (UAVs), and can provide an interactive and immersive user experience during UAV live video broadcasting to an audience at a viewing end. The disclosed embodiments can also be used to regulate the viewers' interactions with the UAVs, such that the UAVs can be operated in a safe manner.

It shall be understood that different aspects of the present disclosure can be appreciated individually, collectively, or in combination with each other. Various aspects of the present disclosure described herein may be applied to any of the particular applications set forth below or for any other types of remotely controlled vehicles or movable objects.

System Overview

Figure 1:
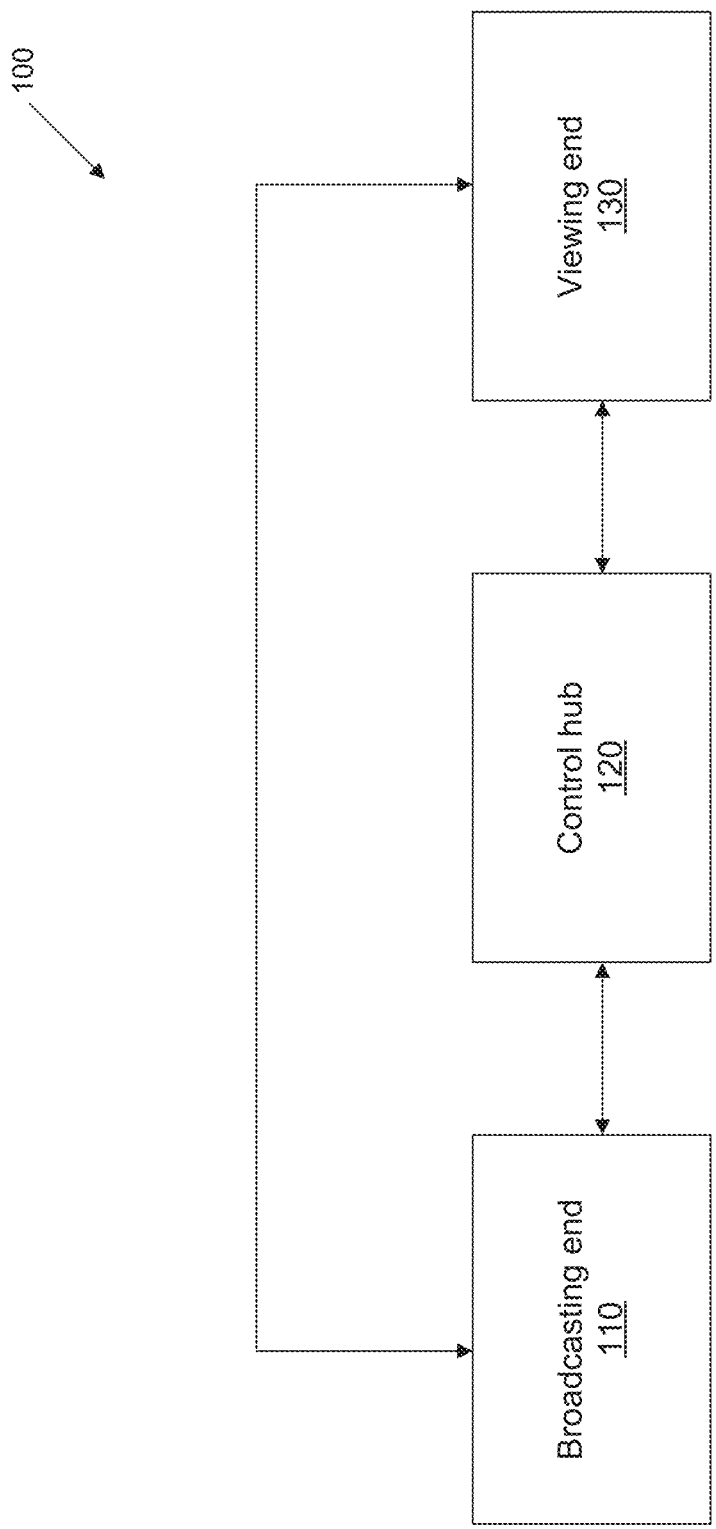
FIG. 1 illustrates an exemplary video broadcasting system in accordance with some embodiments.

FIG. 1 illustrates an exemplary video broadcasting system in accordance with some embodiments. In one aspect, a video broadcasting system 100 may comprise a broadcasting end 110, a control hub 120, and a viewing end 130. The broadcasting end, control hub, and viewing end may be operatively connected to one another via one or more networks, or via any type of communication link that allows transmission of data from one component to another.

The broadcasting end may be configured to generate broadcast data. The broadcast data may comprise video data collected by one or more movable objects. In some embodiments, the broadcasting end may comprise the one or more movable objects. Optionally, the broadcasting end may comprise one or more ground stations in communication with the movable objects. In some embodiments, the movable objects may comprise one or more aerial vehicles, such as unmanned aerial vehicles (UAVs). The video data may be collected using one or more cameras supported by the UAVs. The video data may include images or videos of an environment in which the UAVs operate.

In some embodiments, the broadcasting end may further comprise one or more ground stations in communication with one or more UAVs. Alternatively, the ground stations need not be part of the broadcasting end. The UAVs may be configured to transmit the video data to the ground stations. Additionally, the UAVs may be configured to transmit operational data associated with the UAVs to the ground stations. The operational data may include positional and/or motion characteristics of the UAVs or payloads (e.g., cameras) mounted onto the UAVs. For example, the operational data may include a position, attitude, navigation path, heading, altitude, motion characteristics (e.g., velocity and acceleration), and/or state of charge of the one or more UAVs. Additionally, the operational data may include a position, attitude, and/or motion characteristics (e.g., angular velocity and acceleration) of one or more carriers (e.g., gimbals) that are mounted on the UAVs. The carriers may be configured to support one or more cameras for collecting the video data.

In some embodiments, the UAVs may be configured to transmit environmental information to the ground stations. The environmental information may be indicative of the environment in which the UAVs operate. For example, the environmental information may include a 3D map of the environment, presence or absence of obstacles along a flight path of the UAVs, and/or weather conditions.

The video data may comprise live video that is being collected by the UAVs. The live video may be broadcasted over one or more channels, as described elsewhere herein. The video data may comprise 2-D video, 3-D video, stereoscopic video, multiview video, panoramic video, spherical video, and/or video provided from a first person view (FPV). The video data may be encoded using one or more encoders located onboard the UAVs, and the UAVs may be configured to transmit the encoded video to the ground stations. Alternatively, the UAVs may transmit raw video to the ground stations, and one or more encoders located at the ground stations may be configured to encode the raw video before transmitting the video data to the control hub or the viewing end.

The broadcasting end may be configured to transmit data (e.g., video data, environmental data, UAV operational data) to the control hub. In some embodiments, the control hub may be configured to process the broadcast data received from the broadcasting end to generate at least one of the following: augmented reality (AR)/virtual reality (VR) data, 3-D data, map, graphical user interface (GUI), and/or program list associated with the video data. The program list may comprise a list of viewing programs corresponding to different channels via which the video data is being broadcasted.

The control hub may be configured to manage transmission of data between the broadcasting end and the viewing end. For example, the control hub may receive video data from one or more UAVs and/or ground stations. The control hub may be configured to manage the distribution and transmission of data over one or more channels. The channels may include wired communication channels, wireless communication channels, and/or internet protocol (IP) addresses. The data may be transmitted over the channels using one or more network protocols.

The control hub may be configured to provide and/or stream processed broadcast data to the viewing end. One or more user terminals at the viewing end may be configured to display the broadcast data. In some embodiments, the user terminals may be configured to display video, AR/VR data, 3-D data, a map, and other information collected by the broadcasting end.

One or more users at the viewing end can view the video on user terminals, and interact with the broadcasting end through a graphical user interface (GUI) provided on the user terminals. A user input from the viewing end may be detected when a user interacts with one or more graphical elements embedded within the GUI/video displayed on the user terminal. The user's selection or manipulation of the graphical elements can allow the user to interact with the broadcasting end. The user input may comprise one or more instructions configured for interacting with the broadcasting end. In some embodiments, the control hub may be configured to receive and process the user input from the viewing end, and transmit the processed user input to the broadcasting end to adjust video broadcasting at the broadcasting end.

In some embodiments, the users at the viewing end may provide a plurality of user input. The control hub and/or the broadcasting end may be configured to process the user input. The user input may be processed to determine whether the user input contains conflicting instructions for controlling the UAVs at the broadcasting end. In some embodiments, the conflicting instructions may be resolved based on a priority level associated with each user.

In some embodiments, the user input may be processed to determine whether the user input satisfies an operational condition. The operational condition may comprise one or more of the following: (1) permission level of the user to control the UAVs, (2) flight regulations imposed on the UAVs, or (3) environmental conditions in which the UAVs operate. The control hub and/or ground stations at the broadcasting end may be configured to generate a set of UAV control instructions when the user input is determined to satisfy the operational condition. The set of UAV control instructions may be configured for controlling one or more UAVs at the broadcasting end. In some cases, the processing of the user input may serve as a safety check, to ensure operational safety of the UAVs within an environment or to comply with flight regulations.

In some embodiments, if the user input does not satisfy the operational condition, the control hub and/or ground station at the broadcasting end may be configured to modify the instructions in the user input, to ensure that the operational condition is satisfied. For example, the control hub and/or ground station may modify the instructions in the user input, such that the modified instructions comply with flight regulations or environmental conditions.

Operation of UAVs in a Coordinated Manner

In some embodiments, the UAVs at the broadcasting end may be operated in a coordinated manner. The coordinated manner may include, for example, maintaining or achieving a positional goal between the UAVs. The positional goal may include a predetermined distance between the UAVs. The positional goal may include a predetermined attitude and/or orientation of the UAVs relative to one another. The UAVs may be operated such that UAVs move in a predetermined formation. For example, the UAVs may be aligned relative to one another in the predetermined formation.

The UAVs may follow a plurality of predetermined trajectories when moving in the predetermined formation. The plurality of predetermined trajectories may comprise a plurality of spatial points. Each spatial point may have a set of known global spatial coordinates. The plurality of UAVs may travel through the corresponding plurality of spatial points at substantially a same time or at different times.

In some embodiments, operating the UAVs in the coordinated manner may comprise controlling the UAVs to cooperatively work together to perform one or more tasks. In some cases, the tasks may comprise the collection of video data from different aerial viewpoints.

Decentralized Swarm Configuration

Figure 2:
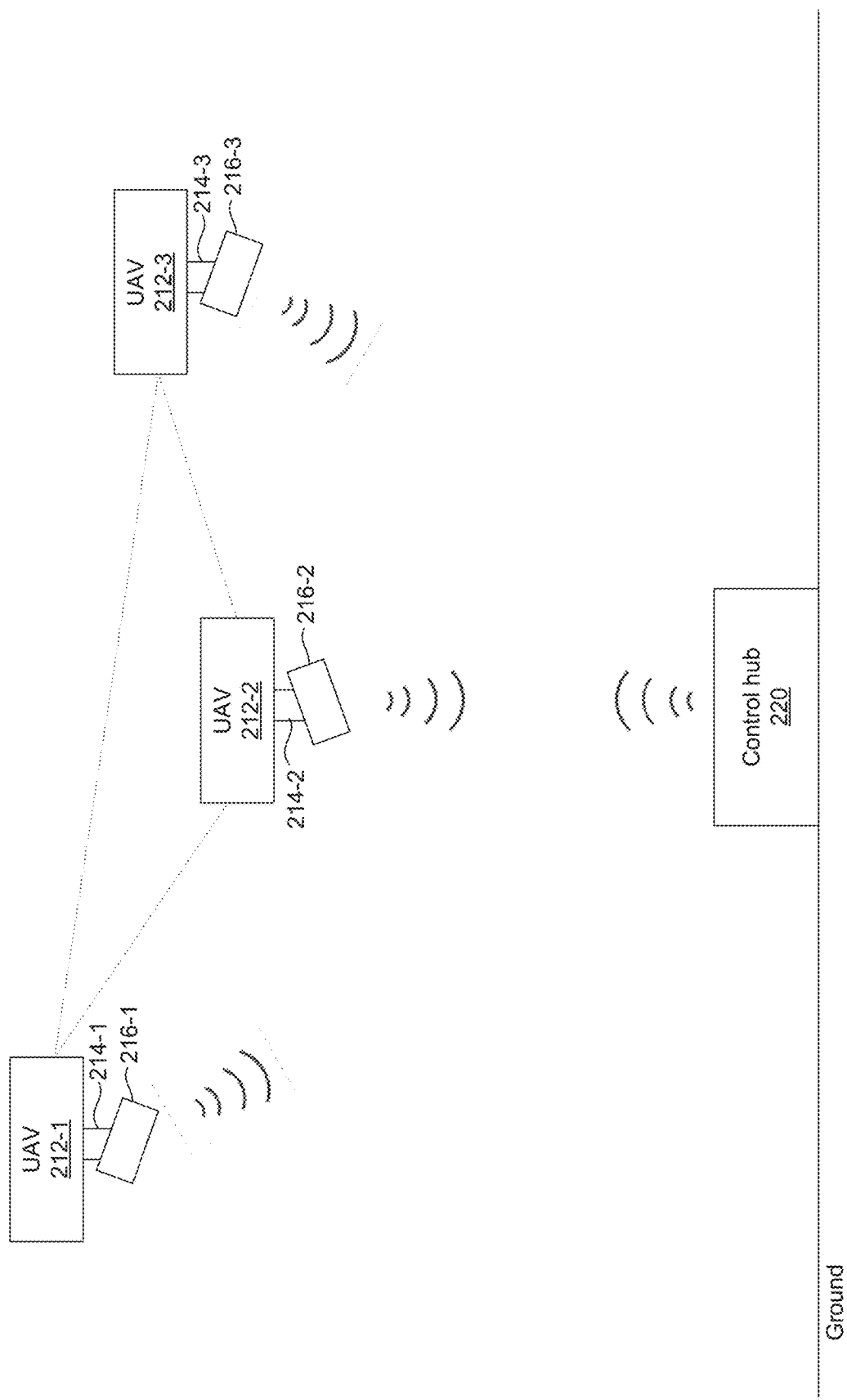
FIG. 2 illustrates an exemplary broadcasting end comprising a decentralized swarm of UAVs in communication with a control hub, in accordance with some embodiments.

In some embodiments, the coordinated manner may include a decentralized swarm configuration in which the UAVs are configured to operate autonomously. FIG. 2 illustrates an exemplary broadcasting end comprising a decentralized swarm of UAVs in communication with a control hub, in accordance with some embodiments. A plurality of UAVs 212 may be operated in a decentralized swarm configuration. Each UAV may comprise a payload (e.g., camera 216) supported by a carrier 214. The camera may have a fixed position relative to the UAV, or may be movable relative to the UAV. In some instances, the camera may spatially translate relative to the UAV. For instance, the camera may move along one, two or three axes relative to the UAV. The camera may rotate relative to the movable object. For instance, the camera may rotate about one, two or three axes relative to the UAV. The axes may be orthogonal to one another. The axes may be a pitch, yaw, and/or roll axis. Alternatively, the axes need not be orthogonal to one another, and may be oblique to one another. In some other embodiments, the camera may be fixed or integrated into the UAV.

Each camera may be operably coupled to a UAV via a carrier. In FIG. 2, each camera 216 may be movable relative to the UAV 212 with aid of the carrier 214. The camera may be rotatably coupled to the UAV via the multi-axis gimbal. For example, a first camera 216-1 may be rotatably coupled to a first UAV 212-1 via a first carrier 214-1. A second camera 216-1 may be rotatably coupled to a second UAV 212-1 via a second carrier 214-1. A third camera 216-1 may be rotatably coupled to a third UAV 212-1 via a third carrier 214-1.

The carrier may include one or more gimbal stages that may permit movement of the carrier relative to the UAV. The carrier may comprise a multi-axis gimbal. For instance, the carrier may include a first gimbal stage that permit rotation of the carrier relative to the UAV about a first axis, a second gimbal stage that permit rotation of the carrier relative to the UAV about a second axis, and/or a third gimbal stage that permit rotation of the carrier relative to the UAV about a third axis. The first, second, and third axes may correspond to a pitch axis, yaw axis, and roll axis. Any descriptions and/or characteristics of carriers as described elsewhere herein may apply.

The camera 216 may be an imaging device. The imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The camera 216 can be a movie or video camera that captures dynamic image data (e.g., video). The camera can be a still camera that captures static images (e.g., photographs). The camera may capture both dynamic image data and static images. The camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc.). The camera may capture color images, greyscale image, infrared images, and the like. The camera may be a thermal imaging device when it is configured to capture infrared images.

In some embodiments, an inertial measurement unit (IMU) (not shown) may be disposed on a camera. Alternatively, an IMU may be disposed on a carrier that couples a camera to the UAV. Additionally or optionally, an IMU may be disposed within a housing of the UAV. The IMU may comprise inertial sensors such as accelerometers, gyroscopes, and/or gravity detection sensors. The IMU can be configured to obtain real-time positional and motion information of each camera. The real-time positional and motion information from the IMU may include a position and an orientation of each camera within an inertial reference frame. The inertial reference frame may be defined relative to the corresponding carrier or to the UAV. In some instances, a camera and the UAV to which it is coupled may belong to different inertial reference frames that move independently of each other.

Referring to FIG. 2, the cameras 216 may have different positions and orientations relative to one each another. For example, the first camera may be disposed at a first position and orientation, the second camera may be disposed at a second position and orientation, and the third camera may be disposed at a third position and orientation. The first, second, and third positions may correspond to different positions within 3-dimensional space. Accordingly, the first, second, and third positions may be defined by different sets of global spatial coordinates. The first, second, and third orientations may include different pitch/roll/yaw angles of the cameras relative to the UAVs to which they are coupled. Each position/orientation of the camera may correspond to a different field of view of the camera (i.e., provides a different aerial perspective). The UAVs 212 may be in communication with one another. For example, each UAV may be configured to transmit the position and orientation information of its camera to other UAVs. Likewise, each UAV may be configured to receive the position and orientation information of the cameras on other UAVs.

Autonomous Operation of UAVs

In FIG. 2, each UAV may be configured to operate autonomously based in part on information associated with adjacent UAVs. The information may comprise a position and an orientation of each camera onboard the adjacent UAVs. For example, the first UAV may be configured to operate autonomously based on the positions and orientations of the second/third cameras on the second/third UAVs. Similarly, the second UAV may be configured to operate autonomously based on the positions and orientations of the first/third cameras on the first/third UAVs. Likewise, the third UAV may be configured to operate autonomously based on the positions and orientations of the first/second cameras on the first/second UAVs. Accordingly, even though each UAV is operating autonomously in a decentralized swarm configuration, the UAVs can nonetheless operate in a collaborative manner to collect video data from different aerial perspectives. This coordinated manner of UAV operation can ensure sufficient visual coverage of the environment, an event, a target object, or an area to be scanned.

In some embodiments, each UAV may be configured to operate autonomously using in part environmental information collected via an environmental sensing system onboard each UAV. The environmental sensing unit may include any type of sensor that can be used to collect environmental information, including location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). In some embodiments, the environmental sensing unit may further include an imaging device (e.g., camera 216). Optionally, the environmental sensing unit may receive imaging data collected by the camera 216, and process the imaging data to obtain environmental information. For example, the environmental sensing unit can be configured to construct a 3-D depth map of the environment using the imaging data.

In some embodiments, the environmental sensing unit can comprise a GPS sensor, and the environment type can be determined based on a number of GPS satellites in communication with the GPS sensor. Similarly, the environmental sensing unit can comprise one or more lidar sensors, and the environment type can be determined based on time-of-flight data obtained by the lidar sensors. Likewise, the environmental sensing unit can comprise one or more vision sensors, and the environment type can be determined based on image data obtained by the vision sensors, such as an exposure time associated with the image data obtained by the vision sensors. Any number and combination of sensors can be used to obtain environmental information, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any combination of active sensors (e.g., sensors that generate and measure energy from their own source) and passive sensors (e.g., sensors that detect available energy).

The sensor data may include various types of environmental information. For example, the sensor data may be indicative of an environment type, such as an indoor environment, outdoor environment, low altitude environment, high altitude environment, etc. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as structures or obstacles. Alternatively, the sensors can be used to provide data regarding the environment surrounding the UAV, such as weather conditions, proximity to potential obstacles, location of geographical features, location of manmade structures, a wind speed, a wind direction, a rain speed, a temperature, and the like.

In some embodiments, one or more of the sensors in the environmental sensing unit may be configured to provide data regarding a state of the UAV. The state information provided by a sensor can include information regarding a spatial disposition of the UAV (e.g., position information such as longitude, latitude, and/or altitude; orientation information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global reference frame or relative to the reference frame of another entity. For example, a sensor can be configured to determine the distance between the UAV and a ground station, and/or the starting point of flight for the UAV.

In some embodiments, the sensing data obtained by the one or more sensors in the environmental sensing unit may be provided to a flight controller. The flight controller may be configured to control, via one or more electronic speed control (ESC) units, one or more propulsion units of the UAV to effect motion of the UAV.

In some embodiments, the environmental sensing unit may include multiple imaging devices, or an imaging device having multiple lenses and/or image sensors. The imaging device(s) may be capable of taking multiple images substantially simultaneously, sequentially, or at different points in time. The multiple images may aid in the creation of a 3D scene, a 3D virtual environment, a 3D map, or a 3D model. For instance, a right-eye image and a left-eye image may be taken and used for stereo-mapping. A depth map may be calculated from a calibrated binocular image, as described in detail below. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

In some embodiments, stereoscopic video data obtained from one or more imaging devices may be analyzed to determine the environmental information. The environmental information may comprise an environmental map. The environmental map may comprise a topological map or a metric map. The metric map may comprise at least one of the following: a point cloud, a 3D grid map, a 2D grid map, a 2.5D grid map, or an occupancy grid map. The occupancy grid may be used to define a 3D map of the spatial environment surrounding the UAV.

In some embodiments, analysis of stereoscopic video data may comprise at least one of the following: (1) imaging device calibration, (2) stereo matching of image frames, and (3) depth map calculation. The imaging device calibration may comprise calibrating intrinsic parameters and extrinsic parameters of an imaging device such as a binocular camera. The binocular camera may be configured to capture one or more binocular images. The stereoscopic video data may be obtained from a plurality of binocular images. The stereo matching may comprise (1) extracting substantially in or near real-time feature points of each monocular image in each binocular image, (2) calculating the motion characteristics of the feature points, (3) matching corresponding feature points extracted from the image frames based on the motion characteristics of the feature points, and (4) eliminating mismatch feature points. The depth map calculation may comprise (1) calculating a pixel-based disparity map based on the matched feature points and (2) calculating a depth map based on the extrinsic parameters of the binocular camera. The depth map calculation may comprise filtering and applying a threshold to the depth map to determine or more obstacles. For example, the threshold may be applied to classify objects in the environment having a predetermined size and/or number of pixels in the depth map.

Figure 7:
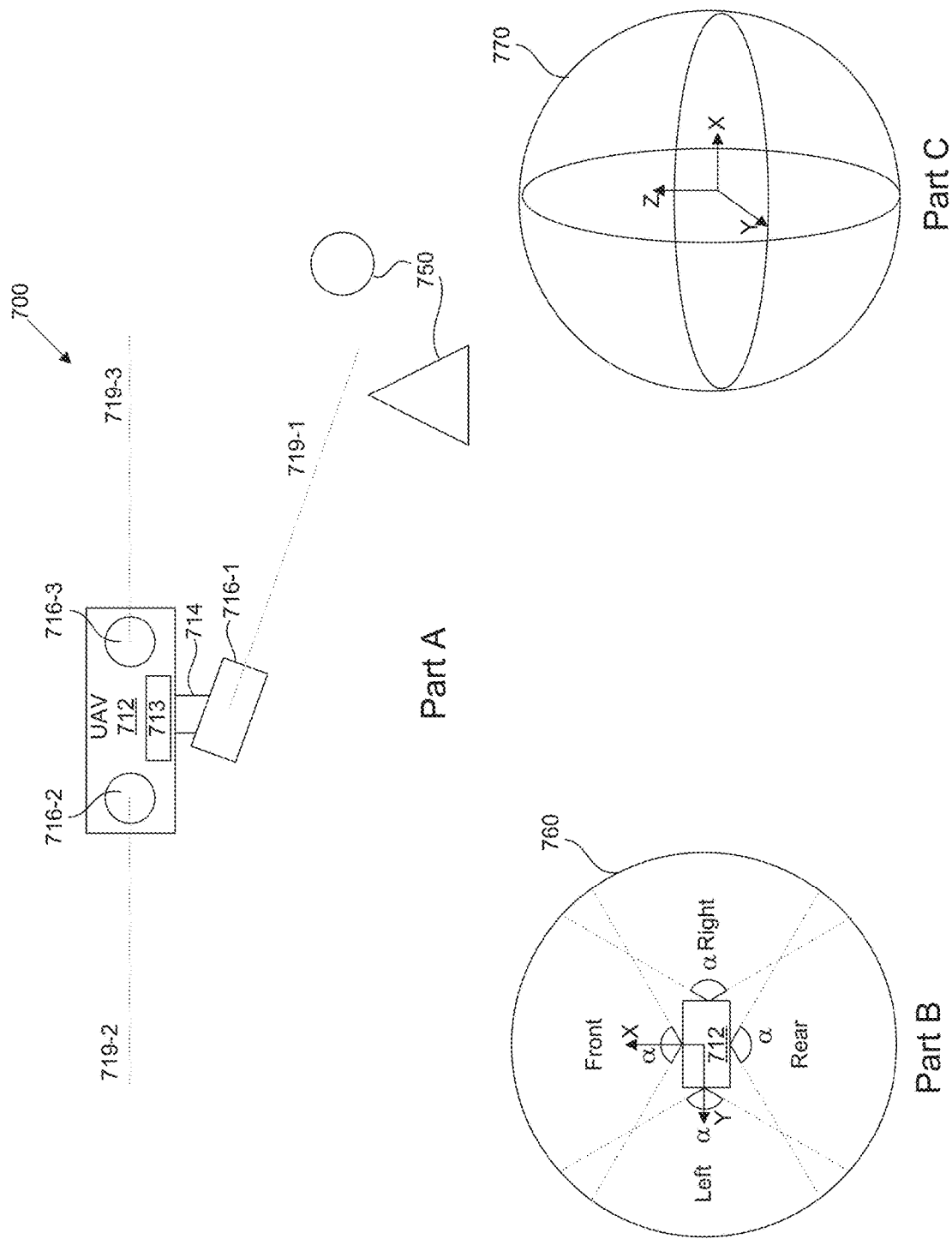
FIG. 7 illustrates an example of a UAV comprising an environmental sensing unit and its environmental sensing ranges, in accordance with some embodiments.

Part A of FIG. 7 shows an example of a UAV 712 comprising an environmental sensing unit 713 configured to collect information of an environment. The environment may comprise one or more objects 750. One or more cameras 716 may be located on or within a body of the UAV. The cameras 716 may include a binocular vision sensor. The cameras 716 may be part of the environmental sensing unit 713. Binocular images captured by the cameras 716-2 and 716-3 may be used to generate depth map information of the environment. The binocular images may be correlated/calibrated with an image obtained by another camera (e.g., camera 716-1). The cameras 716 may be disposed at different locations relative to each other such that the cameras have different optical axes. For example, the camera 716-1 may have a first optical axis 719-1, the camera may have a second optical axis 719-2, and the camera 716-3 may have a third optical axis 719-3. The optical axes 719 may extend in different directions. For example, the first optical axis may extend towards a group of objects 750 in the environment. The second optical axis may extend from a rear portion of the UAV, and the third optical axis may extend from a front portion of the UAV.

A depth map may be generated using the binocular images, by stereo matching of a left-eye image and a right-eye image. The left-eye image and right-eye image may be matched to obtain a depth image in which the position of obstacles/objects in the environment can be detected. In some embodiments, a depth map may be generated using the multiple imaging devices disposed at a plurality of locations on a UAV. The stereo matching may be performed using real-time block matching (BM) or semi-global block matching (SGBM) algorithms implemented using one or more processors. In some embodiments, ultrasonic data from an ultrasonic sensor may be additionally used to detect the position/distance of objects that lack obvious texture (e.g., a binocular vision camera may not be capable of detecting the position of a white-colored wall, or a glass wall).

A 3D map of the external environment may be generated by correlating the binocular image or any image to the depth map. For example, the left-eye image and/or the right-eye image may be mapped to the depth map. In some cases, the image captured by the camera 716-1 (payload) may be mapped to the depth map. The depth map may comprise a plurality of pixel points. A valid pixel point may correspond to an obstacle in the external environment. The relationship between pixel points and obstacles may be one-to-many or many-to-one. For example, a valid pixel point may correspond to a plurality of obstacles. Alternatively, a plurality of valid pixel points may correspond to an obstacle. In some cases, a group of valid pixel points may correspond to a group of obstacles. A valid pixel point has a value that is greater than 0. Conversely, an invalid pixel point is a point that is unidentifiable from the mapped image. An invalid pixel point has a value that is equal to or less than 0. Objects that have no obvious texture or are transparent may show up invalid pixel points in the image. In some embodiments, ultrasonic data from ultrasonic imaging may be used to supplement the visual correlation to identify those invalid pixel points. The ultrasonic imaging may be performed, for example using a lidar sensor located on the UAV. Ultrasonic data from the ultrasonic sensor can be used to detect the position/distance of an object having no obvious texture or that is transparent.

Next, 3D spatial points corresponding to the pixel points in the depth map may be generated. A 3D spatial point corresponding to a pixel point in the depth map may be given by:

$$\begin{pmatrix} X \\ Y \\ Z \end{pmatrix} = \begin{pmatrix} d(x-c_x)/f \\ d(y-c_y)/f \\ d \end{pmatrix}, \text{ if } d > 0.$$

where d is a depth in the depth map, f is a focal length of the imaging device, $(c_x, c_y)$ is an offset from a central point (centroid) of the UAV, and (x, y) is the pixel point on the depth map. A plurality of 3D spatial points may be distributed into a plurality of cells of an occupancy grid. The position of the UAV may be located at the center of the occupancy grid. In some cases, the position of the UAV may be located another portion (e.g., edge) of the occupancy grid. The occupancy grid may be used to define a 3D map of the spatial environment surrounding the UAV.

The occupancy grid may have plurality of cells. The occupancy grid may have a size of $n_x \times n_y \times n_z$, where $n_x$ is the number of cells along an x-axis, $n_y$ is the number of cells along a y-axis, and $n_z$ is the number of cells along a z-axis. $n_x$, $n_y$, and $n_z$ may be any integer, and may be the same or different. In some embodiments, $n_x = n_y = 80$ and $n_z = 40$. In some embodiments, $n_x$ and $n_y$ may be less than 80 or greater than 80. In some embodiments, $n_z$ may be less than 40 or greater than 40. Each cell in the occupancy grid may have a size of m×m×m, where m may be any dimension. In some embodiments, m may be less than or equal to 0.1 meters, 0.2 meters, 0.3 meters, 0.4 meters, 0.5 meters, or 1 meter. In some embodiments, m may be greater than 1 meter, 1.1 meter, 1.2 meter, 1.3 meter, 1.4 meter, 1.5 meter, or 2 meters.

The occupancy grid may have i number of cells, where $i = n_x \times n_y \times n_z$. Each cell may be denoted as an i-th cell. For example, i=1 may denote a first cell, and i=10 may denote a tenth cell. For each i-th cell, the number of 3D spatial points falling into the cell may be determined. A 3D map of the environment may be generated by determining, for each i-th cell, whether a number of 3D spatial points falling within the i-th cell is greater than a predetermined threshold value τ. Each i-th cell may have a binary state $C_i$. When the number of 3D spatial points falling within the i-th cell is greater than the predetermined threshold value τ, then $C_i = 1$. When the number of 3D spatial points falling within the i-th cell is equal to or less than the predetermined threshold value τ, then C=0. The predetermined threshold value τ may be determined based on a sampling frequency of the captured images, and an accuracy of the 3D spatial point as obtained from the depth map. The predetermined threshold value τ may increase when the sampling frequency increases and when the number of 3D spatial points falling within the cell increases. The predetermined threshold value τ may decrease when the accuracy of the 3D spatial point increases. The predetermined threshold value τ may have a range of values. For example, the predetermined threshold value may range from about 5 to about 30. In some cases, the predetermined threshold value may range from less than 5 to more than 30.

As previously mentioned, ultrasonic data may be used to supplement the visual correlation to identify invalid pixel points. When a valid ultrasonic reading $d_s$ is detected, the state $C_i$ of all cells having a distance of $d_s$ within the sonar range may be set to 1.

FIG. 7 further illustrates an environmental sensing range of a UAV in accordance with some embodiments. Part B of FIG. 7 shows the environmental sensing range of a UAV from an aerial view as viewed from above the UAV. Part C of FIG. 7 shows the environmental sensing range of the UAV in 3-dimensional space. The UAV may be configured to operate in an environment, as described elsewhere herein.

Referring to part B of FIG. 7, an environmental sensing unit may comprise a plurality of cameras coupled to different sides of the UAV. For example, the plurality of cameras may be coupled to at least a front, rear, left, right, bottom, and/or top side of the UAV. Each camera may have an angle of view a. The maximum environmental sensing range may be determined based on the angle of view a (horizontally, vertically, and diagonally) and image sensor size within each camera. The environmental sensing range may be defined by a circle 760 (planar view in part B) or a sphere 770 (3-dimensional view in part C). It should be noted that the environmental sensing range can be defined by any shape and/or size. For example, in some embodiments, the environmental sensing range can have defined by a regular shape (e.g., cube, cylinder, cone, etc.) or an irregular shape surrounding the UAV.

In some cases, the field of view of adjacent cameras may overlap with one another, for example as shown in part B of FIG. 7. The overlap in the field of view ensures that sufficient image data points of the environment can be collected, from which an environmental map can be constructed with a certain level of accuracy. In some alternative cases, the field of view of adjacent cameras need not overlap with one another.

The plurality of cameras may be configured to capture binocular or multi-ocular images of the environment surrounding the UAVs. One or more of the cameras may capture images at a same time instance or at different time instances. A 3-D depth map of the environment can be obtained from the binocular or multi-ocular images. The plurality of cameras may provide a field of view of n degrees. In some embodiments, n may be about 90°, 100°, 110°, 120°, 130°, 140°, 150°, 160°, 170°, 180°, 190°, 200°, 210°, 220°, 230°, 240°, 250°, 260°, 270°, 280°, 290°, 300°, 310°, 320°, 330°, 340°, 350°, or 360°. Any value for n may be contemplated. When n is 360°, complete-surround environmental sensing can be obtained. In some cases, the environmental sensing range may be defined by a sphere having a predetermined radius from the center of the UAV. The predetermined radius may range from several meters to hundreds of meters. For example, the predetermined radius may be about 1 m, 5 m, 10 m, 20 m, 30 m, 40 m, 50 m, 60 m, 70 m, 80 m, 90 m, 100 m, 200 m, 300 m, 400 m, 500 m, or any values therebetween. In some cases, the predetermined radius may be less than 1 m or greater than 500 m. Any value for the predetermined radius may be contemplated. In some embodiments, the environmental sensing range may depend on an environmental complexity of the environment in which the UAV operates. The environmental sensing range can dynamically adjust as the UAV moves through different environments. For example, when the UAV is moving in an environment comprising a large number of objects or obstacles, the environmental sensing range may be extended, and/or a sensitivity level (e.g., resolution) of the environmental sensing may be increased. Conversely, when the UAV is moving in an environment comprising a low number of objects or obstacles, the environmental sensing range may be reduced, and/or a sensitivity level (e.g., resolution) of the environmental sensing may be decreased.

In FIG. 7, the plurality of cameras mounted on different sides of the UAV may collectively constitute an onboard binocular stereo vision sensing system. In some embodiments, the environmental sensing unit may comprise other sensors (such as ultrasonic sensors, radar, laser, and infrared sensors) that can perform the same environmental sensing function, and that can substitute for the binocular stereo vision sensing system. In some embodiments, those other sensors (e.g., ultrasonic sensors, radar, laser, and infrared sensors) may be used in conjunction with the binocular stereo vision sensing system to further increase the sensitivity and/or range of the environmental sensing.

Accordingly, the environmental sensing unit as disclosed herein can provide, precisely and in real-time, environmental information ranging from tens of meters to several hundreds of meters surrounding the UAV. The environmental information may include distances of the UAV from various objects in the environment, as well as distances between objects within the environment. Each UAV can be configured to operate autonomously using the environmental information collected via an environmental sensing unit onboard the UAV.

Referring back to FIG. 2, the broadcasting end comprising the plurality of UAVs 212 may be configured to transmit the video data to a control hub 220. In some embodiments, the UAVs may transmit a broadcast request to the control hub prior to transmitting the video data. The control hub may be configured to receive the broadcast request from the broadcasting end, and process the broadcast request based on one or more operational parameters at the broadcasting end. In some embodiments, the operational parameters may comprise (1) a first set of parameters associated with operation of the one or more UAVs, and (2) a second set of parameters associated with an environment in which the one or more UAVs are configured to operate. The first set of parameters may comprise at least one of the following: (1) motion path of the UAVs, (2) type of video data to be broadcasted, or (3) permission level of the UAVs to broadcast. The second set of parameters may comprise environmental conditions at the broadcasting end. The environmental conditions may be provided in the environmental information obtained by the UAVs, as described elsewhere herein.

In some embodiments, processing the broadcast request by the control hub may comprise determining whether to approve or reject the broadcast request based on the one or more operational parameters. The video data may be broadcasted over one or more channels when the broadcast request is approved. The broadcast request may be approved when one or more parameters selected from the operational parameters satisfy a predefined set of criteria. For example, at least one of the motion paths of the UAVs, type of video data to be broadcasted, permission level of the UAVs to broadcast, or environmental conditions at the broadcasting end may have to satisfy the predefined set of criteria in order for the broadcast request to be approved. The predefined set of criteria may be provided to filter broadcast requests before video data is streamed from the broadcasting end to the viewing end.

In some cases, the video data may not be broadcasted over one or more channels when the broadcast request is rejected. For example, the broadcast request may be rejected when the environmental conditions at the broadcasting end are poor (e.g., due to adverse weather conditions) or when the UAVs fail to meet a required permission level to broadcast. As an example, a UAV may not be permitted to broadcast video data if the UAV is not part of a group of UAVs that operates in a coordinated manner. For example, referring to FIG. 2, if a new UAV (not shown) enters the environment but does not merge into the decentralized swarm configuration with the other UAVs 212, the new UAV may not be permitted to broadcast even if the UAV submits a broadcast request to the control hub.

In some embodiments, the UAVs may transmit a termination request to the control hub when broadcast or collection of the video data has been completed. For example, when the UAVs are collecting video data of a live event (e.g., a competition) and the event is completed, the UAVs may transmit a termination request to terminate the video broadcast. The control hub may be configured to receive the termination request from the broadcasting end, and process the termination request. In some embodiments, the control hub may provide a termination message to a viewing end when the termination request has been processed or approved. The termination message may indicate that transmission of the video data over one or more channels has been terminated.

In some embodiments, one or more channels (for which video broadcast has been terminated) may be recycled, by making the channels available for video data that is being transmitted from another broadcasting end. The other broadcasting end may comprise another group of UAVs that may be capturing live video of a different event that is taking place at a different location.

Master-Slave Configuration

Figure 3:
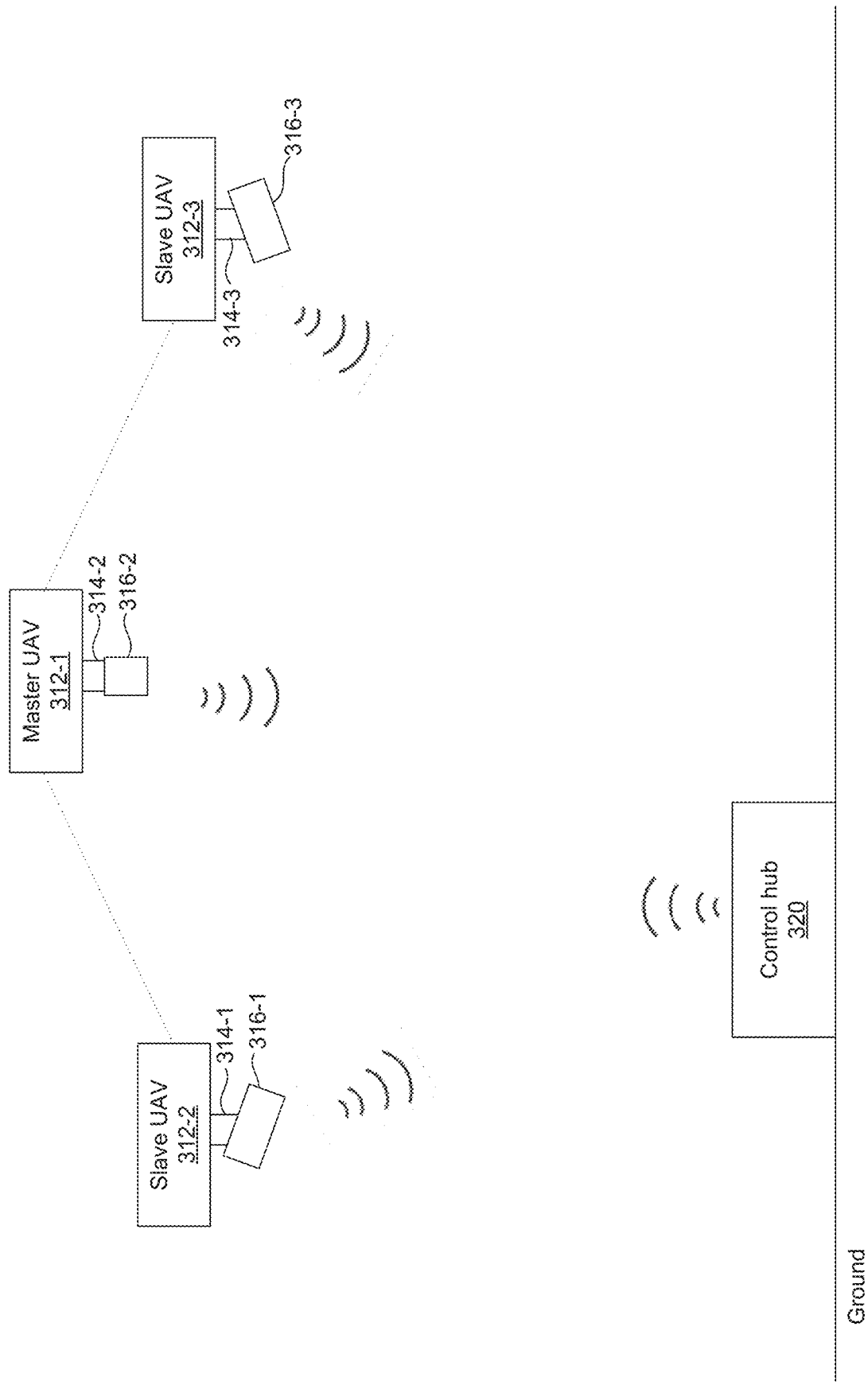
FIG. 3 illustrates an exemplary broadcasting end comprising a swarm of UAVs in a master-slave configuration and in communication with a control hub, in accordance with some embodiments.

FIG. 3 illustrates an exemplary broadcasting end comprising a swarm of UAVs in a master-slave configuration and in communication with a control hub, in accordance with some embodiments. FIG. 3 may be similar to FIG. 2 in that the UAVs 312 are also configured to operate in a coordinated manner. However, unlike the embodiment of FIG. 2, each UAV 312 does not operate autonomously. Instead, the UAVs 312 operate in a master-slave configuration in which a master UAV 312-1 is configured to control one or more slave UAVs 312-2 and 312-3. The master UAV may be operated based on information obtained using one or more sensors onboard the master UAV. The sensors onboard the master UAV may include various types of sensors (e.g., GPS, lidar, cameras, IMU, sonar, etc.) as described elsewhere herein. One or more sensors may be provided in an environmental sensing unit onboard the master UAV. Optionally, one or more sensors may be provided in an environmental sensing unit onboard one or more of the slave UAVs.

The information obtained by the sensors may be related to an environment in which the UAVs 312 operate. The information may comprise (1) a map of the environment, (2) presence or absence of obstacles along navigation paths of the UAVs, and/or (3) weather conditions within the environment. The master UAV may be further configured to control the slave UAVs based on the information. For example, the master UAV may be configured to control take-off and landing of the slave UAVs. The master UAV may also be configured to control an orientation of a camera onboard each of the slave UAVs. For example, the master UAV may adjust an attitude of a gimbal that supports the camera on each of the slave UAVs, in order to control the orientation of the camera. As previously described, the cameras may be configured to collect video data of the environment, a target object, and/or an event. Additionally, the master UAV may be configured to control a flight path of each slave UAV. For example, the master UAV can control the flight path of the slave UAVs by adjusting one or more waypoints for each slave UAV.

In some embodiments, control of the slave UAVs may be transferred from the master UAV to another back-up UAV upon occurrence of one or more conditions that prevent the master UAV from controlling the slave UAVs. The one or more conditions may include: (1) loss of communication between the master UAV and the slave UAV(s), and/or (2) a malfunction or damage to one or more components of the master UAV. The conditions may be detected using one or more sensors onboard the master UAV. For example, the sensors may detect conditions such as free fall, unusual acceleration, unusual velocity, unusual orientation, proximate surfaces or objects, overheating, power loss, low power, guidance/navigation or communication failure, flight control failure, or any other abnormal conditions. In some instances, an orientation of the master UAV may change (1) at a frequency that exceeds a predetermined threshold frequency or (2) in a particular manner. The high frequency orientation changes or wobbling may be indicative of vehicle instability. The vehicle instability may indicate that the UAV may fall soon and/or that impact is imminent. Such conditions may be indicative of a malfunction, in which case it may be desirable to transfer control from the master UAV to the back-up UAV.

Mesh Network

In some embodiments, the UAVs 312 may be in communication with one another via a mesh network. The UAVs may communicate their known locations to one another over the mesh network, in real-time or near real-time, and at fixed or variable intervals. Based on the data communicated over the mesh network, the UAVs can adjust their motion characteristics in order to operate in a coordinated manner (e.g., achieving one or more positional goals in a formation).

Each UAV 312 may be represented individually by a node in the mesh network. The nodes are interconnected with other nodes in the mesh network so that multiple pathways connect each node. Connections between nodes can be dynamically updated and optimized using built-in mesh routing tables. Mesh networks may be decentralized in nature, and each node may be capable of self-discovery on the network. Also, as nodes leave the network, the mesh topology allows the nodes to reconfigure routing paths based on the new network structure. The characteristics of mesh topology and ad-hoc routing provide greater stability in changing conditions or failure at single nodes. For example, when one or more UAVs leave the network, the remaining UAVs can reconfigure new routing paths (or physical flight/motion paths) based on the new network structure. In some embodiments, the network may be a full mesh network where all of the UAVs are meshed and in communication with one another. In other embodiments, the network may be a partial mesh network where only some of the UAVs are meshed and in communication with one another.

The mesh network may be supported by a wireless protocol that can enable broad-based deployment of wireless networks with low-cost, low-power solutions. The protocol may allow communication of data through various radio frequency (RF) environments in both commercial and industrial applications. The protocol can allow UAVs to communicate in a variety of network topologies. The protocol may include features such as: (1) support for multiple network topologies such as point-to-point; (2) point-to-multipoint and mesh networks; (3) low duty cycle to extend battery life; (4) low latency for lower power consumption; (5) Direct Sequence Spread Spectrum (DSSS); (6) up to 65,000 nodes per network; (7) 128-bit AES encryption for secure data connections; and (8) collision avoidance and retries. The low duty cycle can enable the UAVs to operate for a longer period of time since less power is consumed. The high number of nodes (up to 65,000 nodes) allowable in the network can enable a large number of UAVs to be connected and controlled within the mesh network. The collision avoidance and retries capability can help to prevent collisions as UAVs drop in or out of the mesh network (e.g., due to poor signal transmission quality, obstacles blocking signal transmission, powering off of radio transmitters in the UAVs, etc.).

In some instances, the protocol can provide an easy-to-use wireless data solution that is characterized by secure, reliable wireless network architectures. The protocol can be configured to meet the needs of low-cost, low-power wireless machine-to-machine (M2M) networks. Examples of such machines may include UAVs. The protocol may be configured to provide high data throughput in applications where the duty cycle is low and low power consumption is an important consideration. For example, in some cases, some or all of the UAVs may be powered by batteries, where low power consumption is desirable to increase flight time/distance.

In some embodiments, transmission distances for the wireless protocol for the mesh network of UAVs may range from about 10 meters to about 1500 meters line-of-sight (e.g., 10 m, 20 m, 30 m, 40 m, 50 m, 100 m, 200 m, 300 m, 500 m, 800 m, 1000 m, 1200 m, or 1500 m). For indoor applications at 2.4 GHz, transmission distances may range from about 10 m to about 20 m, depending on the construction materials, the number of walls to be penetrated and the output power permitted in that geographical location. Conversely, for outdoor applications with line-of-sight, transmission distance may be up to about 1500 m depending on power output and environmental characteristics. In some alternative embodiments, transmission distances for the wireless protocol for the mesh network of UAVs may be less than about 10 m (e.g., 9 m, 7 m, 5 m, 3 m, 1 m, or less than 1 m). In some further embodiments, transmission distances for the wireless protocol for the mesh network of UAVs may be greater than about 1500 m (e.g., 1600 m, 1700 m, 1800 m, 1900 m, 2000 m, 3000 m, 5000 m, or greater than 5000 m).

In some embodiments, the protocol can be used to transmit data over long distances by passing data through a mesh network of intermediate devices (e.g., intermediate UAVs and/or ground stations) to reach more distant ones. The protocol may be used in low data rate applications that require long battery life and secure networking. In some embodiments, the mesh network may be secured by 128 bit symmetric encryption keys. In some embodiments, the protocol may have data transmission rates ranging from about 20 kbit/s (868 MHz band) to about 250 kbit/s (2.4 GHz band). In some embodiments, the protocol may have a defined rate of 250 kbit/s, that is suited for intermittent data transmissions from the UAVs. In some embodiments, the protocol may have data transmission rates ranging from less than about 20 kbit/s (e.g., 18 kbit/s, 16 kbit/s, 14 kbit/s, 12 kbit/s, 10 kbit/s, 5 kbit/s, or less than 5 kbit/s). In other embodiments, the protocol may have data transmission rates ranging from more than about 250 kbit/s (e.g., 260 kbit/s, 270 kbit/s, 280 kbit/s, 290 kbit/s, 300 kbit/s, 350 kbit/s, 400 kbit/s 500 kbit/s, or more than 500 kbit/s). In some embodiments, the UAVs using the protocol may have low latency, which reduces average current consumption.

In some embodiments, the wireless protocol for supporting the mesh network of UAVs may include the ZigBee standard. The ZigBee standard operates on the Institute of Electrical and Electronics Engineers (IEEE) 802.15.4 physical radio specification and operates in unlicensed bands including 2.4 GHz, 900 MHz and 868 MHz. The IEEE 802.15.4 specification is a packet-based radio protocol intended for low-cost, battery-operated devices. A ZigBee network layer can natively support both star and tree networks, and generic mesh networking. Each network may have one coordinator device, tasked with its creation, the control of its parameters and basic maintenance. Within star networks, the coordinator may be the central node. Both trees and meshes can allow the use of ZigBee routers to extend communication at the network level. ZigBee builds on the physical layer and media access control defined in IEEE standard 802.15.4 for low-rate WPANs. The specification includes four additional key components: network layer, application layer, ZigBee device objects (ZDOs) and manufacturer-defined application objects which allow for customization and favor total integration. ZDOs are responsible for a number of tasks, including keeping track of device roles, managing requests to join a network, as well as device discovery and security.

In some embodiments, the UAVs in the mesh network may be ZigBee devices. The ZigBee devices may comprise a ZigBee Coordinator (ZC), one or more ZigBee Routers (ZR), and/or one or more ZigBee End Devices (ZED).

The ZC serves as the root of the network tree and can form a bridge to other networks. Each mesh network may consist of one ZC. The ZC can store information about the network, and can be used to control the ZRs and the ZEDs. For example, the master UAV may be the ZC. In some embodiments, the role of ZC may be passed from the master UAV to a back-up UAV upon occurrence of one or more conditions that prevent the master UAV from controlling the slave UAVs. As previously described, the one or more conditions may include: (1) loss of communication between the master UAV and the slave UAV(s), and/or (2) a malfunction or damage to one or more components of the master UAV. Any of the UAVs may serve as the ZC, either continuously at all times, periodically at a fixed or variable frequency, or only for a specific time duration. In some embodiments, different UAVs may take turns serving as the ZC (for example, in a round robin like configuration).

The ZR can act as an intermediate router, passing on data from other devices. The ZED may contain sufficient functionality to communicate with the parent node (either the ZC or the ZR). The ZED may not be configured to relay data from other devices. This relationship allows the ZED to be asleep for a significant amount of the time, thereby allowing for long battery life which can enable extended flight/motion time. A ZED requires the least amount of memory, and therefore may be less expensive to manufacture than a ZR or ZC. In some embodiments, the master UAV may be selected as the ZC, and the slave UAVs may be selected as ZRs or ZEDs. Any arrangements/roles/configurations of the UAVs in the ZigBee mesh network may be contemplated.

In some embodiments, the ZigBee protocol can support beacon networks and also non-beacon enabled networks. In non-beacon-enabled networks, an unslotted carrier sense multiple access with collision avoidance (CSMA/CA) channel access mechanism may be used. The CSMA/CA channel access mechanism is a network multiple access method in which carrier sensing is used, but nodes attempt to avoid collisions by transmitting only when the channel is sensed to be idle. When the nodes transmit data, they transmit their packet data in its entirety. In this type of network, the ZigBee Routers (ZRs) typically have their receivers continuously active, requiring a more robust power supply. This may allow for heterogeneous networks in which some devices receive continuously, while others only transmit when an external stimulus is detected.

In contrast, for beacon-enabled networks, the ZRs transmit periodic beacons to confirm their presence to other network nodes. Nodes may sleep between beacons, thus lowering their duty cycle and extending their battery life which can extend flight/motion time. Beacon intervals depend on data rate. For example, beacon intervals may range from about 15 milliseconds to about 251 seconds at about 250 kbit/s, from about 24 milliseconds to about 393 seconds at about 40 kbit/s, and from about 48 milliseconds to about 786 seconds at about 20 kbit/s.

Accordingly, the ZigBee protocols can minimize the time the radio is on, so as to reduce power use by the UAVs. In beaconing networks, nodes only need to be active while a beacon is being transmitted. In non-beacon-enabled networks, power consumption is decidedly asymmetrical (e.g., some UAVs are always active, while others spend most of their time in sleep mode).

Ground Station Control of UAVs

Figure 4:
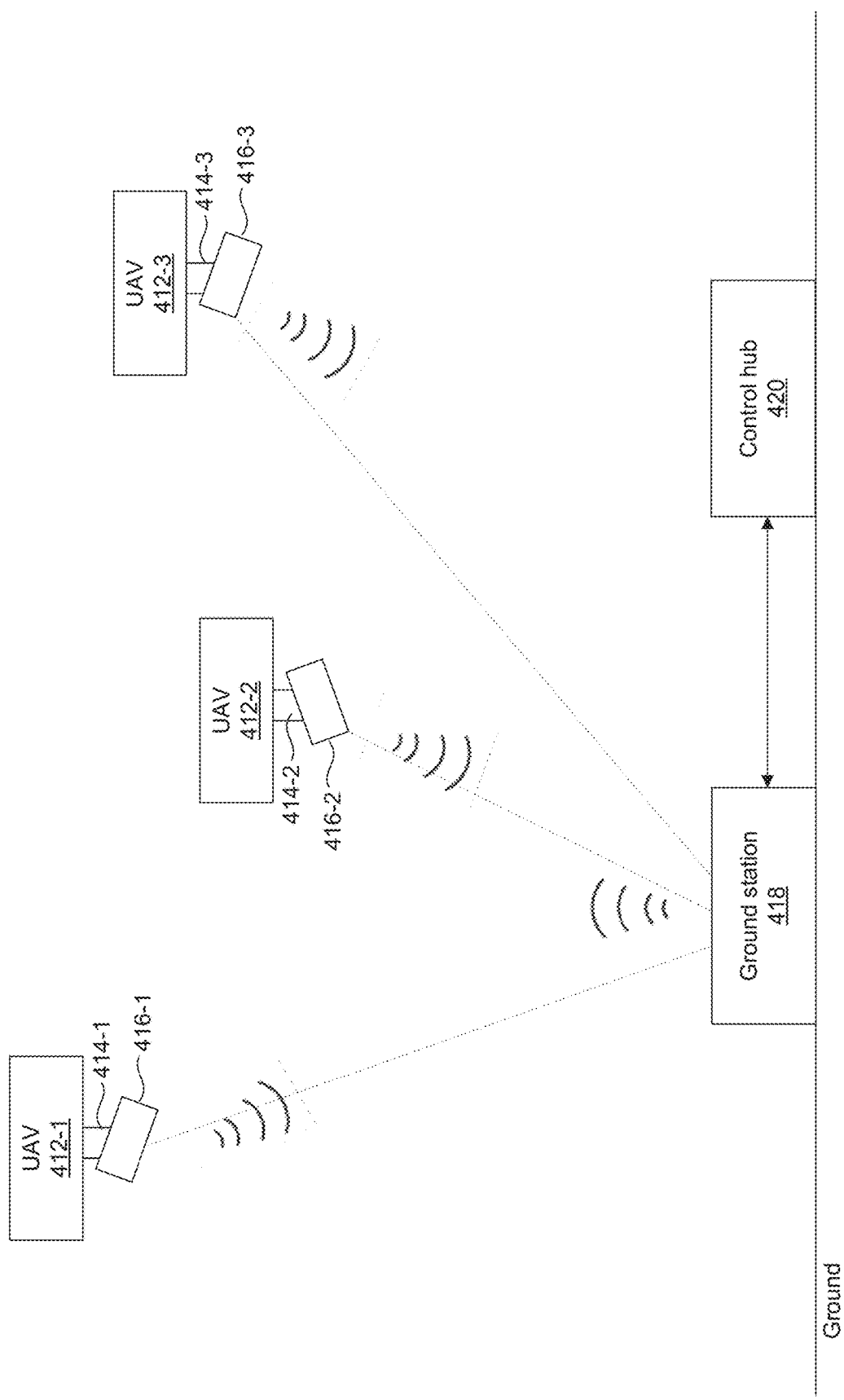
FIG. 4 illustrates an exemplary broadcasting end in which a ground station is configured to control a plurality of UAVs, in accordance with some embodiments.

FIG. 4 illustrates an exemplary broadcasting end in which a ground station is configured to control a plurality of UAVs, in accordance with some embodiments. A ground station 418 may be configured to control the formation, alignment, or collaboration of a plurality of UAVs 412. Each of the UAVs 412 may be in communication with the ground station, and controlled by the ground station. The UAVs may or may not be in communication with one another.

In some embodiments, the UAVs may be operated in a coordinated manner by the ground station. For example, the ground station can control the flight of the UAVs in order to maintain or achieve a positional goal between the UAVs. The positional goal may include a predetermined distance between the UAVs. The positional goal may include a predetermined attitude and/or orientation of the UAVs relative to one another. The UAVs may be operated such that UAVs move in a predetermined formation. For example, the UAVs may be aligned relative to one another in the predetermined formation.

The ground station may also control the UAVs to follow a plurality of predetermined trajectories when moving in the predetermined formation. The plurality of predetermined trajectories may comprise a plurality of spatial points. Each spatial point may have a set of known global spatial coordinates. The plurality of UAVs may travel through the corresponding plurality of spatial points at substantially a same time or at different times.

In some embodiments, the ground station may control the UAVs to cooperatively work together to perform one or more tasks. In some cases, the tasks may comprise the collection of video data from different aerial viewpoints using cameras supported on the UAVs. Each UAV may be configured to collect and transmit video data to the ground station. Additionally, the UAVs may be configured to transmit operational data associated with the UAVs to the ground station. The operational data may include positional and/or motion characteristics of the UAVs or payloads (e.g., cameras) mounted onto the UAVs. For example, the operational data may include a position, attitude, navigation path, heading, altitude, motion characteristics (e.g., velocity and acceleration), and/or state of charge of the one or more UAVs. Additionally, the operational data may include a position, attitude, and/or motion characteristics (e.g., angular velocity and acceleration) of one or more carriers (e.g., gimbals) that are mounted on the UAVs. The carriers may be configured to support one or more cameras for collecting the video data. In some embodiments, the UAVs may be configured to transmit environmental information to the ground station. The environmental information may be indicative of the environment in which the UAVs operate. For example, the environmental information may include a 3D map of the environment, presence or absence of obstacles along a flight path of the UAVs, and/or weather conditions.

The video data may comprise live video that is being collected by the UAVs 412. The live video may be broadcasted over one or more channels. The video data may comprise 2-D video, 3-D video, stereoscopic video, multi-view video, panoramic video, spherical video, video provided from a first person view (FPV), or any combinations thereof. The video data may be encoded using one or more encoders located onboard the UAVs, and the UAVs may be configured to transmit the encoded video to the ground station. Alternatively, the UAVs may transmit raw video to the ground station, and one or more encoders located at the ground station may be configured to encode the raw video before transmitting the video data to the control hub or the viewing end.

The ground station 418 may be configured to transmit data (e.g., video data, environmental data, UAV operational data) to a control hub 420. The control hub may be configured to manage transmission of data between the broadcasting end and a viewing end. For example, the control hub may receive video data from the ground station. The control hub may be configured to manage the distribution and transmission of data over one or more channels. The channels may include wired communication channels, wireless communication channels, and/or internet protocol (IP) addresses. The data may be transmitted over the channels using one or more network protocols.

Ground Station and Master-Slave UAV Control

Figure 5:
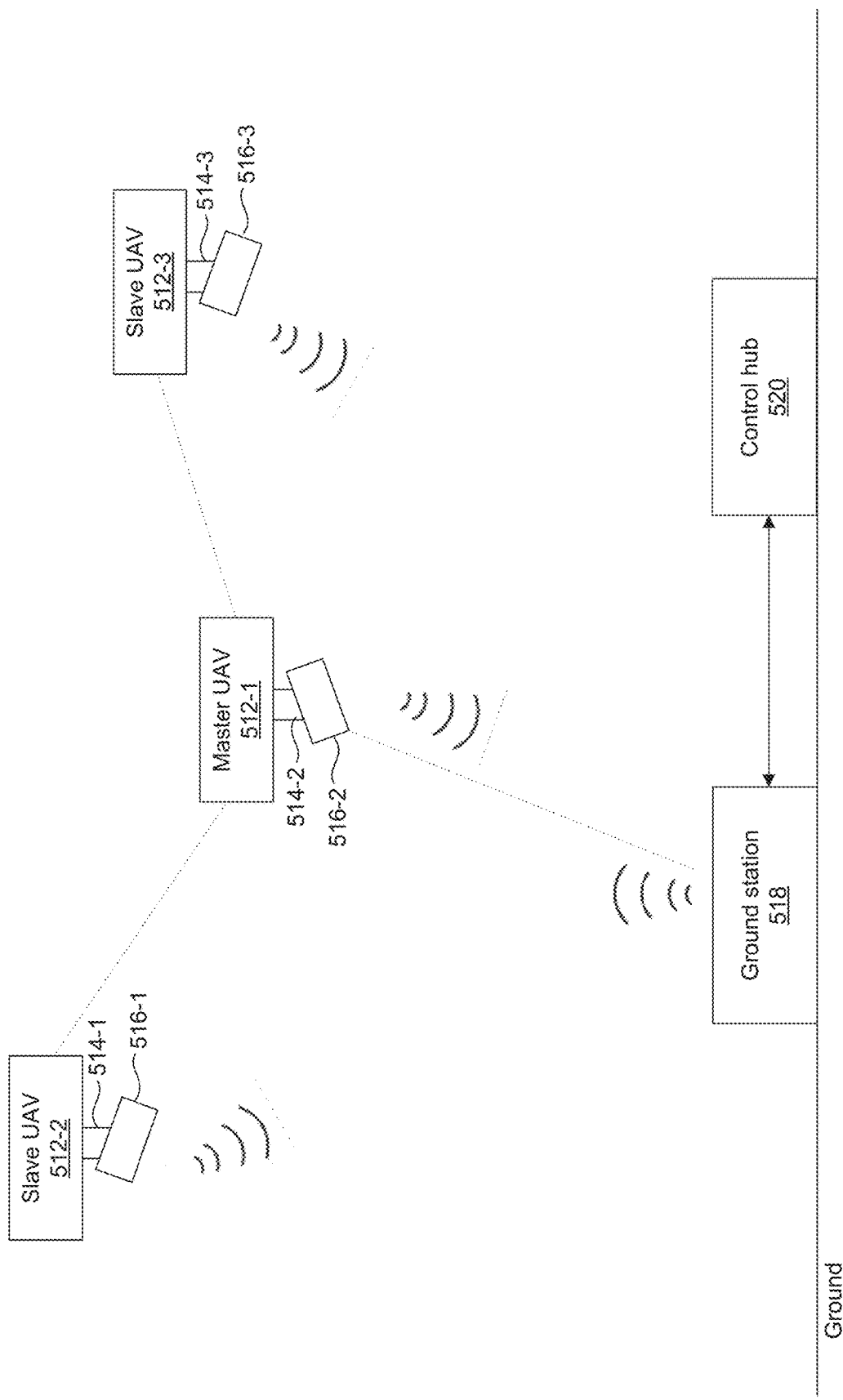
FIG. 5 illustrates an exemplary broadcasting end comprising a ground station in communication with a control hub and a swarm of UAVs in a master-slave configuration, in accordance with some embodiments.

FIG. 5 illustrates an exemplary broadcasting end comprising a ground station in communication with a control hub and a swarm of UAVs in a master-slave configuration, in accordance with some embodiments. FIG. 5 may be similar to FIG. 4 except for the following differences. In FIG. 5, a ground station 518 may be in communication with a plurality of UAVs 512. The ground station may be in two-way communication with a master UAV 512-1. For example, the ground station may transmit control instructions to the master UAV via an uplink, and receive data that is transmitted from the master UAV via a downlink. The master UAV may be configured to control the slave UAVs 512-2 and 512-3, as previously described in FIG. 3. The ground station may or may not be communication with the slave UAVs. In some cases, the communication between the ground station and the slave UAVs may proceed in only one direction (i.e., one-way communication). For example, the ground station may be configured to only receive data (e.g., video data) that is transmitted from the slave UAVs via a downlink.

In some embodiments, the control of the slave UAVs may be transferred from the master UAV to the ground station upon occurrence of one or more conditions that prevent the master UAV from controlling the slave UAVs. The one or more conditions may include: (1) loss of communication between the master UAV and the slave UAV(s), and/or (2) a malfunction or damage to one or more components of the master UAV. The ground station may be configured to select the back-up UAV from among the slave UAVs to replace the master UAV upon occurrence of the one or more conditions. The selected back-up UAV may assume the role of the new master UAV, and can be configured to control the remaining slave UAVs. In some embodiments, the ground station may be configured to select the back-up UAV from a look-up table containing a list of the slave UAVs and their priority levels. The look-up table may be stored in a memory that is located at the ground station. Alternatively, the look-up table may be stored remotely in a memory that is accessible by the ground station. The priority levels may be used to determine an order in which the slave UAVs are selected to replace the master UAV. As an example, the slave UAV 512-2 may have a higher priority level than the slave UAV 512-3. Accordingly, the ground station may select the slave UAV 512-2 to be the back-up UAV (new master UAV) when the master UAV 512-1 is unable to continue performing its role.

In some embodiments, the ground station may control the master UAV. The master UAV may in turn control the slave UAVs such that the UAVs operate in a coordinated manner. The master UAV may be operated based on information (e.g., environmental information) obtained using one or more sensors onboard the master UAV. Alternatively, the master UAV may be operated based on information and/or instructions provided by the ground station. The master UAV may in turn control the slave UAVs based on the information and/or instructions, as described elsewhere herein.

In some embodiments, the ground station may control the master UAV, and the master UAV may control the slave UAVs to cooperatively work together to perform one or more tasks. In some cases, the tasks may comprise the collection of video data from different aerial viewpoints using cameras supported on the UAVs. Each UAV may be configured to collect and transmit video data to the ground station. Additionally, the UAVs may be configured to transmit operational data associated with the UAVs to the ground station. The operational data may include positional and/or motion characteristics of the UAVs or payloads (e.g., cameras) mounted onto the UAVs. For example, the operational data may include a position, attitude, navigation path, heading, altitude, motion characteristics (e.g., velocity and acceleration), and/or state of charge of the one or more UAVs. Additionally, the operational data may include a position, attitude, and/or motion characteristics (e.g., angular velocity and acceleration) of one or more carriers (e.g., gimbals) that are mounted on the UAVs. The carriers may be configured to support one or more cameras for collecting the video data. In some embodiments, the UAVs may be configured to transmit environmental information to the ground station. The environmental information may be indicative of the environment in which the UAVs operate. For example, the environmental information may include a 3D map of the environment, presence or absence of obstacles along a flight path of the UAVs, and/or weather conditions.

The video data may comprise live video that is being collected by the UAVs 512. The live video may be broadcasted over one or more channels. The video data may comprise 2-D video, 3-D video, stereoscopic video, multi-view video, panoramic video, spherical video, video provided from a first person view (FPV), or any combinations thereof. The video data may be encoded using one or more encoders located onboard the UAVs, and the UAVs may be configured to transmit the encoded video to the ground station. Alternatively, the UAVs may transmit raw video to the ground station, and one or more encoders located at the ground station may be configured to encode the raw video before transmitting the video data to the control hub or the viewing end.

The ground station 518 may be configured to transmit data (e.g., video data, environmental data, UAV operational data) to a control hub 520. The control hub may be configured to manage transmission of data between the broadcasting end and the viewing end. For example, the control hub may receive video data from the ground station. The control hub may be configured to manage the distribution and transmission of data over one or more channels. The channels may include wired communication channels, wireless communication channels, and/or internet protocol (IP) addresses. The data may be transmitted over the channels using one or more network protocols.

Network of Ground Stations and UAVs

Figure 6:
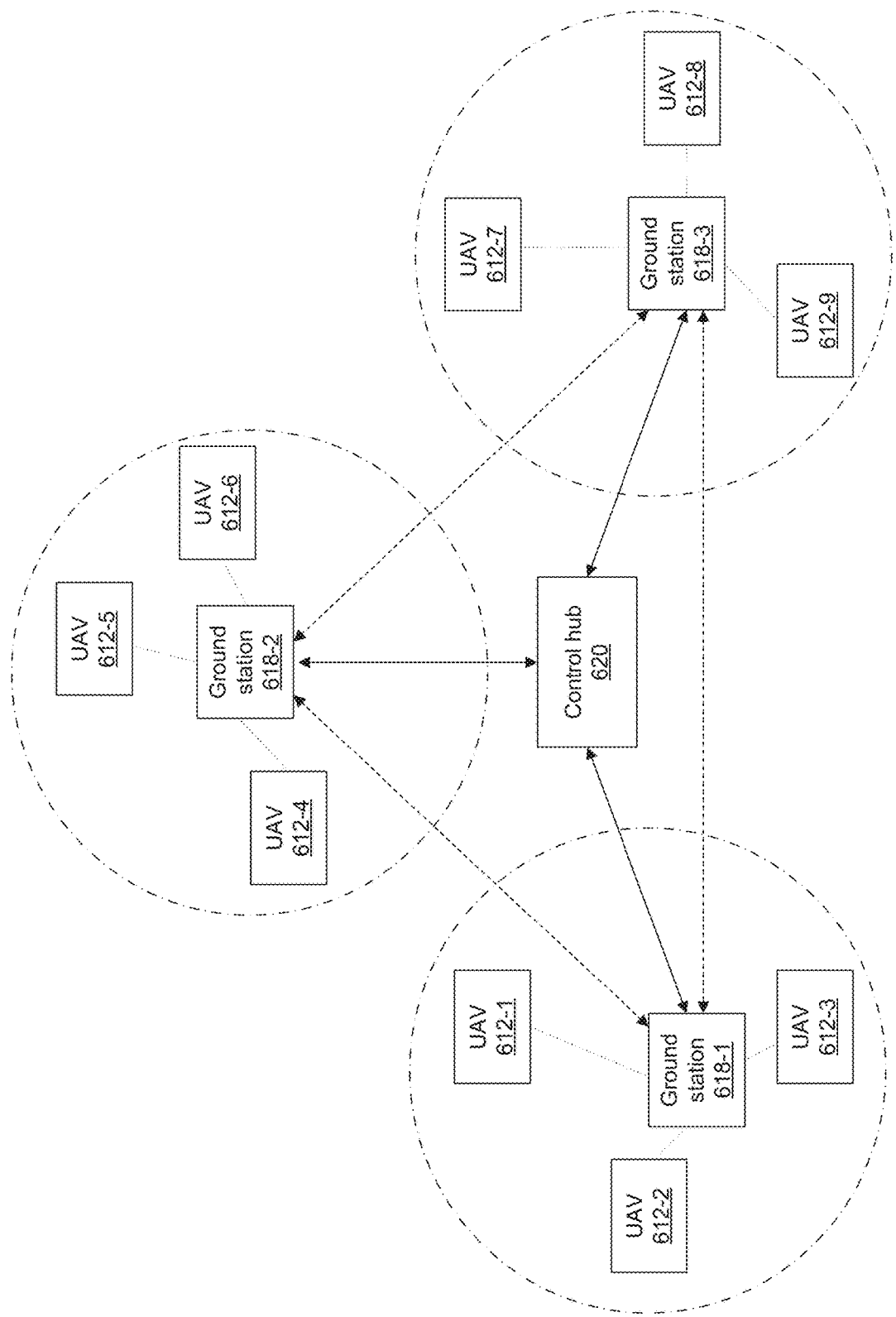
FIG. 6 illustrates a broadcasting system in which a control hub is in communication with a plurality of ground stations and UAVs, in accordance with some embodiments.

FIG. 6 illustrates a broadcasting system in which a control hub is in communication with a plurality of ground stations and UAVs, in accordance with some embodiments. The broadcasting end may comprise a plurality of ground stations and UAVs. The plurality of ground stations may be in communication with a control hub, and connected together in a network.

The control hub may be configured to process broadcast requests from the broadcasting end, as described elsewhere herein. Once the broadcast requests are approved, the control hub may be configured to manage data transmission from the broadcasting end based on network conditions at the broadcasting end. The network conditions may comprise network connectivity between the broadcasting end and a content server. The network conditions can be determined based on one or more parameters at the broadcasting end, such as: (i) a type of environment where the broadcasting end is located, (ii) location of the UAVs at the broadcasting end within the environment, (iii) location of the UAVs relative to one or more ground stations, (iv) type of signal transmission at the broadcasting end, and/or (v) strength of signal transmission or reception at the broadcasting end.

The content server may or may not be located at the control hub. In some embodiments, the broadcasting end may be connected to the content server via an access point. The broadcasting end may be connected to the content server via a wireless network. The wireless network can be, for example a WiFi network or a cellular network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The network conditions may comprise network connectivity between the plurality of UAVs and the plurality of ground stations. In some embodiments, the broadcast data may be directed to one or more relay points when the network conditions at the broadcasting end are below a predetermined threshold. The broadcast data may also be directed to one or more nearest relay points based on a location of the broadcasting end. In some cases, the location of the broadcasting end can change dynamically as the plurality of UAVs move relative to the ground stations. The relay points can be configured to forward and/or amplify transmission signals for carrying the broadcast data. The relay points may include one or more intermediate nodes, such as a remote controller, a ground station, a relay, a router, a base station, a handheld device, and any suitable hardware device that is capable of forwarding broadcast data from the broadcasting end to the control hub.

In some embodiments, when the broadcasting end has a good network connection with the content server/access point, the broadcasting end can directly transmit the video data to the content server. A good network connection may have one or more of the following characteristics: low communication delay, sufficient bandwidth, low congestion, high admission, and high communication quality. Conversely, when the broadcasting end has a poor network connection with the content server/access point, the broadcasting end can transmit the video data to the content server via one or more relay points. The control hub may be configured to monitor the load of the content server, and dynamically update an IP address to which the video data is sent.

A plurality of broadcasting ends 610 may be provided in FIG. 6. For example, a first broadcasting end 610-1 may comprise a first ground station 618-1 in communication with a group of UAVs 612-1, 612-2, and 612-3. A second broadcasting end 610-2 may comprise a second ground station 618-2 in communication with a group of UAVs 612-4, 612-5, and 612-6. A third broadcasting end 610-3 may comprise a third ground station 618-3 in communication with a group of UAVs 612-7, 612-8, and 612-9. Any number of broadcasting ends comprising any number of ground stations and/or UAVs may be contemplated. The ground stations and/or UAVs may be in communication with the control hub 620. The control hub may be configured to manage the data transmission from each broadcasting end based on network conditions at each broadcasting end. The network conditions may comprise network connectivity between each broadcasting end and one or more content servers. The content server(s) may or may not be located at the control hub 620. The control hub may be in communication with each content server and broadcasting end. When the first broadcasting end 610-1 has a good network connection with the content server/access point, the first broadcasting end can directly transmit the video data collected by the UAVs 612-1, 612-2, and 612-3 to the content server. In some instances, the second broadcasting end 610-2 may have poor connectivity with the content server/access point, for example due to poor signal transmission or reception at the second broadcasting end. In those instances, the second broadcasting end can transmit the video data collected by the UAVs 612-4, 612-5, and 612-6 to the content server via one or more relay points. The relay points can be, for example the first ground station and/or the third ground station.

In some embodiments, a distance between adjacent ground stations may range from about 30 km to about 35 km. In some embodiments, the distance between adjacent ground stations may be less than 30 km, 25 km, 20 km, 15 km, 10 km, or 5 km. In some other embodiments, the distance between adjacent ground stations may be greater than 35 km, 40 km, 45 km, 50 km, 60 km, 70 km, 80 km, or 100 km. In some cases, the range of signal transmission from each ground station may have a circular radius of about 20 km, less than 20 km, or greater than 20 km.

Management of Broadcast Requests and Channel Allocation

Figure 8:
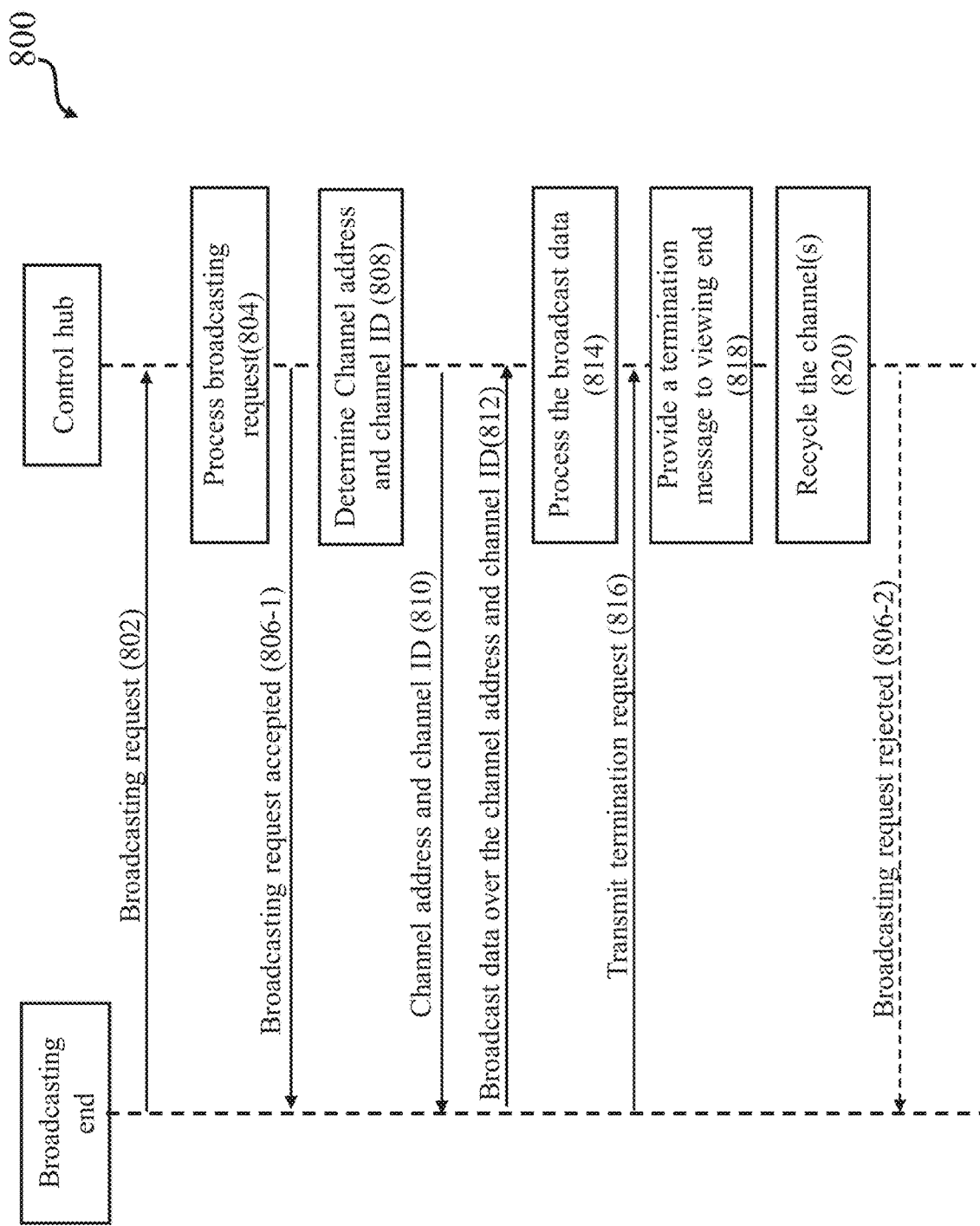
FIG. 8 illustrates an exemplary exchange of information in a video broadcasting system between a broadcasting end and a control hub, in accordance with some embodiments.

FIG. 8 illustrates an exemplary exchange of information in a video broadcasting system 800, in accordance with some embodiments. The exchange of information may occur between a broadcasting end and a control hub. The broadcasting end may transmit a broadcast request to the control hub (802). The control hub may process the broadcast request based on one or more operational parameters at the broadcasting end (804). The operational parameters may comprise (1) a first set of parameters associated with operation of the one or more UAVs, and (2) a second set of parameters associated with an environment in which the one or more UAVs are configured to operate, as described elsewhere herein. In some embodiments, the first set of parameters may comprise: (1) motion path of the UAVs, (2) type of video data to be broadcasted, and/or (3) permission level of the UAVs to broadcast. In some embodiments, the second set of parameters may comprise environmental conditions at the broadcasting end.

The control hub may approve or reject the broadcast request based on one or more operational parameters, as described elsewhere herein. Specifically, the control hub may determine whether the UAVs at the broadcasting end are permitted to broadcast video data to a viewing end.

The control hub may allocate channel resources to the UAVs when the control hub determines that the UAVs are permitted to broadcast video data. For example, when the UAVs are permitted to broadcast video data, the control hub may notify the broadcasting end that the broadcast request is approved (806-1). Conversely, when the UAVs are not permitted to broadcast video data, the control hub may notify the broadcasting end that the broadcast request is rejected (806-2). When the broadcast request is approved, the control hub may determine one or more channel addresses and corresponding channel identities (808). The control hub may further transmit information relating to each channel address and channel ID to the respective UAV at the broadcasting end (810). Each UAV may be configured to broadcast video data over its allocated channel address and channel ID (812).

In some embodiments, the control hub may determine a data transmission or channel allocation manner based on network conditions of the broadcasting end. In some embodiments, if the broadcasting end has good network condition, the control hub may select a channel close to the location of the broadcasting end from "a channel pool" or a list of available broadcasting channels. The control hub may inform the requesting broadcasting end of the selected channel by returning a channel address and a channel identity to the broadcasting end. In some embodiments, the control hub may add the channel address and the channel ID in a header of a packet, and transmit the packet to the broadcasting end. The broadcasting end, in turn, may transmit the video data to the control hub over the allocated channel.

In some embodiments, the control hub may monitor the traffic load from each channel, and determine that one or more channels are overloaded when the traffic load associated with those channels is above a predetermined threshold. In those embodiments, the control hub may select one or more relay nodes that lie closer to the location of the broadcasting end to form a broadcasting path, and further select a channel from the channel pool or a list of available channels. The control hub may then transmit the addresses of the one or more relay nodes and the selected channel ID to the broadcasting end.

In some embodiments, the control hub may update or change the channel address and the channel ID based on one or more factors. The factors may include environmental conditions, traffic load, quality of service (QoS), flight paths of the UAVs, locations of the UAVs and/or ground stations, number of broadcasting ends, etc. For example, when the environmental conditions start to deteriorate (as reported from the broadcasting end), the control hub may prevent video data from being broadcasted over some of the allocated channels until the environmental conditions improve. In some instances, when the traffic load as monitored by the control hub decreases below a predetermined level (for example, an underloaded condition), the control hub may reduce the number of allocated channels and allocate some channels to be reused by other broadcasting ends at other locations. In some instances, when the traffic load as monitored by the control hub is above the predetermined level (for example, an overloaded condition), the control hub may select one or more open channels from the channel pool or a list of available channels.

In some instances, the control hub may allocate, update, change or reallocate the channels so as to meet the expected or desired QoS. For example, after considering QoS requirements with regards to bandwidth, delay, delay jitter, packet loss rate or the like, the control hub may allocate, change or update the channel address and the channel ID such that the video broadcasting over the assigned channel would have a higher QoS level.

The control hub may be configured to process the broadcast data received from the broadcasting end (814). The broadcast data may be processed to generate different types of data, for example, augmented reality (AR)/virtual reality (VR) data, 3-D data, map, graphical user interface (GUI), and/or a program list associated with the video data. In some embodiments, one or more of the aforementioned types of data may be generated at a ground station at the broadcasting end.

In some cases, when the broadcasting end stops collecting video data (e.g., when the UAVs terminate visual tracking of a target or coverage of an event), the broadcasting end may transmit a termination request to the control hub to terminate the video broadcast (816). The control hub may provide a termination message to the viewing end (818). The termination message may be indicative that transmission of the video data over the one or more channels has been terminated. The control hub may recycle those channels by making those channels available for video data that is being transmitted from another broadcasting end (820).

In some instances, the recycling may occur when the broadcasting end releases the allocated channels. For example, the broadcasting end may release the allocated channels when the video broadcasting is completed. In some instances, the recycling may occur when the control hub fails to receive any video broadcast data from the broadcasting end after a predetermined period of time. This may be due to poor connectivity, network congestion, changing environmental conditions, network failure, etc. In those instances, the control hub may automatically withdraw the allocated channel, for example, by returning it back to the channel pool or a list of available channels. After the list of available channels is updated, the control hub may assign the previously withdrawn channel to another broadcasting end for video broadcasting.

Encoding/Decoding of Video Data

Figure 9:
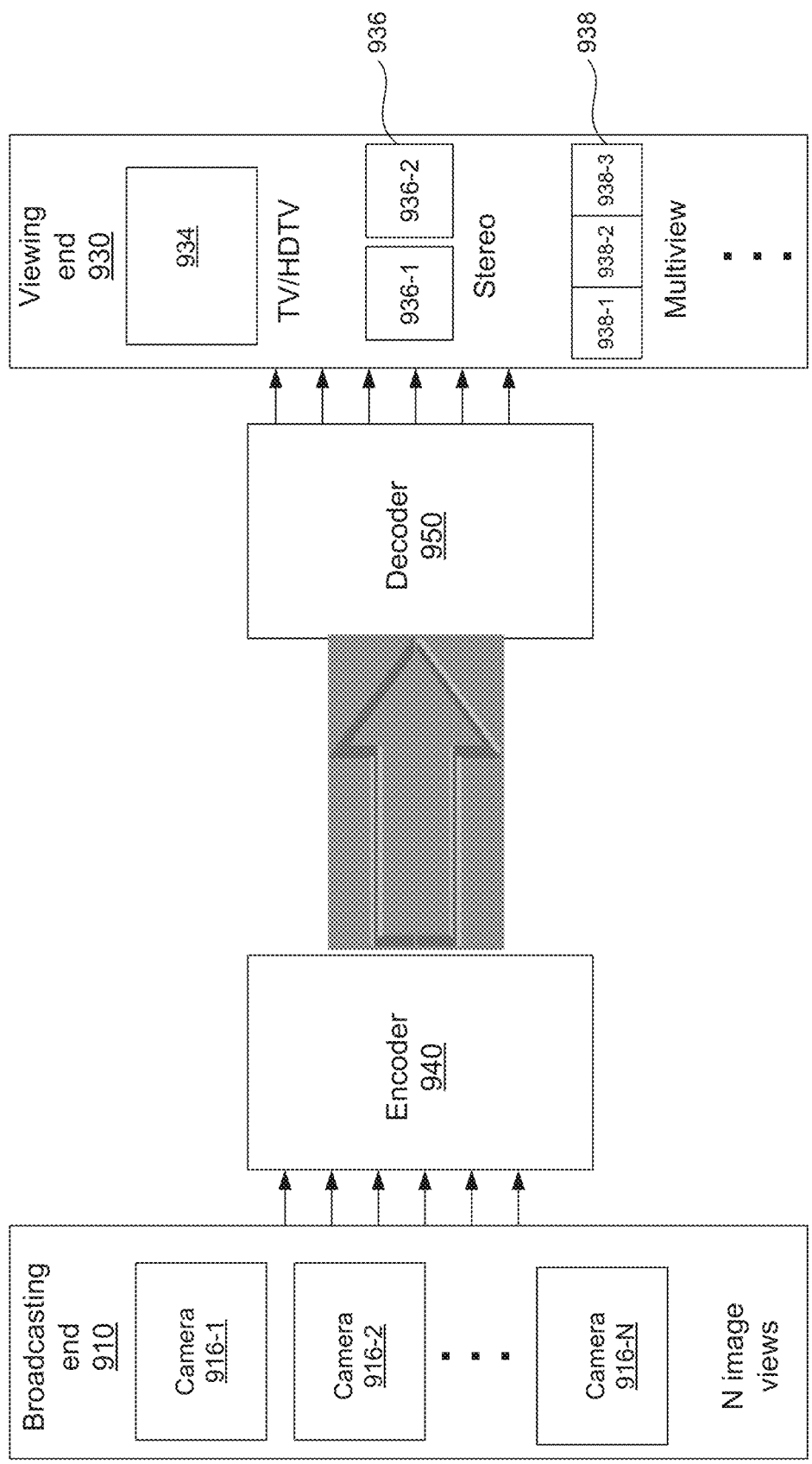
FIG. 9 illustrates the encoding and decoding of video data collected by a broadcasting end, in accordance with some embodiments.

In some embodiments, the processing of data may include encoding and decoding of video data collected by the broadcasting end. For example, referring to FIG. 9, a broadcasting end 910 may comprise multiple (N) image views of an environment, a target object, or an event captured by N cameras (916-1, 916-2, . . . , 916-N). The cameras may be mounted on a plurality of UAVs, as described elsewhere herein. Each UAV may have one or more cameras mounted at different locations of the UAV. The image views may be transmitted to an encoder 940, for example a video encoder. In some embodiments, the encoder may be located on a UAV (e.g., a master UAV) or a ground station at the broadcasting end. In other embodiments, the encoder may be located at the control hub.

In some embodiments, the encoder may be a multiview video coding (MVC) encoder. The encoder may be configured to receive N temporally synchronized video streams and generate a bitstream. The bitstream may be transmitted from the broadcasting end to the viewing end wirelessly via one or more channels. In some instances, the bitstream may be stored on one or more memory units prior to transmission. The bitstream may be transmitted from the encoder 940 to a decoder 950. The decoder may be located at a ground station. Alternatively, the decoder may be located at a control hub. In some embodiments, the decoder may be a multiview video coding (MVC) decoder. The decoder may be configured to receive and decode the bitstream, and output a plurality of video signals to a viewing end 930. The plurality of video signals may comprise different types of video signals. For example, the video signals may comprise: (1) terrestrial television signals 934 for televisions or high-definition TVs, (2) stereoscopic video 936 comprising left-eye images 936-1 and right-eye images 936-2, and/or (3) multiview video 938 comprising a plurality of different images captured from different viewpoints (e.g., 938-1, 938-2, and 938-3). The video signals can be converted into images to be displayed on one or more user terminals at the viewing end. In some embodiments, a user terminal may include a display device capable of displaying stereoscopic image data and/or multiview image data. Alternatively, the display device may be a wearable device such as a head-mounted display or a pair of VR or AR-enabled glasses.

Viewing End

Figure 10:
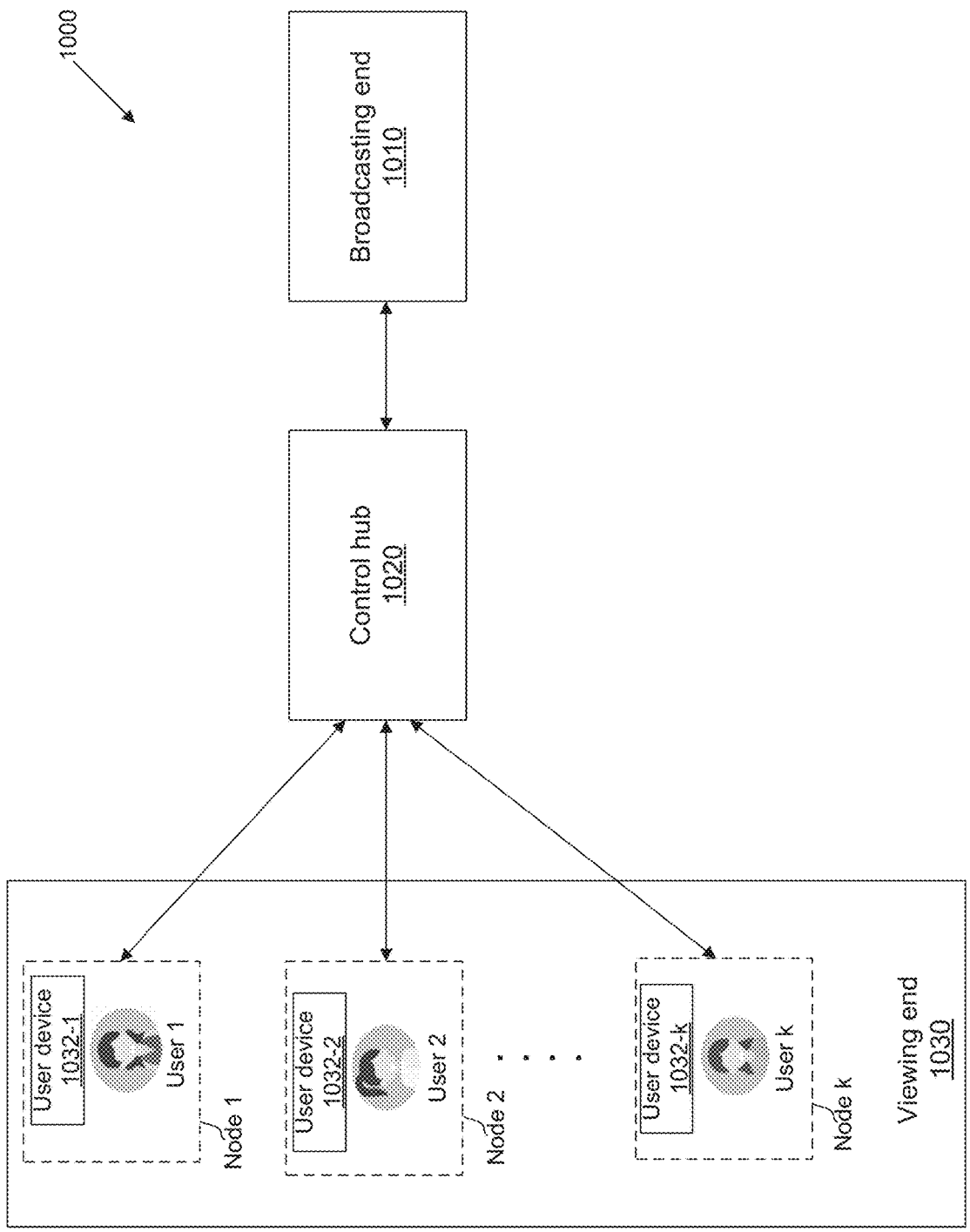
FIG. 10 illustrates a video broadcasting system in which two-way interaction between a viewing end and a broadcasting end is managed by a control hub, in accordance with some embodiments.

Next, the two-way interaction between users at a viewing end with the UAVs at a broadcasting end will be described. FIG. 10 illustrates a video broadcasting system in which two-way interaction between a viewing end and a broadcasting end is managed by a control hub, in accordance with some embodiments. A video broadcasting system 1000 may comprise a broadcasting end 1010, a control hub 1020, and a viewing end 1030, as described elsewhere herein.

The viewing end may comprise a plurality of user terminals 1032. A user terminal may be a computing device that is capable of displaying video that is streamed from one or more UAVs from the broadcasting end. In some embodiments, the user terminal can be used to access one or more webpages on which the video is being streamed. In some other embodiments, the user terminal can be used to display the video in an augmented reality (AR) environment or a virtual reality (VR) environment.

As shown in FIG. 10, the viewing end may include a plurality of user terminals. Each user terminal may be associated with a user. In some embodiments, more than one user may be associated with a user terminal. Alternatively, more than one user terminal may be associated with a user. The users may be located geographically at a same location or at different geographical locations (e.g., different cities, countries, etc.). The users may be located remotely from the broadcasting end.

The viewing end may include a plurality of nodes. Each user terminal at the viewing end may correspond to a node. If a "user terminal 1032" is followed by a number or a letter, it means that the "user terminal 1032" may correspond to a node sharing the same number or letter. For example, user terminal 1032-1 may correspond to node 1 which is associated with user 1, user terminal 1032-2 may correspond to node 2 which is associated with user 2, and user terminal 1032-$k$ may correspond to node k which is associated with user k, where k may be any integer greater than 1.

A node may be a logically independent entity within the viewing end. Therefore, the plurality of nodes in the viewing end can represent different entities. For example, each node may be associated with a user, a group of users, or groups of users. For example, in one embodiment, a node may correspond to an individual entity (e.g., an individual). In some particular embodiments, a node may correspond to multiple entities (e.g., a group of individuals who are viewing video streamed from the broadcasting end).

A user may be registered or associated with an entity that provides services associated with one or more operations performed by the disclosed embodiments. For example, the user may be a registered user of an entity (e.g., a company, an organization, an individual, etc.) that provides or manages the control hub and/or broadcasting end. The disclosed embodiments are not limited to any specific relationships or affiliations between the users and an entity, person(s), or entities that provide or manage servers at the control hub, and/or UAVs or ground stations at the broadcasting end.

In FIG. 10, two-way data transfer capability may be provided between the control hub and each user terminal. The user terminals can also communicate with one another via the control hub (e.g., using a client-server architecture). In some embodiments, the user terminals can communicate directly with one another via a peer-to-peer communication channel. The peer-to-peer communication channel can help to reduce workload on the control hub by utilizing resources (e.g., bandwidth, storage space, and/or processing power) of the user terminals.

A user terminal may be any type of external device. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, or any other type of device. The user terminal may be a handheld object. The user terminal may be portable. The user terminal may be carried by a human user. The user terminal may be worn by a human user. In some cases, the user terminal may be located remotely from a human user, and the user can control the user terminal using wireless and/or wired communications.

A user terminal may include one or more processors that may be capable of executing non-transitory computer readable media that may provide instructions for one or more actions. The user terminal may include one or more memory storage devices comprising non-transitory computer readable media including code, logic, or instructions for performing the one or more actions. The user terminal may include software applications that allow the user terminal to display video that is streamed from the broadcasting end, and that allow users to interact with the UAVs/cameras at the broadcasting end. The user terminal may include a communication unit, which may permit the communications with the control hub and/or broadcasting end. In some instances, the communication unit may include a single communication module, or multiple communication modules. In some instances, the user terminal may be capable of interacting with the control hub and/or broadcasting end using a single communication link or multiple different types of communication links.

A user terminal may be configured to receive input from one or more users. A user may provide an input to a user terminal using an input device, for example, a keyboard, a mouse, a touchscreen panel, a handheld motion controller, a touch-pen, voice recognition and/or dictation software, or any combination of the above. The input may include performing various virtual actions in a displayed video environment. The input may also include interacting with the broadcasting end in real-time, for example by providing instructions to the UAVs/cameras/ground stations. Different users may provide different input to modify or influence the video that is being collected at the broadcasting end, as described later with reference to FIG. 13 through FIG. 16.

Referring to FIG. 10, the control hub may be configured to receive broadcast data from a broadcasting end. The broadcast data may comprise video data collected by a plurality of UAVs. The broadcast data may be transmitted by the UAVs to the control hub over allocated channels. In some embodiments, the broadcast data may be transmitted from one or more ground stations (at the broadcasting end) to the control hub. As previously described, the UAVs may be configured to be (1) operated in a coordinated manner and (2) in communication with the one or more ground stations. The control hub may be configured to stream the video data from the UAVs over allocated channels. In some embodiments, the control hub may be configured to process the broadcast data received from the broadcasting end to generate at least one of the following: augmented reality (AR)/virtual reality (VR) data, 3-D data, map, graphical user interface (GUI), and/or program list associated with the video data. The program list may comprise a list of viewing programs corresponding to different channels via which the video data is being broadcasted.

The control hub may be configured to provide and/or stream the processed broadcast data to the viewing end. The user terminals at the viewing end may be configured to display the broadcast data. In some embodiments, the user terminals may be configured to display video, AR/VR data, 3-D data, a map, and other information collected by the broadcasting end.

Figure 11:
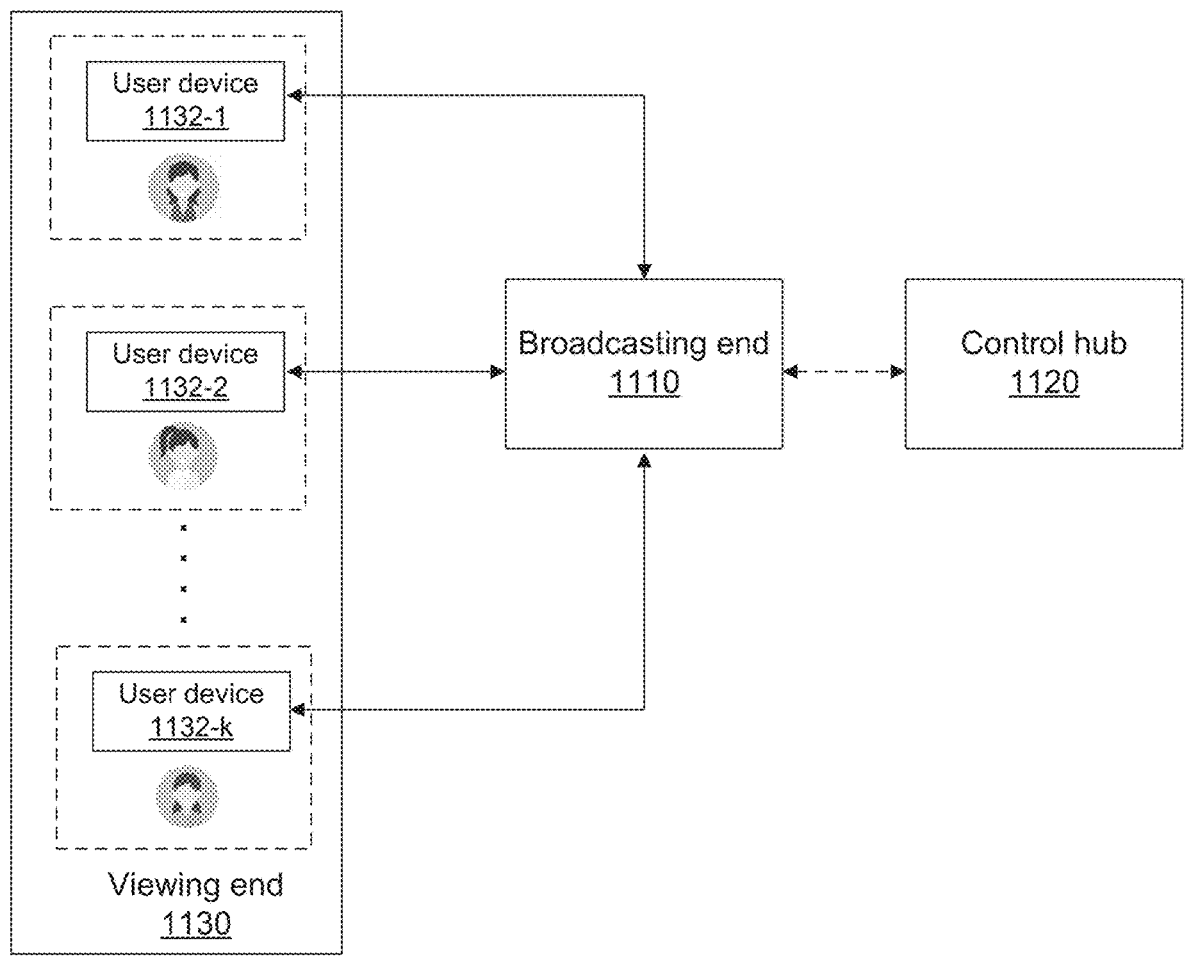
FIG. 11 illustrates a video broadcasting system in which data is transmitted directly between a broadcasting end and a viewing end with aid of a control hub, in accordance with some embodiments.

In the example of FIG. 10, the control hub may be configured to receive and process the broadcast data from the broadcasting end, and transmit the processed broadcast data to users at the viewing end. In some embodiments, the broadcasting end may be configured to directly transmit the broadcast data to the viewing end, after the control hub has approved the broadcast requests and allocated channels for broadcasting. This is illustrated in FIG. 11, which is similar to the one in FIG. 10. Referring to part A of FIG. 11, a control hub 1120 may receive and process a broadcast request from a broadcasting end 1110 as described elsewhere herein. The broadcasting end may comprise a plurality of UAVs. In some cases, the UAVs may be in communication with one or more ground stations. The control hub may approve or reject the broadcast request. If the broadcast request is approved, the control hub may allocate channels to the broadcasting end over which the broadcast data is to be streamed to the viewing end.

After the control hub has allocated the channels to the broadcasting end, the broadcasting end may directly stream the broadcast data to a plurality of users at a viewing end 1130, without having to transmit the data through the control hub. The users may be associated with user devices 1132-1, 1132-2, to 1132-k, where k may be any integer, as previously described. The broadcasting end may continue to be in communication with the control hub, as indicated by the two-way communication (dotted arrow) between the broadcasting end 1110 and the control hub 1120. For example, the broadcasting end may transmit a broadcast termination request to the control hub when the video broadcast has ended (or about to end), such that the control hub can reallocate the channel(s) to another broadcasting end that has available content to broadcast, as described elsewhere herein.

User Interaction with Broadcasting End

In some cases, the users at the viewing end can select one or more viewing programs from a program list through a link displayed on the user terminals. The link may comprise a uniform resource locator (URL) and/or a machine-readable code that allows the users to access the program/video when the link is selected. In some embodiments, the list of programs and the link may be published on one or more webpages on the Internet. The user terminal may be configured to display to the user video data that is being streamed in the one or more viewing programs.

One or more users at the viewing end can view the video on user terminals, and interact with the broadcasting end through a graphical user interface (GUI) provided on the user terminals. In some embodiments, the user terminal may comprise a mobile device or a head-mounted display (HMD). The user terminal may be configured to receive different types of input from a user. The different types of user input may include voice control, motion control, and/or touch (haptic) control. Motion control can be implemented using one or more sensors provided in an inertial measurement unit (IMU) located at the user terminal. The sensors may comprise one or more accelerometers and/or gyroscopes. The user terminal may be configured to display the video data in an augmented reality (AR) or virtual reality (VR) environment. The AR or VR environment may be depicted in a first person view (FPV) captured from one or more UAVs at the broadcasting end.

A user input from the viewing end may be detected when a user interacts with one or more graphical elements embedded within the GUI/video displayed on the user terminal. The user's selection or manipulation of the graphical elements can allow the user to interact with the broadcasting end. The user input may comprise one or more instructions configured for interacting with the broadcasting end. In some embodiments, the control hub may be configured to receive and process the user input from the viewing end, and transmit the processed user input to the broadcasting end to adjust video broadcasting at the broadcasting end.

A user at the viewing end can control one or more UAVs at the broadcasting end via instructions in the user input. The instructions may be configured to control (1) a point of view (POV) and/or (2) motion of one or more UAVs. For example, the POV can be controlled by adjusting an orientation and/or position of one or more UAVs. Alternatively, the POV can be controlled by adjusting an orientation and/or magnification function of one or more cameras supported by one or more UAVs. The motion of one or more UAVs can be controlled by adjusting a motion path and/or motion characteristics of the UAV(s). In some embodiments, the instructions may be configured for controlling the UAVs at the broadcasting end to move in different formations to collect video data from different viewpoints.

In some instances, a user's interaction with the broadcasting end may include the user influencing an outcome of a real-life event depicted by data that is being broadcasted by the broadcasting end. The real-life event may be an auction, a game, or a competition that is being captured by one or more UAVs at the broadcasting end. For example, the UAVs may be capturing video of a sporting event, a reality-television show, etc. A user's selection or manipulation of one or more graphical elements on a GUI on the user terminal may be indicative of the user's vote or bid during the auction, the game, or the competition. In some instances, the control hub and/or the broadcasting end may determine an outcome of the auction, the game, or the competition based in part on the user's vote or bid. In one example, the UAVs can capture video of participants in a reality-TV show. Users at the viewing end can vote for their favorite participant(s), by selecting one or more graphical elements on user terminals at the viewing end. Accordingly, one or more users at the viewing end can interact with the broadcasting end to influence the outcome of a real-life event.

In some embodiments, a plurality of users at the viewing end may provide a plurality of user input. The control hub and/or the broadcasting end may be configured to process the user input. The user input may be processed to determine whether the user input contains conflicting instructions for controlling the UAVs at the broadcasting end. In some embodiments, the conflicting instructions may be resolved based on a priority level associated with each user. For example, if a first user has a higher priority level than a second user, only instructions from the first user may be provided to the UAVs at the broadcasting end. Alternatively, the instructions from a first user and a second user may be modified such that the instructions do not conflict with each other. For example, the instructions may be modified to control different aspects or functions of a UAV (e.g., one set of instructions for controlling flight of the UAV, and another set of instructions for controlling the camera on the UAV). In some cases, the instructions may be processed sequentially based on priority level, such that instructions from the higher priority level user is provided to the UAVs first before providing the instructions from the lower priority level user. In some embodiments, the instructions from different users may be provided in alternating round-robin manner to the UAVs, such that the users can take turns controlling the UAVs. In some cases, conflicting instructions may be resolved based on a number of votes provided by the users. For example, users who submit a higher number of votes (or who are actively involved in interacting with the UAVs at the broadcasting end) may have their instructions provided to the UAVs first, compared to users who submit a lower number of votes (or who are less involved in interacting with the UAVs at the broadcasting end).

In some embodiments, the user input may be processed to determine whether the user input satisfies an operational condition. The operational condition may comprise one or more of the following: (1) permission level of the user to control the UAVs, (2) flight regulations imposed on the UAVs, or (3) environmental conditions in which the UAVs operate. The control hub and/or ground stations at the broadcasting end may be configured to generate a set of UAV control instructions when the user input is determined to satisfy the operational condition. The set of UAV control instructions may be configured for controlling one or more UAVs at the broadcasting end. In some cases, the processing of the user input may serve as a safety check, to ensure operational safety of the UAVs within an environment or to comply with flight regulations.

In some embodiments, if the user input does not satisfy the operational condition, the control hub and/or ground station at the broadcasting end may be configured to modify the instructions in the user input, to ensure that the operational condition is satisfied. For example, the control hub and/or ground station may modify the instructions in the user input, such that the modified instructions comply with flight regulations or environmental conditions.

Flight Regulations and Environmental Conditions

Activities of one or more UAVs at the broadcasting end may be governed in accordance with a set of flight regulations. A set of flight regulations may include one or more flight restrictions or conditions that are imposed on the operation of the UAVs. Various types and examples of flight regulations are described as follows.

Flight regulations may govern physical disposition of one or more UAVs at the broadcasting end. For instance, the flight regulations may govern flight of a UAV, take-off of the UAV, and/or landing of the UAV. The flight regulations may indicate areas of the surface over which the UAV may or may not fly, or volumes in space where the UAV may or may not fly. The flight regulations may relate to position of the UAV (e.g., where the UAV is located in space or over the underlying surface) and/or orientation of the UAV. In some examples, the flight regulations may prevent the UAV from flying within an allocated volume (e.g., airspace) and/or over an allocated region (e.g., underlying ground or water). The flight regulations may comprise one or boundaries within which the UAV is not permitted to fly. In other examples, the flight regulations may only permit the UAV the fly within an allocated volume and/or over an allocated region. The flight regulations may comprise one or more boundaries within which the UAV is permitted to fly. Optionally, the flight regulations may prevent the UAV from flying above an altitude ceiling that may be fixed or variable. In another instance, the flight regulations may prevent the UAV from flying beneath an altitude floor that may be fixed or variable. The UAV may be required to fly at an altitude between the altitude floor and the altitude ceiling. In another example, the UAV may not be able to fly within one or more ranges of altitude. For instance, the flight regulations may permit only a certain range of orientations of the UAV, or may not permit certain range of orientations of the UAV. The range of orientations of the UAV may be with respect to one, two, or three axes. The axes may be orthogonal axes, such as yaw, pitch, or roll axes.

The flight regulations may govern movement of one or more UAVs at the broadcasting end. For instance, the flight regulations may govern translational speed of a UAV, translational acceleration of the UAV, angular speed of the UAV (e.g., about one, two, or three axes), or angular acceleration of the UAV (e.g., about one, two, or three axes). The flight regulations may set a maximum limit for the UAV translational speed, UAV translational acceleration, UAV angular speed, or UAV angular acceleration. Thus, the set of flight regulations may comprise limiting flight speed and/or flight acceleration of the UAV. The flight regulations may set a minimum threshold for UAV translational speed, UAV translational acceleration, UAV angular speed, or UAV angular acceleration. The flight regulations may require that the UAV move between the minimum threshold and the maximum limit. Alternatively, the flight regulations may prevent the UAV from moving within one or more translational speed ranges, translational acceleration ranges, angular speed ranges, or angular acceleration ranges. In one example, a UAV may not be permitted to hover within a designated airspace. The UAV may be required to fly above a minimum translational speed of 0 mph. In another example, a UAV may not be permitted to fly too quickly (e.g., fly beneath a maximum speed limit of 40 mph). The movement of the UAV may be governed with respect to an allocated volume and/or over an allocated region.

The flight regulations may govern take-off and/or landing procedures for one or more UAVs at the broadcasting end. For instance, a UAV may be permitted to fly, but not land in an allocated region. In another example, the UAV may only be able to take-off in a certain manner or at a certain speed from an allocated region. In another example, manual take-off or landing may not be permitted, and an autonomous landing or take-off process must be used within an allocated region. The flight regulations may govern whether take-off is allowed, whether landing is allowed, any rules that the take-off or landing must comply with (e.g., speed, acceleration, direction, orientation, flight modes). In some embodiments, only automated sequences for taking off and/or landing are permitted without permitting manual landing or take-off, or vice versa. The take-off and/or landing procedures of the UAV may be governed with respect to an allocated volume and/or over an allocated region.

In some instances, the flight regulations may govern operation of a payload of one or more UAVs at the broadcasting end. The payload of a UAV may be a sensor, emitter, or any other object that may be carried by the UAV. The payload may be powered on or off. The payload may be rendered operational (e.g., powered on) or inoperational (e.g., powered off). The flight regulations may comprise conditions under which the UAV is not permitted to operate a payload. For example, in an allocated airspace, the flight regulations may require that the payload be powered off. The payload may emit a signal and the flight regulations may govern the nature of the signal, a magnitude of the signal, a range of the signal, a direction of signal, or any mode of operation. For example, if the payload is a light source, the flight regulations may require that the light not be brighter than a threshold intensity within an allocated airspace. In another example, if the payload is a speaker for projecting sound, the flight regulations may require that the speaker not transmit any noise outside an allocated airspace. The payload may be a sensor that collects information, and the flight regulations may govern a mode in which the information is collected, a mode about how information is pre-processed or processed, a resolution at which the information is collected, a frequency or sampling rate at which the information is collected, a range from which the information is collected, or a direction from which the information is collected. For example, the payload may be an image capturing device. The image capturing device may be capable of capturing static images (e.g., still images) or dynamic images (e.g., video). The flight regulations may govern a zoom of the image capturing device, a resolution of images captured by the image capturing device, a sampling rate of the image capturing device, a shutter speed of the image capturing device, an aperture of the image capturing device, whether a flash is used, a mode (e.g., lighting mode, color mode, still vs. video mode) of the image capturing device, or a focus of the image capturing device. In one example, a camera may not be permitted to capture images in over an allocated region. In another example, a camera may be permitted to capture images, but not capture sound over an allocated region. In another example, a camera may only be permitted to capture high-resolution photos within an allocated region and only be permitted to take low-resolution photos outside the allocated region. In another example, the payload may be an audio capturing device. The flight regulations may govern whether the audio capture device is permitted to be powered on, sensitivity of the audio capture device, decibel ranges the audio capture device is able to pick up, directionality of the audio capture device (e.g., for a parabolic microphone), or any other quality of the audio capture device. In one example, the audio capture device may or may not be permitted to capture sound within an allocated region. In another example, the audio capture device may only be permitted to capture sounds within a particular frequency range while within an allocated region. The operation of the payload may be governed with respect to an allocated volume and/or over an allocated region.

The flight regulations may govern whether a payload of one or more UAVs at the broadcasting end can transmit or store information. For instance, if the payload is an image capturing device, the flight regulations may govern whether images (still or dynamic) may be recorded. The flight regulations may govern whether the images can be recorded into an on-board memory of the image capture device or a memory on-board the UAV. For instance, an image capturing device may be permitted to be powered on and showing captured images on a local display, but may not be permitted to record any of the images. The flight regulations may govern whether images can be streamed off-board the image capture device or off-board the UAV. For instance, flight regulations may dictate that an image capture device on-board the UAV may be permitted to stream video down to a terminal off-board the UAV while the UAV is within an allocated airspace, and may not be able to stream video down when outside the allocated airspace. Similarly, if the payload is an audio capture device, the flight regulations may govern whether sounds may be recorded into an on-board memory of the audio capture device or a memory on-board the UAV. For instance, the audio capture device may be permitted to be powered on and play back captured sound on a local speaker, but may not be permitted to record any of the sounds. The flight regulations may govern whether the images can be streamed off-board the audio capture device, or any other payload. The storage and/or transmission of collected data may be governed with respect to an allocated volume and/or over an allocated region.

In some instances, the payload may be an item carried by the UAV, and the flight regulations may dictate the characteristics of the payload. Examples of characteristics of the payload may include dimensions of the payload (e.g., height, width, length, diameter, diagonal), weight of the payload, stability of the payload, materials of the payload, fragility of the payload, or type of payload. For instance, the flight regulations may dictate that the UAV may carry the package of no more than 3 lbs while flying over an allocated region. In another example, the flight regulations may permit the UAV to carry a package having a dimension greater than 1 foot only within an allocated volume. Another flight regulation may permit a UAV to only fly for 5 minutes when carrying a package of 1 lb or greater within an allocated volume, and may cause the UAV to automatically land if the UAV has not left the allocated volume within the 5 minutes. Restrictions may be provided on the type of payloads themselves. For example, unstable or potentially explosive payloads may not be carried by the UAV. Flight restrictions may prevent the carrying of fragile objects by the UAV. The characteristics of the payload may be regulated with respect to an allocated volume and/or over an allocated region.

The flight regulations may also dictate activities that may be performed with respect to the item carried by one or more UAVs at the broadcasting end. For instance, the flight regulations may dictate whether an item may be dropped off within an allocated region. Similarly, the flight regulations may dictate whether an item may be picked up from an allocated region. A UAV may have a robotic arm or other mechanical structure that may aid in dropping off or picking up an item. The UAV may have a carrying compartment that may permit the UAV to carry the item. Activities relating to the payload may be regulated with respect to an allocated volume and/or allocated region.

Positioning of a payload relative to the UAV may be governed by flight regulations. The position of a payload relative to the UAV may be adjustable. Translational position of the payload relative to the UAV and/or orientation of the payload relative to the UAV may be adjustable. Translational position may be adjustable with respect to one, two, or three orthogonal axes. Orientation of the payload may be adjustable with respect to one, two, or three orthogonal axes (e.g., pitch axis, yaw axis, or roll axis). In some embodiments, the payload may be connected to the UAV with a carrier that may control positioning of the payload relative to the UAV. The carrier may support the weight of the payload on the UAV. The carrier may optionally be a gimbaled platform that may permit rotation of the payload with respect to one, two, or three axes relative to the UAV. One or more frame components and one or more actuators may be provided that may effect adjustment of the positioning of the payload. The flight regulations may require the carrier or any other mechanism to adjust the position of the payload relative to the UAV. In one example, flight regulations may not permit a payload to be oriented facing downward while flying over an allocated region. For instance, the region may have sensitive data that it may not be desirable for the payload to capture. In another example, the flight regulations may require the payload to move translationally downward relative to the UAV while within an allocated airspace, which may permit a wider field of view, such as panoramic image capture. The positioning of the payload may be governed with respect to an allocated volume and/or over an allocated region.

The flight regulations may govern the operation of one or more sensors of the UAVs at the broadcasting end. For instance, the flight regulations may govern whether the sensors are turned on or off (or which sensors are turned on or off), a mode in which information is collected, a mode about how information is pre-processed or processed, a resolution at which the information is collected, a frequency or sampling rate at which the information is collected, a range from which the information is collected, or a direction from which the information is collected. The flight regulations may govern whether the sensors can store or transmit information. In one example, a GPS sensor may be turned off while a UAV is within an allocated volume while vision sensors or inertial sensors are turned on for navigation purposes. In another example, audio sensors of the UAV may be turned off while flying over an allocated region. The operation of the one or more sensors may be governed with respect to an allocated volume and/or over an allocated region.

Communications of one or more UAVs at the broadcasting end may be controlled in accordance with one or more flight regulations. For instance, the UAV may be capable of remote communication with one or more remote devices. Examples of remote devices may include a remote controller that may control operation of the UAV, payload, carrier, sensors, or any other component of the UAV, a display terminal that may show information received by the UAV, a database that may collect information from the UAV, or any other external device. The remote communications may be wireless communications. The communications may be direct communications between the UAV and the remote device. Examples of direct communications may include WiFi, WiMax, radiofrequency, infrared, visual, or other types of direct communications. The communications may be indirect communications between the UAV and the remote device which may include one or more intermediary device or network. Examples of indirect communications may include 3G, 4G, LTE, satellite, or other types of communications. The flight regulations may dictate whether remote communications are turned on or off. Flight regulations may comprise conditions under which the UAV is not permitted to communicate under one or more wireless conditions. For example, communications may not be permitted while the UAV is within an allocated airspace volume. The flight regulations may dictate a communication mode that may or may not be permitted. For instance, the flight regulations may dictate whether a direct communication mode is permitted, whether an indirect communication mode is permitted, or whether a preference is established between the direct communication mode and the indirect communication mode. In one example, only direct communications are permitted within an allocated volume. In another example, over an allocated region, a preference for direct communications may be established as long as it is available, otherwise indirect communications may be used, while outside the allocated region, no communications are permitted. The flight regulations may dictate characteristics of the communications, such as bandwidth used, frequencies used, protocols used, encryptions used, devices that aid in the communication that may be used. For example, the flight regulations may only permit existing networks to be utilized for communications when the UAV is within a predetermined volume. The flight regulations may govern communications of the UAV with respect to an allocated volume and/or over an allocated region.

Other functions of the UAVs at the broadcasting end, such as navigation, power usage and monitoring, may be governed in accordance with flight regulations. Examples of power usage and monitoring may include the amount of flight time remaining based on the battery and power usage information, the state of charge of the battery, or the remaining amount of estimated distance based on the battery and power usage information. For instance, the flight regulations may require that a UAV in operation within an allocated volume have a remaining battery life of at least 3 hours. In another example, the flight regulations may require that the UAV be at least at a 50% state of charge when outside an allocated region. Such additional functions may be governed by flight regulations with respect to an allocated volume and/or over an allocated region.

The allocated volume and/or allocated region may be static for a set of flight regulations. For instance, boundaries for the allocated volume and/or allocated region may remain the same over time for the set of flight regulations. Alternatively, the boundaries may change over time. For instance, an allocated region may be a school, and the boundaries for the allocated region may encompass the school during school hours. After school hours, the boundaries may shrink or the allocated region may be removed. An allocated region at a nearby park where children participate in after-school activities may be created during the hours after school. The rules with respect to the allocated volume and/or allocated region may remain the same over time, or may change over time for the set of flight regulations. Changes may be dictated by time of day, day of the week, week of the month, month, quarter, season, year, or any other time-related factor. Information from a clock which may provide time of day, date, or other time-related information may be used in effecting the changes in the boundaries or the rules. A set of flight regulations may have dynamic components in response to other factors, in addition to time. Examples of other factors may include climate, temperature, detected light level, detected presence of individuals or machines, environmental complexity, physical traffic (e.g., land-bound traffic, pedestrian traffic, aerial vehicle traffic), wireless or network traffic, detected degree of noise, detected movements, detected heat signatures, or any other factor.

The allocated volume and/or allocated region may or may not be associated with a geo-fencing device. A geo-fencing device may be a reference point for an allocated volume and/or allocated region. A location of the allocated volume and/or allocated region may be provided based on a location of the geo-fencing device. Alternatively, the allocated volume and/or region may be provided without requiring a presence of a geo-fencing device. For example, a known coordinate for an airport may be provided, and used as a reference for the allocated volume and/or allocated region without requiring a physical geo-fencing device at the airport. Any combination of allocated volumes and/or regions, some of which may rely on geo-fencing devices and some of which may not, may be provided.

The flight regulations may elicit any type of flight response measure by one or more UAVs at the broadcasting end. For instance, a UAV may change course. The UAV may automatically enter an autonomous or semi-autonomous flight control mode from a manual mode, or may not respond to certain user inputs. The UAV may permit another user to take over control of the UAV. The UAV may automatically land or take-off. The UAV may send an alert to a user. The UAV may automatically slow down or speed up. The UAV may adjust operation (which may include ceasing operation, or changing parameter of operation of) of a payload, carrier, sensor, communication unit, navigation unit, power regulation unit. The flight response measure may happen instantaneously, or may occur after a period of time (e.g., 1 minute, 3 minutes, 5 minutes, 10 minutes, 15 minutes, 30 minutes). The period of time may be a grace period for the user to react and exercise some control over the UAV before the flight response measures kick in. For instance, if the user is approaching a flight restricted zone, the user may be alerted and may change course of the UAV to exit the flight restricted zone. If the user does not respond within the grace period, the UAV may be automatically landed within the flight restricted zone. A UAV may normally operate in accordance with one or more flight commands from a remote controller operated by a remote user. The flight response measures may override the one or more flight commands when the set of flight regulations and the one or more flight commands from viewing end conflict. For example, if a user at the viewing end instructs the UAV to enter a no-fly zone, the UAV may automatically alter course avoid the no-fly zone. Alternatively, a ground station at the broadcasting end may control the UAV to alter its course to avoid the no-fly zone.

The set of flight regulations may include information about one or more of the following: (1) an allocated volume and/or region over which the set of flight regulations may apply, (2) one or more rules (e.g., UAV, payload, carrier, sensor, communication module, navigation unit, power unit operation) (3) one or more flight response measures (e.g., response by the UAV, payload, carrier, sensor, communication module, navigation unit, power unit) to cause the UAV to conform with the rules, or (4) time or any other factor that may affect the allocated volume and/or region, the rule, or the flight response measure. The set of flight regulations may include a single flight regulation, which may include information about (1), (2), (3), and/or (4). The set of flight regulations may include multiple flight regulations which may each include information about (1), (2), (3), and/or (4). Any types of flight regulations may be combined, and any combination of flight response measures may occur in accordance with the flight regulations. One or more allocated volumes and/or regions may be provided for a set of flight regulations. For example, a set of flight regulations may be provided for a UAV, where the set of flight regulations does not permit the UAV to fly within a first allocated volume, does permit the UAV to fly within the second allocated volume under an altitude ceiling but does not permit operation of a camera on-board the UAV, and only permits the UAV to record audio data within a third allocated volume. The UAV may have flight response measures that may cause the UAV to comply with the flight regulations. Manual operation of the UAV may be overridden to cause the UAV to comply with rules of the flight regulations. One or more flight response measures may automatically occur to override manual input by the user.

A set of flight regulations may be generated for one or more UAVs at the broadcasting end. In some embodiments, a ground station at the broadcasting end may be configured to generate the set of flight regulations. In some embodiments, the ground station may be configured to receive the set of flight regulations from the control hub. In some embodiments, the ground station may be configured to receive the set of flight regulations from another entity (e.g., a government agency that regulates operation of the UAVs). Generation of the set of flight regulations may include creating the flight regulations from scratch. Generation of the set of flight regulations may include selecting a set of flight regulations from a plurality of available sets of flight regulations. Generation of the set of flight regulations may include combining features of one or more sets of flight regulations. For instance, generation of a set of flight regulations may include determining elements, such as determining an allocated volume and/or region, determining one or more rules, determining one or more flight response measures, and/or determining any factors that may cause any of the elements to be dynamic. These elements may be generated from scratch or may be selected from one or more pre-existing element options. In some instances, flight regulations may be manually selected by a user. Alternatively, the flight regulations may be selected automatically with aid of one or more processors, without requiring human intervention. In some instances, some user input may be provided, but one or more processors may make the final determination of the flight regulations in compliance with the user input.

One or more factors may go into generation of a set of flight regulations. For instance, user information (for each user at the viewing end), UAV information (for each UAV at the broadcasting end), and/or geo-fencing device information may go into generation of a set of flight regulations. In some instances, only user information is considered, only UAV information is considered, only geo-fencing information is considered, only remote-control information is considered, or any number or combination of these factors are considered in generating the set of flight regulations.

Additional factors may be considered in generating the set of flight regulations. These may include information about a local environment (e.g., environmental complexity, urban vs. rural, traffic information, climate information), information from one or more third party sources (e.g., government sources, such as the FAA), time-related information, user-inputted preferences, or any other factors.

In some embodiments, a set of flight regulations relating to a particular geography (e.g., allocated volume, allocated region) may be the same, regardless of user information, UAV information, geo-fencing device information, or any other information. For instance, all users may be subject to the same set of flight regulations. In another instance, all UAVs may be subject to the same set of flight regulations.

Alternatively, the set of flight regulations relating to a particular geography (e.g., allocated volume, allocated region) may be different based on user information, UAV information, and/or geo-fencing device information. User information may include information specific to an individual user at the viewing end (e.g., user flight history, records of previous user flights) and/or may include user type (e.g., user skill category, user experience category). UAV information may include information specific to an individual UAV at the broadcasting end (e.g., UAV flight history, record of maintenance or accidents, unique serial number) and/or may include UAV type (e.g., UAV model, characteristics).

A user type may be indicative of a level of experience of a user in operating the UAV, a level of training or certification of the user in operating the UAV, or a class of a user in operating one or more types of UAVs. A user identifier may uniquely identify each user (from other users) at the viewing end. The control hub or the broadcasting end may associate control instructions from the viewing end with the corresponding user identifier.

The set of flight regulations may be generated by selecting the set of flight regulations from a plurality of sets of flight regulations based on the user identifier. The set of flight regulations may be generated by an air control system off-board the UAV (e.g., at a ground station on the broadcasting end, or at the control hub). The UAV may communicate with the air control system via a direct communication channel. The UAV may communicate with the air control system by being relayed through one or more other UAVs or ground stations.

A UAV type may be indicative of a model of the UAV, a performance capability of the UAV, or a payload of the UAV. A UAV identifier may uniquely identify each UAV (from other UAVs) at the broadcasting end.

The set of flight regulations may be generated based to encompass one or more factors additional factors, such as those described elsewhere herein. For example, environmental conditions may be considered. For instance, more restrictions may be provided if an environmental complexity is high, while fewer restrictions may be provided if an environmental complexity is low. More restrictions may be provided if a population density is high, while fewer restrictions may be provided if a population density is low. More restrictions may be provided if there is a higher degree of traffic (e.g., air traffic or surface-based traffic), while fewer restrictions may be provided if there is a lower degree of traffic. In some embodiments, more restrictions may be provided if an environmental climate has extreme temperatures, is windy, includes precipitation, or a potential for lightning than if the environmental climate has more moderate temperatures, has less wind, does not have precipitation, or little or no potential for lightning.

A set of flight regulations may be generated by selecting the set of flight regulations from a plurality of sets of flight regulations based on the UAV identifier. The set of flight regulations may be generated by an air control system off-board the UAV (e.g., at a ground station on the broadcasting end, or at the control hub). The UAV may communicate with the air control system via a direct communication channel. The UAV may communicate with the air control system by being relayed through one or more other UAVs or ground stations.

As previously described, various types of flight regulations may be provided in a set of flight regulations. The flight regulations may be specific to a UAV or user, or need not be specific to the UAV and/or user.

A set of flight regulations may impact one or more regions (e.g., the airspace above a two-dimensional surface region, or an airspace volume). Various regions may be provided. Boundaries may be provided to define the regions. The set of flight regulations may include one or more rules associated with one or more regions (zones).

In one example, a flight regulated zone may be provided, a communication regulated zone may be provided, and a payload regulated zone may be provided. A payload and communication regulated zone may be provided, as well as a non-regulated zone. The zones may have boundaries of any shape or dimension. For example, a zone may have a regular shape, such as a circle, ellipse, oval, square, rectangle, any type of quadrilateral, triangle, pentagon, hexagon, octagon, strip, curve, or so forth. The zone may have an irregular shape, which may include convex or concave components.

A flight regulated zone may impose one or more rules pertaining to the disposition or movement of the UAV. The flight regulated zone may impose a flight response measure that may affect the flight of the UAV. For example, the UAV may only be able to fly at an altitude between an altitude floor and an altitude ceiling while within the flight regulated zone, while flight restrictions are not imposed outside the flight regulated zone.

A payload regulation zone may impose one or more rules pertaining to operation or positioning of the payload of the UAV. The payload regulated zone may impose a flight response measure that may affect the payload of the UAV. For example, the UAV may not be able to capture images using an image capturing device payload while within the payload regulated zone, while the payload restrictions are not imposed outside the payload regulated zone.

A communication regulated zone may impose one or more rules pertaining to operation of a communication unit of the UAVs at the broadcasting end. The communication regulation zone may impose a flight response measure that affects operation of a communication unit of the UAV. For example, the UAV may not be able to transmit captured data but may be permitted to receive flight control signals while in the communication regulated zone, while the communication restrictions are not imposed outside the communication regulated zone.

A payload and communication regulated zone may impose one or more rules pertaining to operation/positioning of the payload of the UAV and the communication unit of the UAV. For example, the UAV may not be able to store images captured by an image capturing device payload on-board the UAV, and may also not be able to stream or transmit the images off-board the UAV while within the payload and communication regulated region, while such restrictions are not imposed outside the payload and communication regulated region.

One or more non-regulated zones may be provided. The non-regulated zones may be outside one or more boundaries, or may be within one or more boundaries. While within a non-regulated zone, a user may retain control over the UAV without automatic initiation of one or more flight response measures. The user may be able to freely operate the UAV within the physical limitations of the UAV.

One or more of the zones may overlap. For instance, a flight regulated zone may overlap with a communication regulated zone. In another example, a communication regulated zone may overlap with a payload regulated zone. In another example, a flight regulated zone may overlap with the payload regulated zone. In some instances, the flight regulated zone, the communication regulated zone, and the payload regulated zone may all overlap.

When multiple zones overlap, the rules from the multiple zones may remain in place. For example, both the flight restrictions and the communication restrictions may remain in place in the overlapping zone. In some instances, the rules from the multiple zones may remain in place as long as they are not conflicting with one another.

If there are conflicts between the rules, various rule responses may be imposed. For instance, the most restrictive set of rules may apply. For example, if a first zone requires that a UAV fly beneath 400 feet in altitude, and a second zone requires that a UAV fly beneath 200 feet in altitude, in the overlapping zone, the rule about flying beneath 200 feet in altitude may apply. This may include mixing and matching a set of rules to form the most restrictive set. For example, if a first zone requires that a UAV fly above 100 feet and beneath 400 feet, and a second zone requires that a UAV fly above 50 feet and beneath 200 feet, the UAV may use the flight floor from the first zone and the flight ceiling from the second zone to fly between 100 feet and 200 feet while in the overlapping zone.

In another instance, hierarchy may be provided to the zones. The rules from the zone higher up in the hierarchy may prevail, regardless of whether they are more or less restrictive than the rules in the zone lower in the hierarchy. The hierarchy may be dictated according to type of regulation. For example, UAV positional flight regulations may rank higher than communication regulations, which may rank higher than payload regulations. In other instances, rules about whether the UAV is not permitted to fly within a particular zone may trump other regulations for that zone. The hierarchy may be preselected or pre-entered. In some instances, a user providing a set of rules for the zones may indicate which zones are higher in the hierarchy than other zones. For example, a first zone may require that a UAV fly beneath 400 feet and that the payload be turned off. A second zone may require that the UAV fly beneath 200 feet and have no payload restrictions. If the first zone is higher in the hierarchy, the rules from the first zone may be imposed, without imposing any of the rules from the second zone. For instance, the UAV may fly beneath 400 feet and have the payload turned off. If the second zone is higher in the hierarchy, the rules from the second zone may be imposed, without imposing any of the rules from the first zone. For instance, the UAV may fly beneath 200 feet and not have any payload restrictions.

As previously described, a set of flight regulations may impose different types of rules to the UAV while the UAV is in a zone. This may include constraining payload usage based on the UAV location, or constraining wireless communication based on the UAV location.

A payload usage parameter may restrict payload usage at one or more predetermined locations. As previously described, the payload may be an image capture device, and the payload usage parameter can restrict operation of the image capture device at one or more predetermined locations. The payload usage parameter may restrict recordation of one or more images using the image capture device at one or more predetermined locations. The payload usage parameter may restrict transmission of one or more images using the image capture device at one or more predetermined locations. In other embodiments, the payload may be an audio capture device, and the payload usage parameter restricts operation of the audio capture device at the one or more predetermined locations.

Alternatively or in combination, the payload usage parameter may permit payload usage at one or more predetermined locations. When the payload is an image capture device, and the payload usage parameter may permit operation of the image capture device at one or more predetermined locations. The payload usage parameter may permit recordation of one or more images using the image capture device at one or more predetermined locations. The payload usage parameter may permit transmission of one or more images using the image capture device at one or more predetermined locations. The payload may be an audio capture device, and the payload usage parameter may permit operation of the audio capture device at the one or more predetermined locations.

The ground station at the broadcasting end may receive a signal indicative of a location of the UAV, and compare the location of the UAV with the location-dependent payload usage parameter and determine whether the UAV is located at a location that restricts or permits operation of the payload. The location may be a flight-restricted zone. The flight-restricted zone may be determined by regulators. The flight-restricted zone may be within a predetermined distance from an airport, a public gathering place, government property, military property, a school, a private residence, a power plant, or any other area that may be designated as a flight restricted zone. The location may remain stationary over time, or may change over time.

The signal indicative of the location-dependent payload usage parameter may be received from a control entity. The control entity may a regulator, international organization, or a corporation, or any other type of control entity as described elsewhere herein. The control entity may be a global agency, such as any of the agencies and organizations described elsewhere herein. The control entity may be a source off-board or on-board the UAV. The control entity may be an air control system off-board the UAV, or any other portion of an authentication system off-board the UAV. The control entity may be a database, which is stored in a memory of the UAV, or may be stored off-board the UAV. The database may be configured to be updatable. The control entity may be a transmitting device, which is positioned at a location that restricts or permits operation of the payload. In some instances, the control entity may be a geo-fencing device, as described elsewhere herein.

A communication usage parameter may restrict wireless communication usage at one or more predetermined locations. The wireless communications may be direct communications. The wireless communications may comprise radiofrequency communications, WiFi communications, Bluetooth communications, or infrared communications. The wireless communications may be indirect communications. The wireless communications may comprise 3G, 4G, or LTE communications. The communication usage may be restricted by not permitting any wireless communications. The communication usage may be restricted by permitting wireless communication usage only within selected frequency bands. The communication usage may be restricted by permitting wireless communication usage only when it does not interference with higher priority communications. In some instances, all other pre-existing wireless communications may be of higher priority than the UAV communications. For instance, if the UAV is in flight within a neighborhood, the various wireless communications occurring within the neighborhood may be considered of higher priority. In some instances, certain types of communications may be considered communications of higher priority—e.g., emergency service communications, government or official communications, medical device or service communications, etc. Alternatively or in combination, the communication usage parameter may permit wireless communication usage at one or more predetermined locations. For example, indirect communications may be permitted within a specified region, while direct communications are not permitted.

The ground station may receive a signal indicative of a location of the UAV, and compare the location of the UAV with the location-dependent communication usage parameter and determine whether the UAV is located at a location that restricts or permits operation of the communication unit. The location may be a communications-restricted zone. The communications-restricted zone may be determined by regulators or by private individuals. The flight-restricted zone may be within a predetermined distance from a private residence, an airport, a public gathering place, government property, military property, a school, a power plant, or any other area that may be designated as a flight restricted zone. The location may remain stationary over time, or may change over time.

The location may depend on existing wireless communications within a region. For instance, if operation of the communication unit would interfere with one or more existing wireless communications within a particular region, the region may be identified as a communication-restricted region. The operation of a UAV communication unit in compliance with the communication usage parameter may reduce electromagnetic or audio interference. For instance, if surrounding electronics are being used, certain operations of the UAV communication unit may interfere with them, e.g., interfere with their wireless signals. The operation of the UAV communication unit in compliance with the communication sage parameter may reduce or remove interference. For instance, the operation of the UAV communication unit within a limited frequency band may not interfere with surrounding electronic device operations or communications. In another instance, the ceasing of operation of the UAV communication unit within a region may prevent interference with surrounding electronic device operations or communications.

The signal indicative of the location-dependent communication usage parameter may be received from a control entity. The control entity may be a regulator, international organization, or a corporation, or any other type of control entity as described elsewhere herein. The control entity may be a global agency, such as any of the agencies and organizations described elsewhere herein. The control entity may be a source off-board or on-board the UAV. The control entity may be an air control system off-board the UAV, or any other portion of an authentication system off-board the UAV. The control entity may be a database, which is stored in a memory of the UAV, or may be stored off-board the UAV. The database may be configured to be updatable. The control entity may be a transmitting device, which is positioned at a location that restricts or permits operation of the payload. In some instances, the control entity may be a geo-fencing device, as described elsewhere herein.

User Identification and Permission Level

In some embodiments, the control hub or ground station may make a comparison between user instructions received from different users at the viewing end, and determine whether there is a mismatch between the user instructions, or whether the user instructions conflict with one another. The control hub or ground station may modify the conflicting instructions, or prevent the conflicting instructions from being transmitted to the UAVs. The modification may be based on identification of the users and permission levels associated with the users.

Each user at the viewing end may be uniquely identified. The user may be uniquely identified with aid of a user identifier. The user identifier may uniquely identify the user and may differentiate the user from other users. A user may operate or control one or more UAVs from the viewing end. A user may be controlling flight of the UAV, controlling a payload operation and/or placement of the UAV, controlling communications of the UAV, controlling one or more sensors of the UAV, controlling navigation of the UAV, controlling power usage of the UAV, or controlling any other function of the UAV.

Each UAV at the broadcasting end may be uniquely identified. The UAV may be identified with aid of a UAV identifier. The UAV identifier may uniquely identify the UAV and may differentiate the UAV from other UAVs.

In some instances, users may be authorized to operate the UAVs. One or more individual users may need to be identified prior to being able to operate a UAV. In some instances, all users, when identified, may be authorized to operate a UAV. Optionally, only a select group of users, when identified, may be authorized to operate the UAV. Some users may not be authorized to operate the UAV.

The control hub or ground station at the broadcasting end may determine whether a user at the viewing end is authorized to operate a UAV before permitting operation of the UAV by the user. The control hub or ground station may receive a user identifier from the viewing end and a UAV identifier from the UAVs. A determination may be made whether the user is authorized to operate the UAV. If the user is not authorized to operate the UAV, the user is not permitted to operate the UAV. If the user is authorized to operate the UAV, the user is permitted to operate the UAV.

A user identifier may be received. The user identifier may be received from a user terminal at the viewing end. The user identifier may be received from a user input. The user identifier may be pulled from a memory based on the user input. The user input may optionally be provided to the user terminal, or another device. A user may log-in or undergo any authentication procedure in providing the user identifier. A user may manually enter a user identifier via the user terminal. The user identifier may be stored on a user device. The user identifier may be stored from memory without requiring the user to manually enter the user identifier.

A UAV may broadcast a UAV identifier during operation. The UAV identifier may be broadcasted continuously. Alternatively, the UAV identifier may be broadcasted upon request. The UAV identifier may be broadcasted upon request of an air control system off-board the UAV (e.g., a ground station), an authentication system off-board the UAV, or any other device. The UAV identifier may be broadcasted when a communication between the UAV and the air control system may be encrypted or authenticated. In some instances, the UAV identifier may be broadcasted in response to an event. For example, when a UAV is turned on, the UAV identifier may be automatically broadcasted. The UAV identifier may be broadcasted during an initialization procedure. The UAV identifier may be broadcasted during an authentication procedure. Optionally, the UAV identifier may be broadcasted via a wireless signal (e.g., radio signal, optical signal, or an acoustical signal). The identifier may be broadcast using direct communications. Alternatively, the identifier may be broadcast using indirect communications.

The user identifier and/or the UAV identifier may be received by an authentication system located at the control hub or ground station. The user identifier and/or the UAV identifier may be received at an authentication center or an air control system of the authentication system. One or more processors may be configured to determine whether the user is authorized to operate the UAV based on the user identifier and/or UAV identifier. The determination may be made on-board the UAV or off-board the UAV (e.g., at the ground station or the control hub). In some instances, the determination may be made by the authentication system.

The determination may be made at a device or system that generates one or more sets of flight regulations. For example, the determination may be made at an air control system that may generate one or more sets of flight regulations under which the UAV is to operate. The one or more sets of flight regulations may depend on a location of the UAV or any other factor pertaining to the UAV. The one or more sets of flight regulations may be generated based on the user identifier and/or the UAV identifier.

When determining whether a user is authorized to operate the UAV, the user identifier and the UAV identifier may be considered. In some instances, the user identifiers and the UAV identifiers may be considered alone. Alternatively, additional information may be considered. Information about a user may be associated with a user identifier. For example, information about the user type (e.g., skill level, experience level, certifications, licenses, training) may be associated with the user identifier. Flight history of the user (e.g., where the user has flown, types of UAVs the user has flown, whether the user has gotten into any accidents) may be associated with the user identifier. Information about a UAV may be associated with a UAV identifier. For example, information about the UAV type (e.g., model, manufacturer, characteristics, performance parameters, level of difficulty in operation) may be associated with the UAV identifier. Flight history of the UAV (e.g., where the UAV has flown, users who have previously interacted with the UAV) may also be associated with a UAV identifier. Information associated with the user identifiers and/or the UAV identifiers may be considered in determining whether the user is authorized to operate the UAV. In some instances, additional factors may be considered such as geographical factors, timing factors, environmental factors, or any other types of factors.

Optionally, only a single user is authorized to operate a corresponding UAV. A one-to-one correspondence may be provided between an authorized user and a corresponding UAV.

Alternatively, multiple users may be authorized to operate a UAV. A many-to-one correspondence may be provided between authorized users and a corresponding UAV. A user may only be authorized to operate a single corresponding UAV. Alternatively, a user may be authorized to operate multiple UAVs. A one-to-many correspondence may be provided between an authorized user and multiple corresponding UAVs. Multiple users may be authorized to operate multiple corresponding UAVs. A many-to-many correspondence may be provided between authorized users and multiple corresponding UAVs.

In some instances, a user may be pre-registered to operate the UAV. For instance, only users pre-registered to operate the UAV may be authorized to operate the UAV. The users may be a registered owner of the UAV. When a user purchases or receives the UAV, the user may register as an owner and/or operator of the UAV. In some instances, multiple users may be able to register as an owner and/or operator of the UAV. Alternatively, only a single user may be able to register as an owner and/or operator of the UAV. The single user may be able to designate one or more other users that are permitted to operate the UAV. In some instances, only users who have user identifiers that have been registered to operate the UAV may be authorized to operate the UAV. One or more registration databases may store information about registered users that are permitted to operate the UAV. The registration database may be on-board the UAV or off-board the UAV. The user identifier may be compared with the information in the registration database and the user may only be permitted to operate the UAV if the user identifier matches a user identifier associated with the UAV in the registration database. The registration database may be specific to a UAV. For example, a first user may be pre-registered to operate UAV1, but may not be pre-registered to operate UAV2. The user may then be permitted to operate UAV1, but may not be permitted operate UAV2. In some instances, the registration database may be specific to a type of UAV (e.g., all UAVs of a particular model).

In other instances, the registration database may be open, regardless of UAVs. For instance, users may be pre-registered as operators of UAVs. The users may be permitted to fly any UAV, as long as those specific UAVs don't have any other requirements for authorization.

Alternatively, a UAV may default to permitting all users to operate the UAV. All users may be authorized to operate the UAV. In some instances, all users who are not on a 'blacklist' may be authorized to operate the UAV. Thus, when determining whether a user is authorized to operate the UAV, a user may be authorized to operate the UAV as long as the user is not on a blacklist. One or more blacklist databases may store information about users that are not permitted to operate the UAV. The blacklist database may store users' identifiers of users not permitted to operate the UAV. The blacklist database may be on-board the UAV or off-board the UAV. The user identifier may be compared with the information in the blacklist database, and the user may only be permitted to operate the UAV if the user identifier does not match a user identifier in the blacklist database. The blacklist registration may be specific to a UAV or a type of UAV. For example, users may be blacklisted from flying a first UAV, but may not be blacklisted from flying a second UAV. The blacklist registration may be specific to a UAV type. For instance, users may not be permitted to fly a UAV of a particular module, while the users are permitted to fly UAVs of other models. Alternatively, the blacklist registration need not be specific to a UAV or UAV type. The blacklist registration may be applicable to all UAVs. For example, if a user is banned from operating any UAV, then regardless of the UAV identity or type, the user may not be authorized to operate the UAV, and operation of the UAV may not be permitted.

The pre-registration or blacklist registration may also apply to other factors in addition to UAV or UAV type. For instance, the pre-registration or blacklist registration may apply to particular locations or jurisdictions. For instance, a user may be pre-registered to operate a UAV within a first jurisdiction while not being pre-registered to operate a UAV within a second jurisdiction. This may or may not be agnostic to the identity or type of the UAV itself. In another example, the pre-registration or backlist registration may apply to particular climate conditions. For instance, a user may be blacklisted from operating a UAV when wind speeds exceed 30 mph. In another example, other environmental conditions, such as environmental complexity, population density, or air traffic may be considered.

Additional considerations of whether a user is authorized to operate a UAV may depend on user type. For example, user skill or experience level may be considered in determining whether the user is authorized to operate the UAV. Information about a user, such as user type, may be associated with a user identifier. When considering whether the user is authorized to operate the UAV, information about the user may be considered, such as user type. In one example, a user may only be authorized to operate the UAV if the user has met a threshold skill level. For instance, the user may be authorized to operate the UAV if the user has undergone training for UAV flight. In another example, the user may be authorized to operate the UAV if the user has undergone certification that the user has certain flight skills. In another example, the user may only be authorized to operate the UAV if the user has met a threshold experience level. For instance, the user may be authorized to operate the UAV if the user has logged at least a certain threshold number of units of time in flight. In some instances, the threshold number may apply to units of time in flight to any UAV, or only UAVs of the type matching the UAV. Information about the user may include demographic information about the user. For example, the user may only be authorized to operate the UAV if the user has reached a threshold age (e.g., is an adult). The information about the user and/or the UAV may be pulled and may be considered with aid of one or more processors in determining whether the user is authorized to operate the UAV. One or more considerations may be made in accordance with non-transitory computer readable media in determining whether the user is authorized to operate the UAV.

As previously described, additional factors may be considered in determining whether a user is authorized to operate the UAV, such as geographic factors, time factors, or environmental factors. For instance, only some users may be authorized as operating the UAV during the night, while other users may be authorized to operate the UAV during the day only. In one example, a user who has undergone night flight training may be authorized to operate the UAV during both the day and the night, while a user show has not undergone night flight training may only be authorized to operate the UAV during the day.

In some instances, different modes of UAV authorization may be provided. For example, in a pre-registration mode, only pre-registered users may be authorized to fly the UAV. In an open mode, all users may be authorized to fly the UAV. In a skill-based mode, only users that have exhibited a certain level of skill or experience may be permitted to fly the UAV. In some instances, a single mode may be provided for user authorization. In other instances, a user may be to switch between modes of user operation. For example, an owner of the UAV may switch the authorization mode under which the UAV is to function. In some instances, other factors, such as location of the UAV, time, level of air traffic, environmental conditions, may determine the authorization mode under which the UAV is to function. For example, if the environmental conditions are very windy or difficult in which to fly, the UAV may automatically only permit users that are authorized under a skill mode to fly the UAV.

When a user is not authorized to operate a UAV, the user is not permitted to operate the UAV. In some instances, this may result in the UAV not responding to a command from the user and/or from a user terminal of the user. The user may not be able to cause the UAV to fly, or control flight of the UAV. The user may not be able to control any other component of the UAV, such as payload, carrier, sensors, communication unit, navigation unit, or power unit. The user may or may not be able to power the UAV on. In some instances, the user may power a UAV on, but the UAV may not respond to the user. If the user is not authorized, the UAV may optionally power itself off. In some instances, an alert or message may be provided to the user that the user is not authorized to operate the UAV. A reason the user is not authorized may or may not be provided. Optionally, an alert or message may be provided to a second user that the user is not authorized to operate the UAV, or that an attempt has been made by the user to operate the UAV. The second user may be an owner or operator of the UAV. The second user may be an individual who is authorized to operate the UAV. The second user may be an individual that exercises control over the UAV.

In some alternative embodiments, when a user is not authorized to operate a UAV, the user may only be permitted to operate the UAV in a restricted manner. This may include geographic restrictions, time restrictions, speed restrictions, restrictions on use of one or more additional components (e.g., payload, carrier, sensor, communication unit, navigation unit, power unit, etc.). This may include a mode of operation. In one example, when a user is not authorized to operate a UAV, the user may not operate the UAV at selected locations. In another example, a when a user is not authorized to operate a UAV, the user may only operate the UAV at selected locations.

When a user is authorized to operate a UAV, the user may be permitted to operate the UAV. The UAV may respond to a command from the user and/or from a user terminal of the user. The user may be able to control flight of the UAV, or any other component of the UAV. The user may manually control the UAV through user inputs via a remote controller. In some instances, the UAV may automatically override a user input to comply with a set of flight regulations. The set of flight regulations may be pre-established, or may be received on-the fly. In some instances, one or more geofencing device may be used in establishing or providing the set of flight regulations.

A second user may be able to take over control of the UAV from the first user. In some instances, both the first user and the second user may be authorized to operate the UAV. Alternatively, only the second user is authorized to operate the UAV. The first user may be authorized to operate the UAV in a more restricted fashion than the second user. The second user may be authorized to operate the UAV in a less restricted fashion than the first user. One or more operational levels and/or permission levels may be provided. A higher operational level may be indicative of a priority in which a user may operate a vehicle. For instance, a user at a higher operational level may have priority over a user at a lower operational level in operating a UAV. The user at the higher operational level may be able to take over control of the UAV from a user at a lower operational level. In some instances, the second user may be at a higher operational level than the first user. A user at a higher operational level may optionally be authorized to operate the UAV in a less restricted fashion than a user at a lower operational level. A user at a lower operational level may optionally be authorized to operate the UAV in a more restricted fashion than a user at a higher operational level. Operation of a UAV may be taken over by the second user from the first user, when the second user is authorized to operate the UV and is of a higher operational level than the first user.

Operation of the UAV by the second user may be permitted when the UAV authenticates a privilege of the second user to operate the UAV. The authentication may occur with aid of a digital signature and/or digital certificate that verifies the identity of the second user. Authentication of the second user and/or the first user may occur using any authentication procedure as described elsewhere herein.

In some embodiments, the second user that may take over control may be part of emergency services. For instance, the second user may be part of law enforcement, fire services, medical services, or disaster relief services. The second user may be an electronic police. In some instances, the second user may be part of a government agency, such as an agency that may regulate air traffic or other types of traffic. The second user may be an air control system operator. The user may be a member or administrator of an authentication system. The second user may be a member of a defense force or a quasi-defense force. For instance, the second user may be a member of the Air Force, Coast Guard, National Guard, China Armed Police Force (CAPF), or any other type of defense force or equivalent in any jurisdiction of the world.

The first user may be notified when the second user takes over control. For instance, an alert or message may be provided to the first user. The alert or message may be provided via a user terminal of the first user. The alert may be visibly displayed, or may be audible or tactilely discernible. In some embodiments, a second user may make a request to take over control of the UAV from the first user. The first user may choose to accept or deny the request. Alternatively, the second user may be able to take over control without requiring acceptance or permission from the first user. In some embodiments, there may be some lag time between when the first user is alerted that the second user is taking over control and when the second user takes over control. Alternatively, little or no lag time is provided, so that the second user may be able to take over instantaneously. A second user may be able to take over control within less than 1 minute, 30 seconds, 15 seconds, 10 seconds, 5 seconds, 3 seconds, 2 seconds, 1 second, 0.5 seconds, 0.1 seconds, 0.05 seconds, or 0.01 seconds of making the attempt to take over control.

The second user may take over control from the first user in response to any scenario. In some embodiments, the second user may take over control when the UAV enters a restricted region. Control may be returned to the first user when the UAV exits the restricted region. The second user may operate the UAV while the UAV is within the restricted region. In another instance, the second user may be able to take over control of the UAV at any time. In some instances, when a safety or security threat is ascertained, the second user may be able to take over control of the UAV. For example, if it is detected that a UAV is heading on a collision course with an aircraft, the second user may be able to take over control to avoid the UAV collision with the air craft.

The control hub or ground station may be configured to determine whether to permit operation of a UAV by a user. The process may include authenticating a user and authenticating a UAV. If the user does not pass the authentication process, the user may not be permitted to operate the UAV. If the UAV does not pass the authentication process, the user may not be permitted to operate the UAV. A determination may be made whether the user is authorized to operate the UAV. If the user is not authorized to operate the UAV, then the user may not be permitted to operate the UAV. If the user does pass the authentication process, the user may be permitted to operate the UAV. If the UAV does pass authentication process, the user may be permitted to operate the UAV. If the user is authorized to operate the UAV, the user may be permitted to operate the UAV. In some instances, both the user and the UAV must pass the authentication process before the user is permitted to operate the UAV. Optionally, the user and the UAV must both pass the authentication process and the user must be authorized to operate the UAV before the user is permitted to operate the UAV.

In some instances, permission to operate the UAV may apply to any circumstance, or may only apply within one or more allocated volumes or regions. For instance, a user and/or UAV may need to pass authentication to operate the UAV at all. In other instances, a user may normally be able to operate the UAV, but may need to be authenticated to operate the UAV within a selected airspace, such as a restricted region.

After a secure link is established, the UAV may apply for a resource (e.g., an aerial route and a time period, or any other resource described elsewhere herein) with a traffic management module of the air control system (e.g., a ground station). The traffic management module may manage traffic rights. The UAV may accept a set of flight regulations (e.g., distance, height, speed, or any other type of flight regulations describe elsewhere herein) on the flight. The UAV may take off only if permission is received. The flight plan may be recorded in traffic management.

During the flight, the UAV may regularly report its status to a traffic monitoring subsystem of the air control system (e.g., a ground station). The status of the UAV may be conveyed to the traffic monitoring subsystem using any technique. Direct or indirect communications, such as those described elsewhere herein may be used. External sensor data may or may not be used in determining the UAV status and conveying status information to the traffic monitoring subsystem. In some examples, the UAV status information may be broadcasted, or being relayed by ground stations or other intermediary devices to the traffic management subsystem. The UAV may receive the supervision of the traffic management subsystem. The traffic management subsystem may use direct or indirect communication methods, such as those described elsewhere herein, to communicate with the UAV. If the scheduled flight is to be modified, the UAV may submit an application with the traffic management subsystem. The application may be submitted before initiation of the UAV flight, or may occur after the UAV has started the flight. The application may be made while the UAV is flying. The traffic management may have the capacity to monitor the flight of UAV. The traffic management subsystem may monitor the flight of the UAV in accordance with information from the UAV and/or information from one or more sensors external to the UAV.

During flight, a UAV may communicate with other devices (including but not limited to, other UAVs or geo-fencing devices). During flight, a UAV may also be able to authenticate (including but not limited to, digital signature+ digital certificate) and/or respond (e.g., responding to an authenticated geo-fencing device).

During flight, a UAV may accept a take-over control from a higher lever user (such as an air control system or an electronic police), as described in greater detail elsewhere herein. The higher lever user may take the control over if the privilege is authenticated by the UAV.

Figure 12:
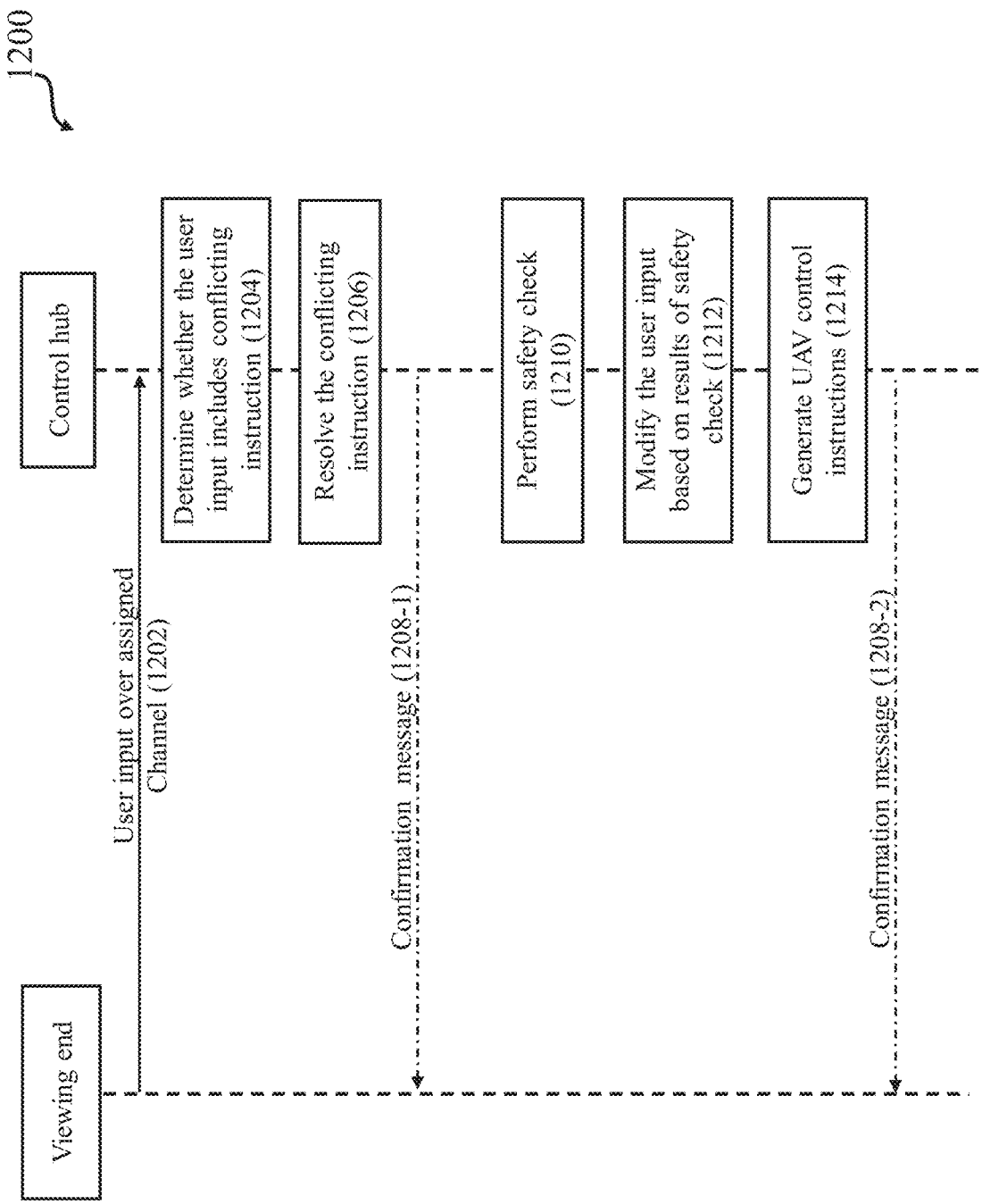
FIG. 12 illustrates an exemplary exchange of information in a video broadcasting system between a viewing end and a control hub, in accordance with some embodiments.

FIG. 12 illustrates an exemplary exchange of information in a video broadcasting system 1200, in accordance with some embodiments. The exchange of information may occur between a viewing end and a control hub. It should be noted that the functions of the control hub in FIG. 12 can also be performed by one or more ground stations at the broadcasting end. For example, the viewing end may be in direct communication with the ground stations.

The viewing end may transmit a user input to the control hub over an assigned channel (1202). The control hub may process the user input. Processing the user input may comprise determining whether the user input includes conflicting instructions (1204). The control hub may resolve the conflicting instructions (1206) as described elsewhere herein. In some cases, the control hub may send a confirmation message to the viewing end to inform users that conflicting instructions have been resolved (1208-1).

In some embodiments, processing the user input may comprise determining whether the user input satisfies an operational condition as described elsewhere herein, and may include performing a safety check (1210). The control hub may be configured to modify the user input based on results of the safety check (1212). In some cases, the control hub may generate a set of UAV control instructions (1214), to ensure operational safety of the UAVs and to ensure that the operational condition is being satisfied. In some cases, the control hub may send a confirmation messages to the viewing end to inform users that the user inputs have been modified and that a set of UAV control instructions have been generated (1208-2). The UAV control instructions may be configured to control one or more operational aspects (e.g., flight, payload operation, etc.) of the UAV.

User Interfaces

Figure 13:
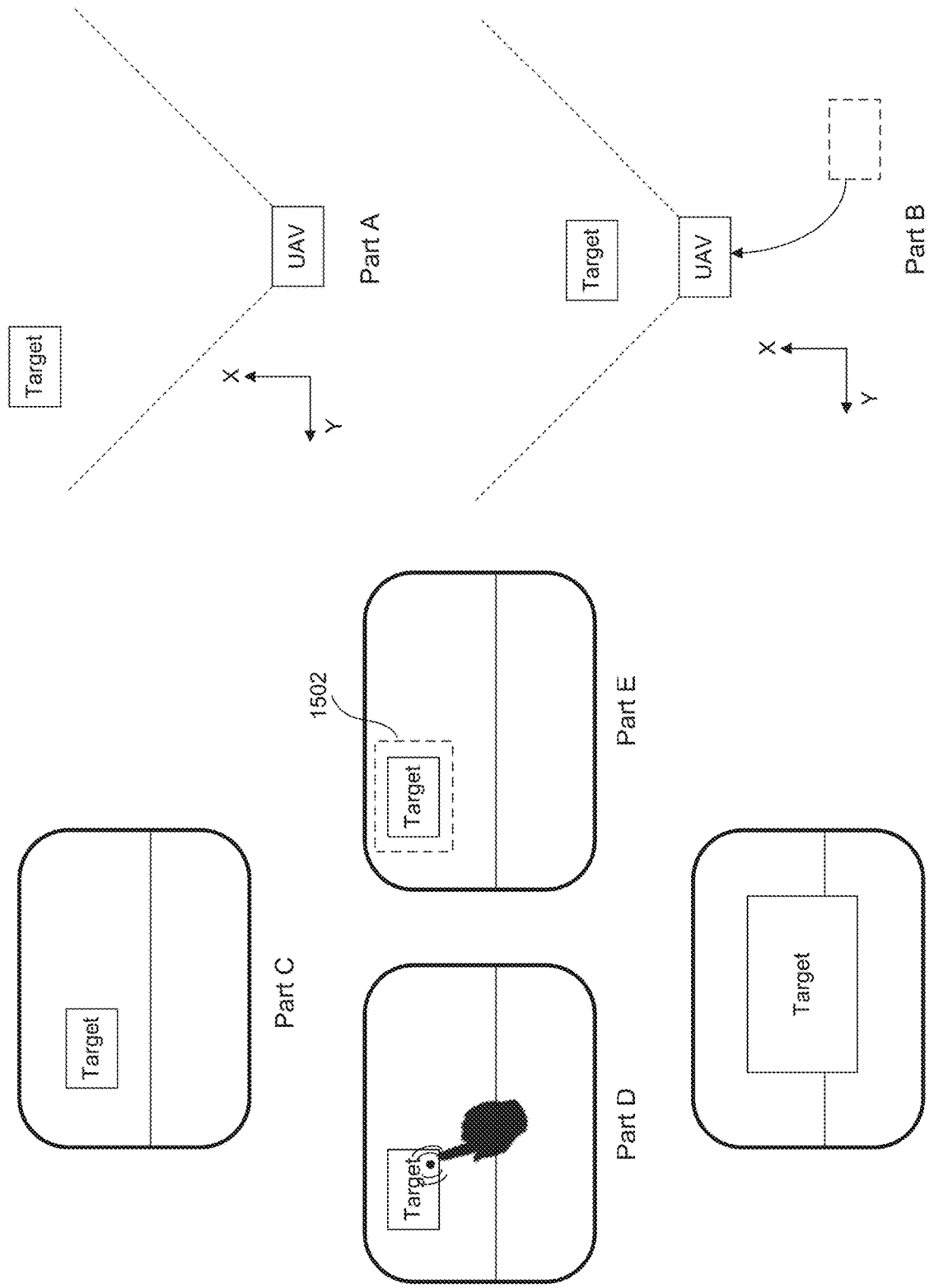
FIG. 13 illustrates an example of a user interface (UI) provided in a first person view (FPV) through which a user may select a target and cause a UAV at a broadcasting end to move towards the target, in accordance with some embodiments.

FIG. 13 shows an example of a user interface (UI) provided in a first person view (FPV) through which a user may select a target and cause a UAV at the broadcasting end to move towards the target, in accordance with some embodiments. The UI/FPV may be provided on one or more user terminals at the viewing end. Part A of FIG. 13 shows an initial position of the UAV relative to the target, and part B shows the position of the UAV after it has moved towards the target based on the user input. Parts C, D, E, and F show examples of the user's interaction with the broadcasting end via a UI displayed on a user terminal. The user terminal may include a touchscreen display device configured to receive a user input.

Part B shows an initial FPV of an environment comprising the target. The FPV in part B may correspond to an image captured by the UAV at the broadcasting end, when the UAV is in the position shown in part A. The FPV may include live streaming video obtained using an imaging device (camera) on the UAV. The target lies within the field of view of the imaging device. In some cases, the target may be a stand-alone object. In other cases, the target may be surrounded by or proximate to one or more other objects. The target may be stationary and/or capable of movement. The UAV may be stationary or moving while the initial FPV of the environment is being displayed on the user terminal.

A user at the viewing end can interact with the FPV by selecting different points or objects in the display. Part D shows a user selecting a target within the initial FPV. The user may select a portion of the image to select the target. The portion of the image selected by the user may be a point. The point may be located on the target as shown on the FPV. In some embodiments, the point may be located proximate to the target as shown on the FPV. The target may be automatically selected when the user selects the point. In some cases, the target may be marked using one or more types of marking schemes (e.g., shading, coloring, highlighted, etc.) to indicate that the target has been selected. In some cases, a pop-up window may appear at the target on the display requesting confirmation from the user whether the user wishes to select the target. In some embodiments, a plurality of bounding boxes may be generated in the vicinity of the selected point. Each bounding box may be associated with a different target. A user may be presented with the option to select a target by selecting the respective bounding box. In some instances, a user may select more than one target. In those instances, the UAV may be configured to fly first to a nearer target and then to a target that is further away.

The target may be identified from a 2D image, one or more stereoscopic images, or from a 3D map. Identification of a target from a 3D map may be based on spatial information of objects/features obtained from, for example a 3D map and/or an occupancy grid as described elsewhere herein.

Identification of a target by selecting a point on the image may be performed using a category-independent segmentation algorithm. For example, when a user selects a point on or in the vicinity of the target on the image, the target may be segmented from adjacent or surrounding objects. The segmentation may proceed without knowing which object category the target may fall into. In some cases, the segmentation algorithm may generate a plurality of seed regions in the image(s) and ranks each region, such that top-ranked regions are likely to be good segmentations of different objects (i.e., correspond to different objects).

In some cases, the target may be selected based on moving target detection. In those instances, the UAV and the surrounding environment are assumed to be static/stationary, and the target to be tracked may be the only moving object in the image. The target can be identified and selected through background subtraction. Additionally, identification of a target may also be based on feature point recognition, as described elsewhere herein.

The precision to which the user may specify a point may be on the order of 0.01 degrees or less, 0.05 degrees or less, 0.1 degrees or less, 0.5 degrees or less, 1 degree or less 2 degrees or less, 3 degrees or less, 5 degrees or less, 7 degrees or less, 10 degrees or less, 15 degrees or less, 20 degrees or less, or 30 degrees or less.

The UAV may travel towards the target that is indicated by the selected point in the FPV. A motion path for the UAV may be defined from the current location of the UAV to the location of the target. The motion path may be denoted by a vector between the current location of the UAV to the location of the target. In some embodiments, the UAV may be configured to track the target as the target moves within the environment.

When a user selects a portion of the FPV to specify a target, a motion path to the selected target may or may not be visually indicated on the display. In some instances, a visual marker may be provided within the image indicative of the motion path to the target object. The visual marker may be a point, region, icon, line, or vector. For instance, the line or vector may be indicative of a direction of the motion path towards the target. In another example, the line or vector may be indicative of the direction that the UAV is heading.

In some embodiments, a user may specify that the UAV is in a target mode. When the UAV is in a target mode, the portion of the image selected by the user may determine the target towards which the UAV will travel until it encounters obstacles, or when another different target is selected, or when the UAV encounters flight restrictions. The UAV may travel towards the target object until it encounters a stop or change criteria, such as a target change, flight restriction, flight mode change, low power supply or obstacle. The user may specify that the UAV is in a target mode by selecting the target mode from one or more available modes, such as a directional mode. Any other user interface tools or techniques may be provided that may allow a user to specify a target object using the user interface.

In some instances, after the target has been selected, a marking or identification scheme may be used in the display to indicate that the target has been selected. For example, part E of FIG. 13 shows a virtual box 1502 surrounding the selected target in the FPV. The box may be in any shape, for example an n-sided polygon where n may be any integer greater than 2. In FIG. 13, the box is a 4-sided polygon (quadrilateral-shaped). The box may serve as a visual indicator to the user, to distinguish the selected target from adjacent objects. In some embodiments, a prompt window (not shown) may appear in or near the box, requesting confirmation from the user on whether the selected target corresponds to an intended target of the user. A user may confirm the selected target by clicking on the box.

Part F of FIG. 13 shows an image of the target after the UAV has moved towards the target. The FPV in part F may correspond to an image captured by the UAV at the broadcasting end, when the UAV is in the position shown in part B. As viewed in the FPV, when the UAV is traveling towards the target, an object that was once further away may become closer up. In some instances, the UAV may move towards the target until it is offset from the target by a predetermined distance. The predetermined distance may include a horizontal distance component and/or a vertical distance component. The UAV may stay at the predetermined distance from the target. In some cases, the UAV may remain outside of the predetermined distance to the target. The predetermined distance may be determined based on a size of the target and an initial distance from the UAV to the target. The predetermined distance may be automatically generated, or optionally adjustable by a user. For example, if a user desires to move the UAV closer to the target, the user may select (e.g., "click") the target in the image multiple times to adjust the predetermined distance. Adjustment of the distance may optionally depend on a length of time which the user selects (e.g., touches) the target in the image. In some embodiments, the predetermined distance may be dynamically calculated based on factors such as a size of the target and an initial distance of the UAV from the target.

A user may control motion of the UAV by interacting with a user interface in the FPV in a number of different configurations. For example, when a user selects a point on the target in the 3-D FPV, the UAV may move towards the target. Optionally, when the user selects a point located below the target in the image, the UAV may move backward along its original motion path and away from the target. Alternatively, selecting a point above the target in the image may cause the UAV to move forward. In some cases, double-clicking (or touching) the target in the image multiple times may cause the UAV to move closer to the target. It is noted that any form of interaction of the user with the user terminal/output device to control various functions of the motion of the UAV may be contemplated.

In some instances, when a user specifies a target, the UAV may travel towards the target at a fixed velocity or at a variable velocity. A standard target travel velocity may be provided. A variable target travel velocity may also be provided. Alternatively, the user may specify the velocity and/or acceleration at which the UAV may be traveling towards the target. Any description herein of affecting the velocity of the UAV may also apply to affecting acceleration of the UAV when moving towards the target. In some instances, the user may affect the velocity at the same time at which the user is specifying the target. For instance, when a user selects a target, the number of clicks or touches that a user touches the target may affect the velocity of the UAV. For instance, if a user touches a point indicative of a target a single time, the UAV may travel at a first velocity, and if the user touches the point multiple times, the UAV may travel at a second velocity. The second velocity may be greater than the first velocity. The velocity of the UAV travel may correspond to the number of touches or selections of the point indicative of the target. A positive proportional relationship may be provided between the number of selections and the velocity of the UAV. In some instances, a linear relationship may be provided between the number of selections and the velocity of the UAV. For instance, if a user clicks on the point/target N times, the velocity of the UAV may be X+N*Y, where X is a velocity value, Y is a velocity multiplier, and N is the number of times the target was selected/clicked. Any other mathematical relation may be provided. The user may make a selection a first time to get a first velocity, and then make the selection again to speed up the UAV. The user may keep making the selection to keep speeding up the UAV.

In another example, when a user selects a target, a length of time associated with the selection of the target may affect the velocity of the UAV. For instance, if a user touches a point indicative of a target for a first period of time, the UAV may travel at a first velocity, and if the user touches for a second period of time greater than the first period of time, UAV may travel a second velocity. The second velocity may be greater than the first velocity. The velocity of the UAV motion may correspond to the length of the touch or selection of the point indicative of the target. A positive proportional relationship may be provided between the length of the selection and the velocity of the UAV. In some instances, a linear relationship may be provided between the length of the selection and the velocity of the UAV.

Various other types of user interactions may affect the velocity of the UAV traveling towards the target. In some examples, swiping motions (e.g., speed of swipe, length of swipes, number of swipes) may affect the velocity of the UAV. In other examples, different regions may be touched to affect the velocity of the UAV. In another example, a separate control may be provided for velocity control. For instance, a user may adjust a velocity using a manual control while the UAV is traveling towards the target. The velocity may be adjusted in accordance with the manual control in real-time. In another example, a user may enter a numerical value for the desired velocity, or select the velocity from a plurality of pre-selected options.

Augmented FPV

Figure 14:
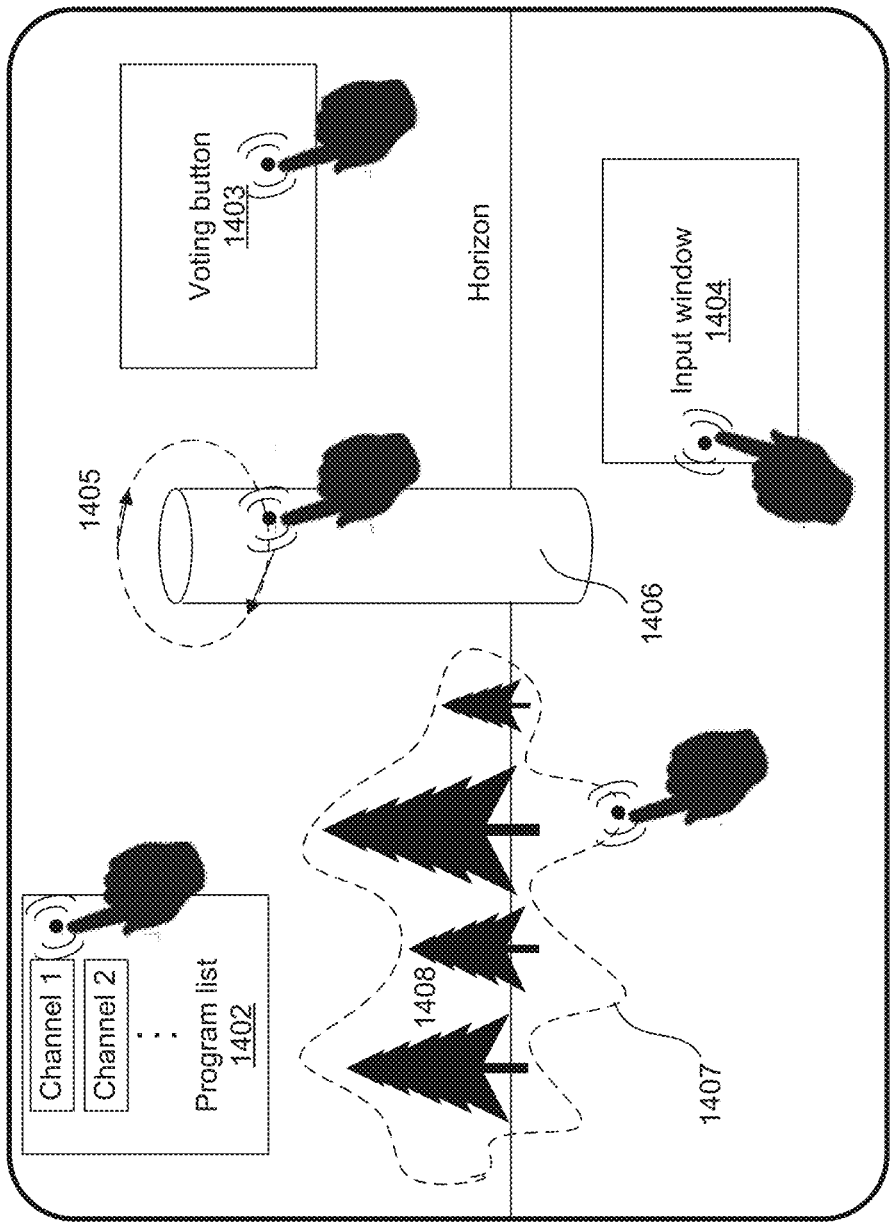
FIG. 14 illustrates an example of a user interface (UI) in an augmented first person view (FPV) through which a user may interact with the broadcasting end, in accordance with some embodiments.

FIG. 14 shows an example of a user interface (UI) in an augmented FPV through which a user may interact with the broadcasting end, in accordance with some embodiments. The FPV may include video captured by an imaging device (camera) on UAVs at the broadcasting end. The FPV may also include a plurality of graphical elements that allow a user to interact with the UAVs at the broadcasting end. The graphical elements may be provided in an augmented reality (AR) layer that is superposed over the video stream collected by the UAVs.

In some embodiments, the graphical elements may include a program list 1402. The program list may include a plurality of channels over which video collected by different UAVs from different aerial viewpoints are broadcasted. A user can switch between channels by selecting the desired channel, for example on a touchscreen of the user terminal. In some embodiments, each channel that is listed in the program list may include a small graphical window showing a preview of the video that is being broadcasted over that channel. The video preview may be updated in real-time as the position and orientation of the UAV and/or camera changes.

In some embodiments, the graphical elements may include a voting/bidding button 1403. A user can submit votes or bids to influence an outcome of a real-life event by selecting the button 1403. As previously described, the real-life event may include an auction, a game, and/or a competition that is being broadcasted live over one or more channels from the broadcasting end. A user can use the button to bid on an item in an auction, or to vote for a favorite participant or a desired outcome in a game or competition. A voting result can be determined by collecting a plurality of votes from a plurality of users. An outcome of a game or competition can be determined based on the voting result. Similarly, an auction result can also be determined based on a bids submitted by a plurality of users, so as to determine the winning bid.

In some embodiments, the graphical elements may include an input window 1404. A user can input alphanumeric text and/or graphical icons into the window 1404. A user may provide comments about a real-life event that is being broadcasted by the broadcasting end. For example, a user may comment on a game, share thoughts with other users, invite comments and responses from other users who are simultaneously watching the game, provide remarks to organizers of the game, etc. In some embodiments, a user may be able to upload images, audio data, and/or video data via the input window, to be shared with other users. In some embodiments, a user may share comments and/or data with other users via one or more social media links provided in the input window.

In some embodiments, a user can draw a box 1405 in the UI to define a motion path for a UAV. As shown in FIG. 14, the box may be drawn around a portion of an image of an object 1406 depicted within the video. A user may draw the box by touching the display in a circular manner. The box may contain a target (object of interest) therein. The box may be in any shape, for example an n-sided polygon, an ellipse, an irregular shape, etc. For example, the box may be an ellipse. One or more UAVs may be configured to circle around the object 1406 in the physical environment by moving along the motion path defined by the user.

In some embodiments, a user can draw a contour 1407 in the UI around a group of objects. The contour may define a motion path around the objects. As shown in FIG. 14, the contour may be drawn around a group pf objects 1408 depicted within the video. The objects may be of different sizes and/or located at different distances relative to the UAVs. The contour may be in any shape. For example, the contour 1407 in FIG. 14 may have an irregular 3-dimensional shape. One or more UAVs may be configured to circle around the objects 1408 in the physical environment by moving along the 3-dimensional motion path defined by the user.

Operation of UAVs in Coordinated Manner Along Different Motion Paths

Figure 15:
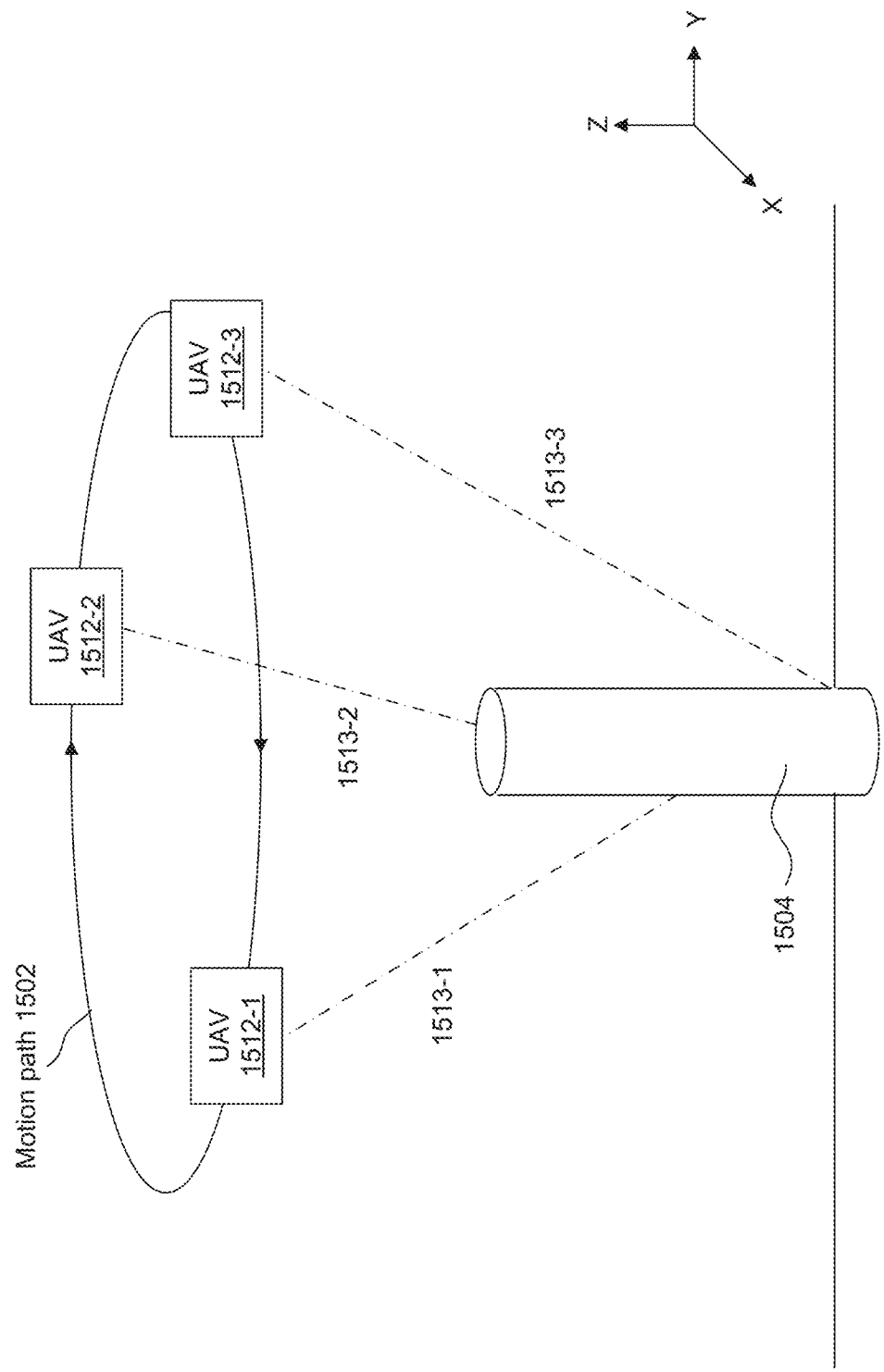
FIG. 15 illustrates an example of UAVs at a broadcasting end being operated in a coordinated manner along a 2D motion path, in accordance with some embodiments.

FIG. 15 illustrates an example of a motion path of UAVs at a broadcasting end, in accordance with some embodiments. As previously described, the UAVs may be operated in a coordinated manner. As shown in FIG. 15, a plurality of UAVs 1512-1, 1512-2, and 1512-3 may be operated in a coordinated manner by flying along a motion path 1502 to circle around an object 1504 (e.g., an object of interest). The motion path may have a regular shape or an irregular shape. For example, the motion path may be in the shape of a circle or an ellipse. The motion path may or may not be defined by a user at a viewing end. The UAVs may capture video of the object 1504 from different viewpoints. For example, at a particular time instance, a first UAV 1512-1 may capture video from a first viewpoint 1513-1, a second UAV 1512-2 may capture video from a second viewpoint 1513-2, and a third UAV 1512-3 may capture video from a third viewpoint 1513-3. The video may be broadcasted from the broadcasting end to the viewing end over different allocated channels, as described elsewhere herein.

A user at the viewing end may select a desired video to watch, by selecting the corresponding viewing program from a program list, for example as shown in FIG. 14. The user may also be permitted to control (1) a point of view (POV) and/or (2) motion of one or more UAVs 1512. For example, the user may be permitted to control the POV by adjusting an orientation and/or position of one or more UAVs. Alternatively, the users may be permitted to control the POV by adjusting an orientation and/or magnification function of one or more cameras supported by one or more UAVs. Additionally, the users may be permitted to control the motion of the UAVs by adjusting a motion path and/or motion characteristics of one or more UAVs. Accordingly, a user can view video of an object (or in some cases, a real-life event such as a competition, game, or auction) from different aerial perspectives, and control the manner in which the video is being captured in real-time.

Figure 16:
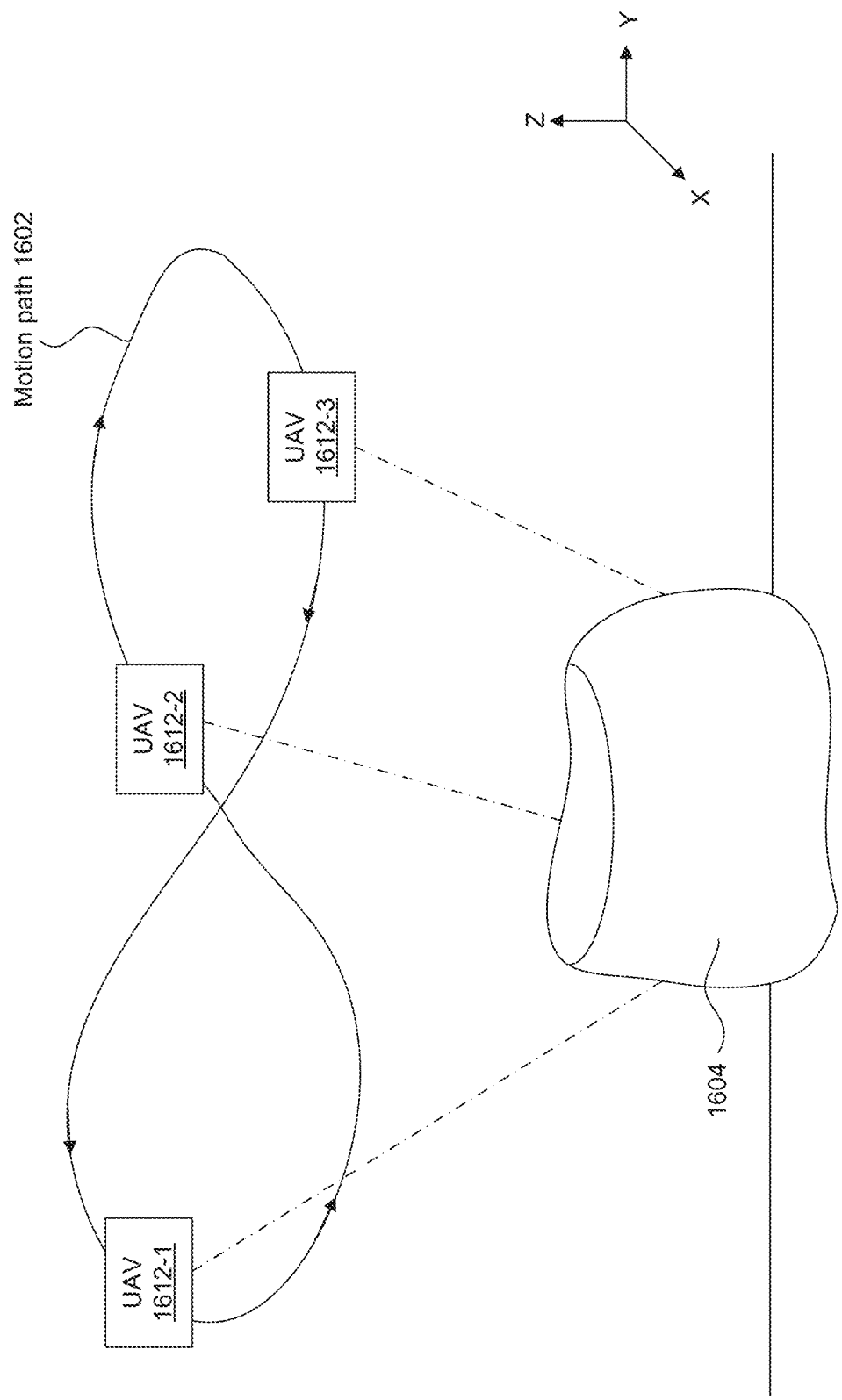
FIG. 16 illustrates an example of UAVs at a broadcasting end being operated in a coordinated manner along a 3D motion path, in accordance with some embodiments.

FIG. 16 shows another example in which a plurality of UAVs are operated in a coordinated manner, and is similar to FIG. 15 except for the following differences. In FIG. 16, a plurality of UAVs 1612-1, 1612-2, and 1612-3 may be operated to fly along a 3-D motion path 1602 around an irregular-shaped object 1604. The motion path 1602 may define "FIG. 8" flight path in 3-D space. In contrast, the motion path 1502 in FIG. 15 may lie on a 2-D plane, and the object 1504 may have a regular shape (e.g., cylindrical shape). The motion path 1602 may or may not be defined by a user at a viewing end. The UAVs 1612 may capture video of the object 1604 from different viewpoints. For example, at a particular time instance, a first UAV 1612-1 may capture video from a first viewpoint 1613-1, a second UAV 1612-2 may capture video from a second viewpoint 1613-2, and a third UAV 1612-3 may capture video from a third viewpoint 1613-3. The video may be broadcasted from the broadcasting end to the viewing end over different allocated channels, as described elsewhere herein. A user at the viewing end can interact with the broadcasting end, and control one or more UAVs and/or cameras to capture video from different aerial perspectives, as described elsewhere herein.

Figure 17:
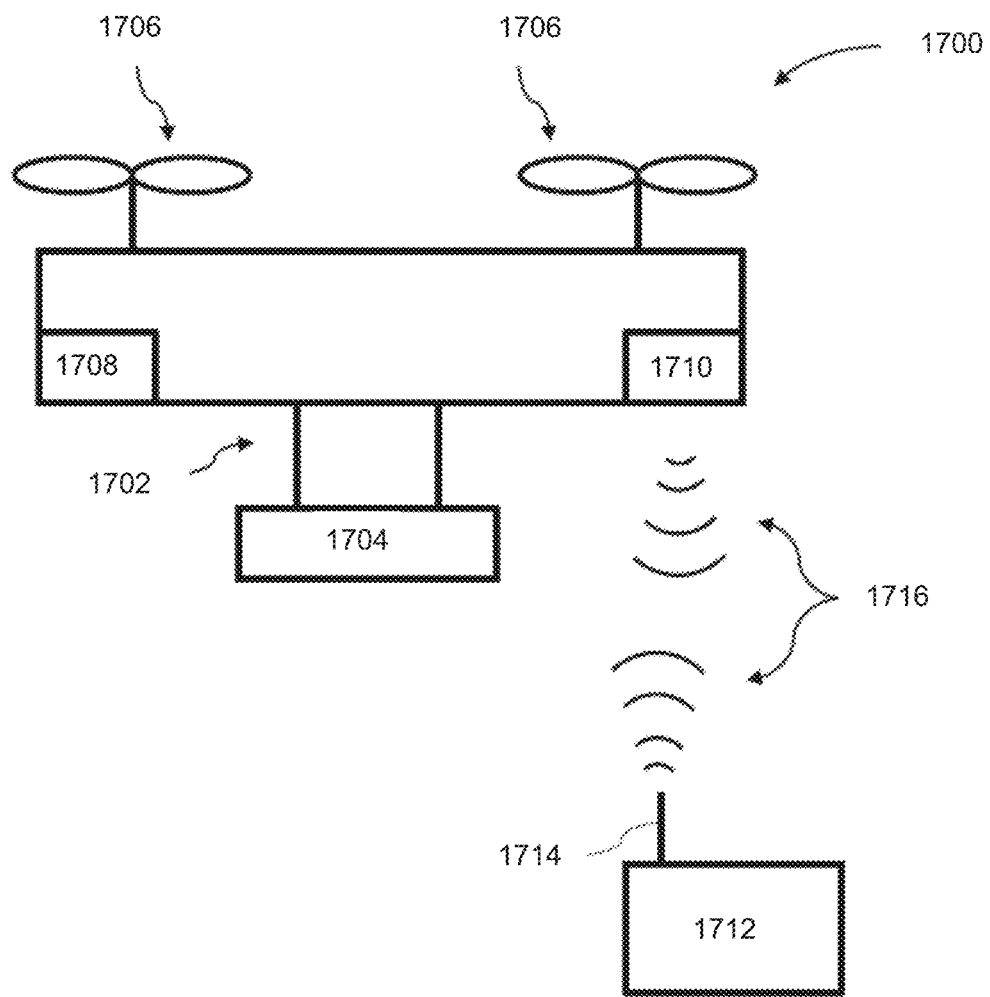
FIG. 17 is a schematic block diagram of a system for controlling a movable object, in accordance with some embodiments.

The embodiments described herein may be applicable to any movable object. FIG. 17 illustrates a movable object 1700 including a carrier 1702 and a payload 1704, in accordance with embodiments. Although the movable object 1700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1704 may be provided on the movable object 1700 without requiring the carrier 1702. The movable object 1700 may include propulsion mechanisms 1706, a sensing system 1708, and a communication system 1710.

The propulsion mechanisms 1706 can include one or more of rotors, propellers, blades, engines, motors, wheels, axles, magnets, or nozzles, as previously described. For example, the propulsion mechanisms 1706 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1706 can be mounted on the movable object 1700 using any suitable means, such as a support element (e.g., a drive shaft) as described elsewhere herein. The propulsion mechanisms 1706 can be mounted on any suitable portion of the movable object 1700, such on the top, bottom, front, back, sides, or suitable combinations thereof.

In some embodiments, the propulsion mechanisms 1706 can enable the movable object 1700 to take off vertically from a surface or land vertically on a surface without requiring any horizontal movement of the movable object 1700 (e.g., without traveling down a runway). Optionally, the propulsion mechanisms 1706 can be operable to permit the movable object 1700 to hover in the air at a specified position and/or orientation. One or more of the propulsion mechanisms 1706 may be controlled independently of the other propulsion mechanisms. Alternatively, the propulsion mechanisms 1706 can be configured to be controlled simultaneously. For example, the movable object 1700 can have multiple horizontally oriented rotors that can provide lift and/or thrust to the movable object. The multiple horizontally oriented rotors can be actuated to provide vertical takeoff, vertical landing, and hovering capabilities to the movable object 1700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1700 (e.g., with respect to up to three degrees of translation and up to three degrees of rotation).

The sensing system 1008 can include one or more sensors that may sense the spatial disposition, velocity, and/or acceleration of the movable object 1700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1708 can be used to control the spatial disposition, velocity, and/or orientation of the movable object 1700 (e.g., using a suitable processing unit and/or control module, as described below). Alternatively, the sensing system 1708 can be used to provide data regarding the environment surrounding the movable object, such as weather conditions, proximity to potential obstacles, location of geographical features, location of manmade structures, and the like.

The communication system 1710 enables communication with terminal 1712 having a communication system 1714 via wireless signals 1716. The communication systems 1710, 1714 may include any number of transmitters, receivers, and/or transceivers suitable for wireless communication. The communication may be one-way communication, such that data can be transmitted in only one direction. For example, one-way communication may involve only the movable object 1700 transmitting data to the terminal 1712, or vice-versa. The data may be transmitted from one or more transmitters of the communication system 1710 to one or more receivers of the communication system 1714, or vice-versa. Alternatively, the communication may be two-way communication, such that data can be transmitted in both directions between the movable object 1700 and the terminal 1712. The two-way communication can involve transmitting data from one or more transmitters of the communication system 1710 to one or more receivers of the communication system 1714, and vice-versa.

In some embodiments, the terminal 1712 can provide control data to one or more of the movable object 1700, carrier 1702, and payload 1704 and receive information from one or more of the movable object 1700, carrier 1702, and payload 1704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1706), or a movement of the payload with respect to the movable object (e.g., via control of the carrier 1702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1708 or of the payload 1704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1712 can be configured to control a state of one or more of the movable object 1700, carrier 1702, or payload 1704.

Alternatively or in combination, the carrier 1702 and payload 1704 can also each include a communication module configured to communicate with terminal 1712, such that the terminal can communicate with and control each of the movable object 1700, carrier 1702, and payload 1704 independently.

In some embodiments, the movable object 1700 can be configured to communicate with another remote device in addition to the terminal 1712, or instead of the terminal 1712. The terminal 1712 may also be configured to communicate with another remote device as well as the movable object 1700. For example, the movable object 1700 and/or terminal 1712 may communicate with another movable object, or a carrier or payload of another movable object. When desired, the remote device may be a second terminal or other computing device (e.g., computer, laptop, tablet, smartphone, or another mobile device). The remote device can be configured to transmit data to the movable object 1700, receive data from the movable object 1700, transmit data to the terminal 1712, and/or receive data from the terminal 1712. Optionally, the remote device can be connected to the Internet or other telecommunications network, such that data received from the movable object 1700 and/or terminal 1712 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While preferred embodiments of the present disclosure have been shown and described herein, it will be obvious to those skilled in the art that such embodiments are provided by way of example only. Numerous variations, changes, and substitutions will now occur to those skilled in the art without departing from the present disclosure. It should be understood that various alternatives to the embodiments of the present disclosure described herein may be employed in practicing the present disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the present disclosure and that methods and structures within the scope of these claims and their equivalents be covered thereby.

What is claimed is:

1. A method for video broadcasting, the method comprising:
   receiving broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations;
   receiving a user input from a viewing end, wherein the user input comprises one or more instructions configured for interacting with the broadcasting end;
   processing the user input from the viewing end; and
   transmitting the processed user input to the broadcasting end to adjust video broadcasting at the broadcasting end;
   wherein:
      the coordinated manner includes a master-slave configuration in which a master UAV is configured to control one or more slave UAVs; and
      the control of the one or more slave UAVs is transferred from the master UAV to the one or more ground stations upon occurrence of one or more conditions that prevent the master UAV from controlling the slave UAVs.

2. The method of claim 1, wherein the coordinated manner comprises a decentralized swarm configuration in which the UAVs are configured to operate autonomously.

3. The method of claim 2, wherein each UAV is configured to operate autonomously using in part environmental information collected via an environmental sensing system onboard each UAV.

4. The method of claim 2, wherein each UAV is configured to operate autonomously based in part on information of adjacent UAV(s), wherein the information comprises a position and an orientation of a camera onboard the adjacent UAV(s).

5. The method of claim 1, wherein the one or more ground stations are configured to control the UAVs to operate in the coordinated manner.

6. The method of claim 1, wherein the coordinated manner comprises a master-slave configuration in which a master UAV is configured to control one or more slave UAVs.

7. The method of claim 6, wherein the master UAV is configured to control a flight path of each of the slave UAV(s).

8. The method of claim 6, wherein the control of the slave UAV(s) is transferred from the master UAV to the ground station(s) or a back-up UAV upon occurrence of one or more conditions that prevent the master UAV from controlling the slave UAV(s).

9. The method of claim 8, wherein the one or more conditions include: (1) loss of communication between the master UAV and the slave UAV(s), and/or (2) a malfunction or damage to one or more components of the master UAV.

10. The method of claim 1, wherein processing the user input from the viewing end further comprises determining whether the user input includes conflicting instructions for controlling the UAVs.

11. The method of claim 10, wherein the conflicting instructions are resolved based on a priority level associated with each user.

12. The method of claim 10, wherein the conflicting instructions are resolved based on a number of votes associated with each user.

13. The method of claim 1, further comprising: receiving a broadcast request from the broadcasting end, and processing the broadcast request based on one or more operational parameters at the broadcasting end.

14. The method of claim 13, wherein the operational parameters comprise (1) a first set of parameters associated with operation of the one or more UAVs, and (2) a second set of parameters associated with an environment in which the one or more UAVs are configured to operate.

15. The method of claim 14, wherein the first set of parameters comprises (1) motion path of the UAVs, (2) type of video data to be broadcasted, (3) permission level of the UAVs to broadcast, or any combination thereof.

16. A system for video broadcasting, the system comprising a control hub including one or more servers that are individually or collectively configured to:

receive broadcast data from a broadcasting end, wherein the broadcast data comprises video data collected by a plurality of unmanned aerial vehicles (UAVs), and wherein said UAVs are configured to be (1) operated in a coordinated manner and (2) in communication with one or more ground stations;

receive a user input from a viewing end, wherein the user input comprises one or more instructions configured for interacting with the broadcasting end;

process the user input from the viewing end; and transmit the processed user input to the broadcasting end to adjust video broadcasting at the broadcasting end;

wherein:
the coordinated manner includes a master-slave configuration in which a master UAV is configured to control one or more slave UAVs; and
the control of the one or more slave UAVs is transferred from the master UAV to the one or more ground stations upon occurrence of one or more conditions that prevent the master UAV from controlling the slave UAVs.

17. The system of claim 16, wherein processing the user input further comprises determining whether the user input includes conflicting instructions for controlling the UAVs.

18. The method according to claim 1, wherein:
the coordinated manner includes a master-slave configuration in which a master UAV is configured to control one or more slave UAVs; and
for each of the one or more slave UAVs, the master UAV controls an orientation of a camera onboard the slave UAV.

* * * * *